US008973693B2

(12) United States Patent
Kinsman et al.

(10) Patent No.: US 8,973,693 B2
(45) Date of Patent: Mar. 10, 2015

(54) SIDE BY SIDE ALL TERRAIN VEHICLE

(75) Inventors: Anthony J. Kinsman, Wyoming, MN (US); Angus M. Morison, Blaine, MN (US); Keith A. Hollman, Osceola, WI (US); Adam J. Schlangen, Rush City, MN (US); Greg W. Fedelem, Roseau, MN (US); Daniel L. Goffman, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 76 days.

(21) Appl. No.: 13/464,603

(22) Filed: May 4, 2012

(65) Prior Publication Data
US 2012/0217078 A1 Aug. 30, 2012

Related U.S. Application Data

(63) Continuation-in-part of application No. 13/370,139, filed on Feb. 9, 2012.

(60) Provisional application No. 61/442,071, filed on Feb. 11, 2011.

(51) Int. Cl.
*B62D 23/00* (2006.01)
*B60K 17/34* (2006.01)
(Continued)

(52) U.S. Cl.
CPC ............ *B60R 21/13* (2013.01); *B60K 2005/003* (2013.01); *B60Y 2200/141* (2013.01);
(Continued)

(58) Field of Classification Search
USPC ............... 296/146.9, 187.12, 190.08, 193.05, 296/202, 203.03, 205; 180/89.1
See application file for complete search history.

(56) References Cited

U.S. PATENT DOCUMENTS

| 3,422,918 A | 1/1969 | Musser |
| 4,046,403 A | 9/1977 | Yoshida |

(Continued)

FOREIGN PATENT DOCUMENTS

| DE | 37435 C | 11/1886 |
| EP | 1493624 A1 | 1/2005 |

(Continued)

OTHER PUBLICATIONS

Ray Sedorchuk, New for 2004, Yamaha Rhino 660 4 ×4, ATV Connection Magazine, © 2006; 3 pages.
(Continued)

Primary Examiner — Toan To
(74) Attorney, Agent, or Firm — Faegre Baker Daniels LLP

(57) ABSTRACT

A utility vehicle comprises at least one front ground engaging member; at least one rear ground engaging member; and a frame extending in a longitudinal direction of the vehicle. The frame includes a front portion, a rear portion, and a channel member extending in the longitudinal direction between the front and rear portions. The vehicle further comprises a floor board coupled to the channel member and a powertrain assembly having a drive shaft operably coupled to at least one of the front ground engaging member and the rear ground engaging member. Additionally, the vehicle comprises a plurality of transport lines configured to transport at least one of a fluid and an electrical connection between the front portion and the rear portion of the frame. The channel member is positioned intermediate the drive shaft and the transport lines and is configured to support the transport lines.

20 Claims, 97 Drawing Sheets

(51) Int. Cl.
*B60K 5/04* (2006.01)
*B60K 15/035* (2006.01)
*B60R 21/13* (2006.01)
*B60K 15/04* (2006.01)
B60K 5/00 (2006.01)
B60K 15/063 (2006.01)
B60K 13/02 (2006.01)
B60K 15/03 (2006.01)
B60K 1/04 (2006.01)
B60K 1/00 (2006.01)

(52) U.S. Cl.
CPC ......... B60K2015/0632 (2013.01); *B60K 17/34* (2013.01); *B60Y 2200/124* (2013.01); *B60K 5/04* (2013.01); *B60K 13/02* (2013.01); *B60K 2015/03296* (2013.01); *B60K 15/03519* (2013.01); *B60K 2001/0422* (2013.01); *B60K 1/00* (2013.01); *B60K 15/04* (2013.01)
USPC .................. 180/89.1; 296/146.9; 296/187.12; 296/190.08; 296/193.05; 296/202

(56) References Cited

U.S. PATENT DOCUMENTS

| | | | |
|---|---|---|---|
| 4,650,210 A | 3/1987 | Hirose | |
| 4,817,985 A | 4/1989 | Enokimoto | |
| 5,327,989 A * | 7/1994 | Furuhashi et al. | 180/248 |
| 5,738,471 A | 4/1998 | Zentner | |
| 5,752,791 A | 5/1998 | Ehrlich | |
| 5,816,650 A | 10/1998 | Lucas | |
| 5,895,063 A | 4/1999 | Hasshi | |
| 6,113,328 A | 9/2000 | Claucherty | |
| D467,200 S | 12/2002 | Luo et al. | |
| 6,582,004 B1 | 6/2003 | Hamm | |
| D497,324 S | 10/2004 | Chestnut et al. | |
| D503,657 S | 4/2005 | Katoh | |
| D504,638 S | 5/2005 | Tanaka | |
| D511,317 S | 11/2005 | Tanaka | |
| 7,014,241 B2 | 3/2006 | Toyota | |
| 7,281,753 B2 | 10/2007 | Curtis | |
| D555,036 S | 11/2007 | Eck et al. | |
| D578,433 S | 10/2008 | Kawaguchi | |
| D578,934 S | 10/2008 | Tanaka | |
| 7,431,024 B2 | 10/2008 | Buchwitz | |
| D592,998 S | 5/2009 | Woodard | |
| D595,613 S | 7/2009 | Lai | |
| D604,201 S | 11/2009 | Kawaguchi | |
| D605,555 S | 12/2009 | Tanaka | |
| D606,900 S | 12/2009 | Flores | |
| D607,377 S | 1/2010 | Shimomura | |
| 7,677,646 B2 * | 3/2010 | Nakamura | 296/190.08 |
| 7,717,495 B2 | 5/2010 | Leonard | |
| D621,423 S | 8/2010 | Nakanishi | |
| D622,631 S | 8/2010 | Lai | |
| 7,795,602 B2 | 9/2010 | Leonard | |
| D624,848 S | 10/2010 | Shimomura | |
| D625,662 S | 10/2010 | Li | |
| 7,819,220 B2 * | 10/2010 | Sunsdahl et al. | 180/312 |
| D631,395 S | 1/2011 | Tandrup | |
| D633,006 S | 2/2011 | Sanschagrin | |
| 7,913,505 B2 * | 3/2011 | Nakamura | 62/239 |
| D636,704 S | 4/2011 | Yoo | |
| D640,598 S | 6/2011 | Zhang | |
| D641,288 S | 7/2011 | Sun | |
| D642,493 S | 8/2011 | Goebert | |
| 8,052,202 B2 * | 11/2011 | Nakamura | 296/190.08 |
| 8,596,405 B2 * | 12/2013 | Sunsdahl et al. | 180/312 |
| 2001/0031185 A1 | 10/2001 | Swensen | |
| 2005/0077098 A1 | 4/2005 | Takayanagi | |
| 2005/0173177 A1 | 8/2005 | Smith et al. | |
| 2005/0279330 A1 * | 12/2005 | Okazaki et al. | 123/509 |
| 2006/0006696 A1 * | 1/2006 | Umemoto et al. | 296/190.08 |
| 2007/0214818 A1 * | 9/2007 | Nakamura | 62/239 |
| 2008/0023249 A1 | 1/2008 | Sunsdahl et al. | |
| 2008/0084091 A1 * | 4/2008 | Nakamura et al. | 296/190.08 |
| 2008/0093883 A1 * | 4/2008 | Shibata et al. | 296/146.9 |
| 2008/0256738 A1 * | 10/2008 | Malone | 15/250.06 |
| 2009/0301830 A1 | 12/2009 | Kinsman | |
| 2010/0194086 A1 | 8/2010 | Yamamura et al. | |
| 2010/0314184 A1 | 12/2010 | Stenberg | |
| 2011/0155087 A1 | 6/2011 | Wenger | |
| 2012/0031693 A1 | 2/2012 | Deckard et al. | |

FOREIGN PATENT DOCUMENTS

| | | |
|---|---|---|
| EP | 2057060 A2 | 5/2009 |
| FR | 2914597 A1 | 10/2008 |
| GB | 2036659 A | 7/1980 |
| JP | 63-25977 B2 | 5/1988 |
| JP | 7040783 A | 2/1995 |
| JP | 2001130304 A | 5/2001 |
| JP | 2003-237530 A | 8/2003 |
| JP | 2010-95106 A | 4/2010 |

OTHER PUBLICATIONS

Yamaha, Company Website, 2006 Rhino 450 Auto 4 ×4, © 2005; 3 pages.
Yamaha, Company Website, 2006 Rhino 66—Auto 4 ×4 Special Edition, © 2006; 4 pages.
Yamaha, Company Website, 2006 Rhino 660 Auto 4 ×4, © 2006; 4 pages.
Yamaha, Company Website, Rhino 660 Auto 4 ×4 Exploring Edition Specifications, © 2006; 3 pages.
Artic Cat, Company Website, Prowler XT650 H1, undated; 9 pages.
Club Car, Company Website, product pages for XRT 1500 SE, undated; 2 pages.
Honda Hippo 1800 New Competition for Yamaha's Rhino, Dirt Wheels Magazine, Apr. 2006, pp. 91-92.
Buyer'S Guide Supplement, 2006 Kart Guide, Powersports Business Magazine; 6 pages.
BRP Can-Am Commander photo, undated; 1 page.
Polaris Ranger Welcome to Ranger Country Brochure 2006, © 2005; 24 pages.
Polaris Ranger Brochure ATVs and Side x Sides Brochure 2010, ©2009; 26 pages.
Polaris Ranger RZR Brochure 2011, © 2010; 16 pages.
Polaris Ranger Brochure 2011, © 2010; 22 pages.
Kawasaki Mule Utility Vehicle Brochure 2009, © 2008; 10 pages.
Kawasaki Mule The Off-Road Capable 610 4 ×4 Xc Brochure 2011, © 2010; 6 pages.
Kawasaki Teryx Recreation Utility Vehicle Brochure 2009, © 2008; 8 pages.
Kawasaki Teryx 750 Fl 4 ×4 Sport Brochure 2011, © 2010; 6 pages.
Polaris Ranger Off-Road Utility Vehicles Brochure 2004, © 2003; 20 pages.
Polaris Ranger Work/Play Only Brochure 2008, © 2007; 28 pages.
Polaris Ranger Brochure 2009, © 2008; 32 pages.
International Search Report and Written Opinion issued by the European Patent Office, dated Jul. 23, 2013, for International Application No. PCT/US2013/039304; 11 pages.
International Search Report and Written Opinion issued by the European Patent Office, dated Jun. 28, 2012, for Internatonal Application No. PCT/US2012/024664; 19 pages.
International Preliminary Report on Patentability issued by the European Patent Office, dated Mar. 8, 2013, for International PCT Application No. PCT/US2012/024664; 24 pages.

* cited by examiner

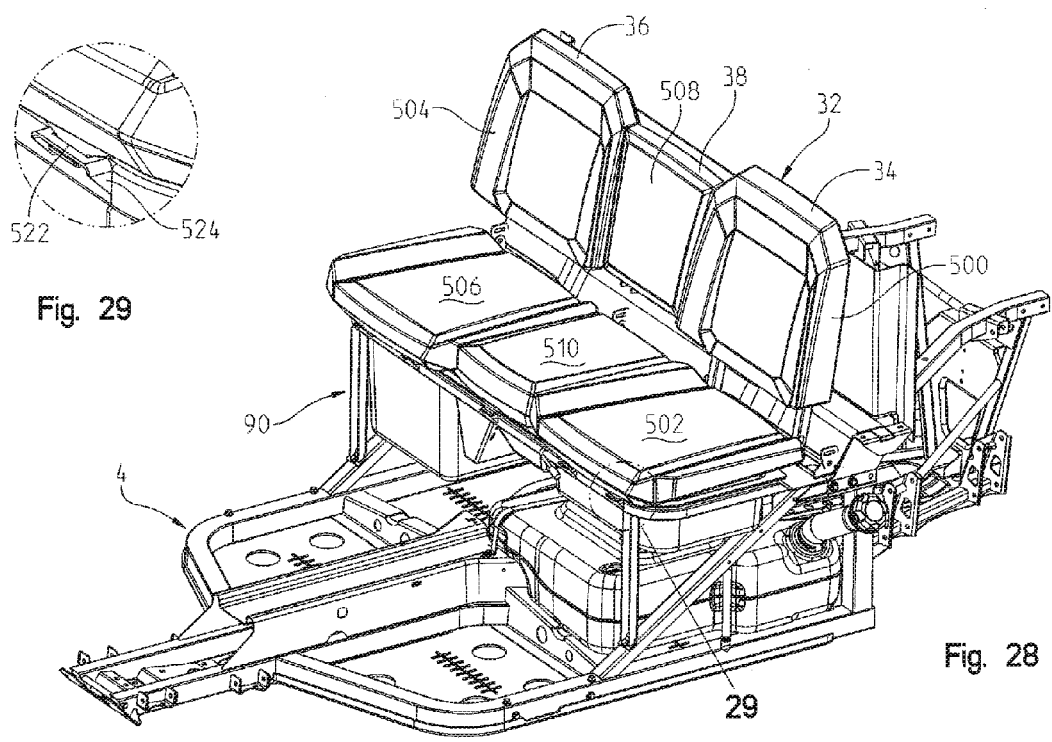

SIDE BY SIDE ALL TERRAIN VEHICLE

The subject application claims priority from U.S. Provisional Patent Application Ser. No. 61/442,071, filed Feb. 11, 2011, titled "SIDE-BY-SIDE ALL TERRAIN VEHICLE;" and U.S. patent application Ser. No. 13/370,139, filed Feb. 9, 2012, titled "SIDE-BY-SIDE ALL TERRAIN VEHICLE," the subject matter of which is expressly incorporated by reference herein.

SUMMARY

The subject disclosure is generally related to side-by-side all terrain vehicles.

Generally, all terrain vehicles ("ATVs") and utility vehicles ("UVs") are used to carry one or two passengers and a small amount of cargo over a variety of terrains. Due to increasing recreational interest in side-by-side vehicles, such as those used for trail riding, recreational use, and cargo hauling, such vehicles have entered the market place.

Most side-by-side vehicles include seating for two to three passengers. Side-by-side vehicles, in which the driver and passenger are seated beside each other on laterally spaced apart seats, have become popular because of the ability to allow the passenger to share the driver's viewpoint and riding experience instead of being positioned behind the driver. Two styles of vehicle are known in the marketplace; a first sportive version is known where the driver sits low in the vehicle, as is shown in U.S. Pat. No. 7,819,220 (and corresponding European Patent Publication No. EP 2057060), the subject matter of which is expressly incorporated by reference herein. The second version has the driver seated higher in the vehicle, as is shown in U.S. Patent Application Publication No. 2009/0301830, the subject matter of which is expressly incorporated by reference herein.

In one embodiment described herein, a utility vehicle comprises at least one front ground engaging member; at least one rear ground engaging member; and a frame extending in a longitudinal direction of the vehicle. The frame includes a front portion, a rear portion, and a channel member extending in the longitudinal direction between the front and rear portions. The front portion is supported by the at least one front ground engaging member and the rear portion is supported by the at least one rear ground engaging member. The vehicle further comprises a floor board coupled to the channel member and a powertrain assembly having a drive shaft operably coupled to at least one of the front ground engaging member and the rear ground engaging member. Additionally, the vehicle comprises a plurality of transport lines configured to transport at least one of a fluid and an electrical connection between the front portion and the rear portion of the frame. The channel member is positioned intermediate the drive shaft and the transport lines and is configured to support the transport lines.

A further embodiment of the present disclosure includes a utility vehicle comprising a plurality of ground engaging members; a frame supported by the ground engaging members; and an engine assembly supported by the frame. The engine is operably coupled to at least one of the ground engaging members. The vehicle further includes a fuel container fluidly coupled to the engine assembly and a fuel fill cup coupled to the fuel container. The fuel fill cup includes a channel that is configured to receive fuel into the fuel container and is configured to release vapor from the fuel container. The fuel fill cup is configured to contain excess fuel therein.

Another illustrative embodiment of the present disclosure includes a utility vehicle comprising a plurality of ground engaging members, a powertrain assembly drivingly coupled to at least one of the ground engaging members and including a continuously variable transmission, and an operator area supported by the ground engaging members. Additionally, the vehicle comprises a roll cage extending above the operator area. The roll cage includes a front portion and a rear portion. Each of the front and rear portions of the roll cage includes a plurality of apertures. The vehicle also includes a roof removably coupled to the roll cage and positioned above the operator area. The roof includes a plurality of projections configured to be received within at least one of the apertures of the front portion and at least one of the apertures of the rear portion of the roll cage.

An alternative embodiment of the present disclosure includes a utility vehicle comprising a plurality of ground engaging members configured for contacting a ground surface, a frame supported by the ground engaging members, an operator area supported by the frame, and a cab generally surrounding the operator area and including front upright portions, rear upright portions, and at least one cross member extending therebetween. The vehicle further includes a front windshield coupled to the front upright portions. The front windshield is configured to pivot between an open state and a closed state. The front windshield is spaced apart from the front upright portions when in the open state, and is engaged with the front upright portions when in the closed state. The open state includes a first open position and a second open position. The front windshield is generally parallel to the front upright portions when in the first open position, and the front windshield is generally parallel to the ground surface when in the second open position.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 28 is a left front perspective view of the seating assembly of the present vehicle as assembled to the frame;

FIG. 29 is an enlarged view of the portion denoted in FIG. 28;

DETAILED DESCRIPTION OF THE DRAWINGS

Figure 1:
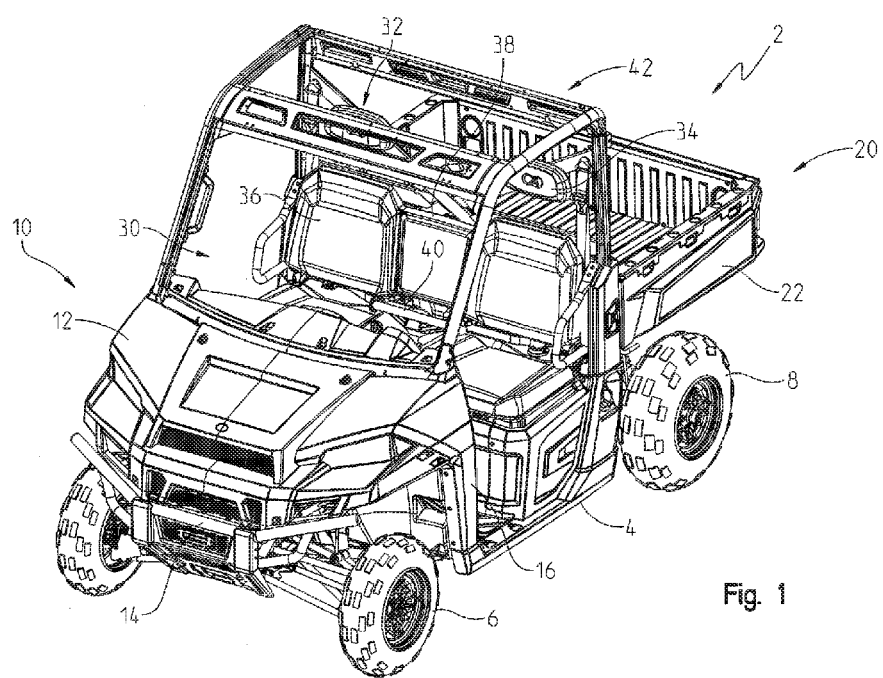
FIG. 1 is a front left perspective view of the vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIG. 1, the utility vehicle is shown generally at 2 to include a frame 4 supported by a plurality of ground engaging members, for example front wheels 6 and rear wheels 8. Utility vehicle 2 includes a front end 10 having a hood 12, bumper 14 and side body panel 16. Utility vehicle 2 also includes a rear end 20 having a utility cargo box 22 as described further herein. Utility vehicle 2 also includes an operator area at 30 comprising a bench seat assembly 32 having a driver's seat 34, a passenger seat 36 and a center passenger seat at 38. Operator controls such as a steering wheel is provided at 40. A roll cage 42 surrounds the entire operator area 30.

Figure 2:
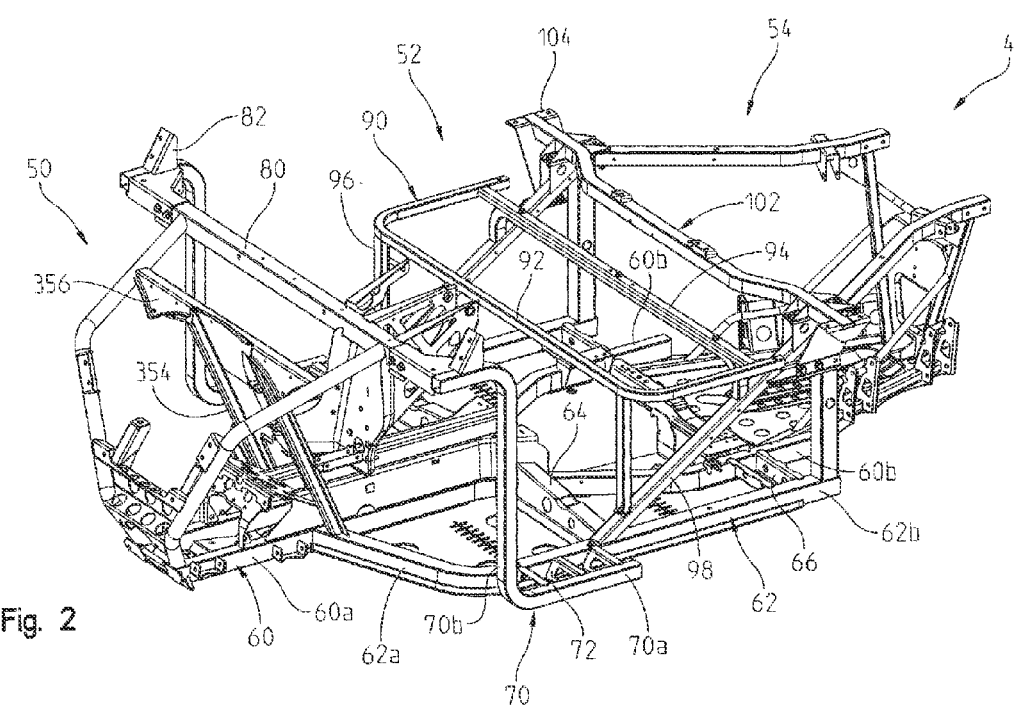
FIG. 2 is a front left perspective view of the frame of the present vehicle.
Figure 3:
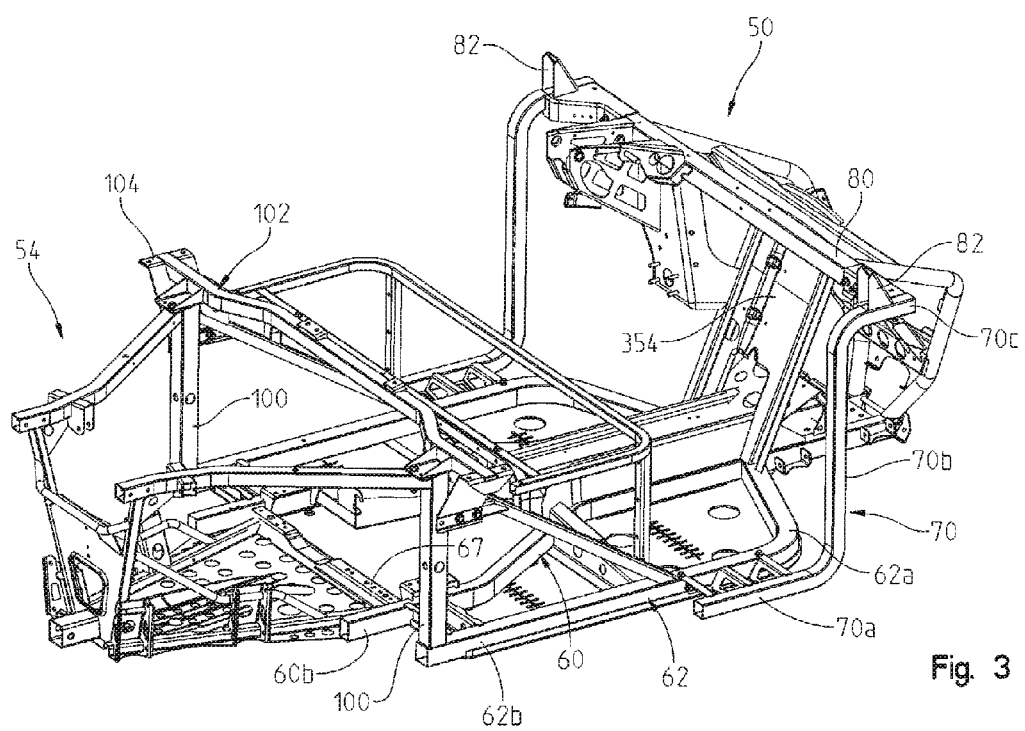
FIG. 3 is a right rear perspective view of the vehicle of the present disclosure.

With reference now to FIGS. 2 through 6, the frame will be described in greater detail. With reference first to FIG. 2, frame 4 generally includes a frame front portion 50, a frame mid portion 52 and a frame rear portion at 54. Central frame tubes 60 extend generally lengthwise between the front frame portion 50 and the rear frame portion 54 having a front portion at 60a and a flared out portion towards the rear at 60b. An outer frame tube member is provided at 62 which is connected to frame tube portion 60a; by tube portion 62a adjacent a front, and spaced apart from frame tube 60b by frame tube portion 62b. A cross tube such as 64 integrates the frame tubes 60 and 62 towards a center of the vehicle and frame channels 66 and 67 (FIG. 3) integrate the frame tubes 60 and 62 adjacent a rear of the vehicle.

A removable frame portion 70 is attached to frame tube 62 by way of brackets 72, as further described herein. As shown best in FIG. 7, removable frame portion 70 has a lower frame portion 70a, a vertically upstanding portion at 70b and an upper horizontally extending portion 70c. Removable frame portion 70 further includes gussets at 82 as described herein. A transverse brace 80 extends between the two portions 70c. Frame 4 further includes a seat frame portion at 90 having transversely extending frame tubes at 92 and 94 supported by upstanding braces 96 and diagonal braces 98. As shown best in FIG. 3, support posts 100 upstand from frame tubes 62 and support a transverse beam 102. Transverse beam 102 is removable from post 100 and also includes an upper mounting area or flange at 104, as further described herein.

Figure 4:
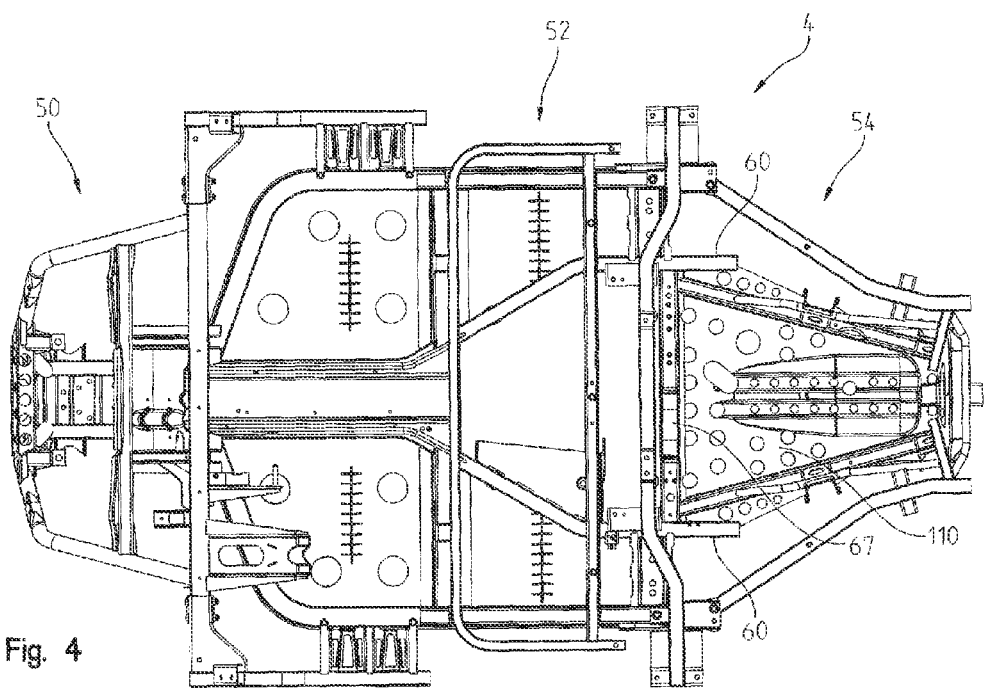
FIG. 4 is a plan view of the frame of FIGS. 2-3.
Figure 5:
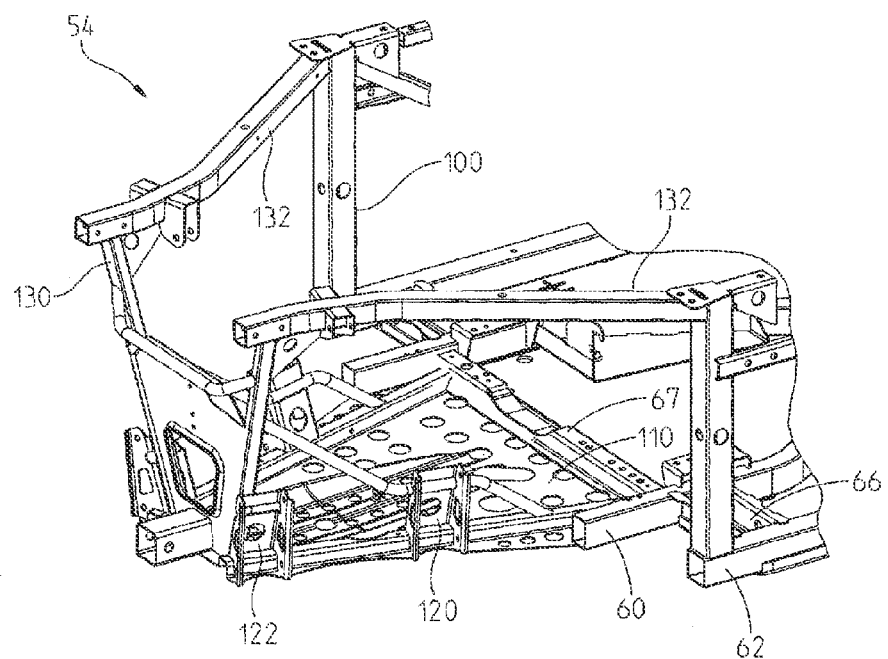
FIG. 5 is a partial rear perspective view of the frame of the present disclosure.
Figure 6:
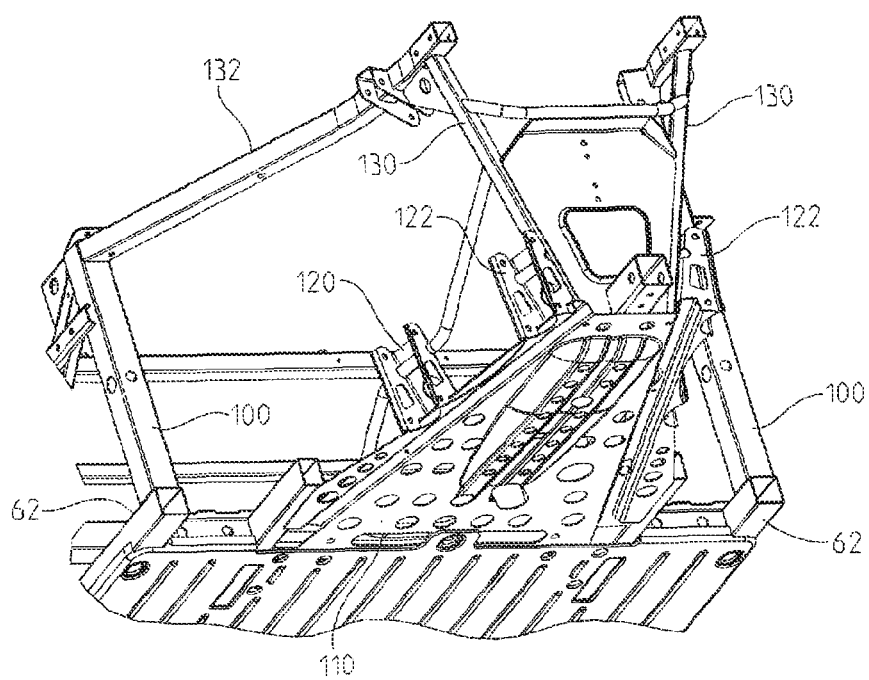
FIG. 6 is an underside perspective view of the frame of FIG. 5.

With respect now to FIGS. 4-6, a rear engine pan 110 is provided extending from channel 67 and frame tubes 60. Pan 110 defines the support platform for the drivetrain of the vehicle as will be described herein. Vertically extending channels 120, 122 (FIGS. 5, 6) extend from each side of the pan 10 and define locations for mounting alignment arms (A-arms) as described herein. Vertically extending tubes 130 extend upwardly from pan 110 and support upper frame arms 132.

Figure 7:
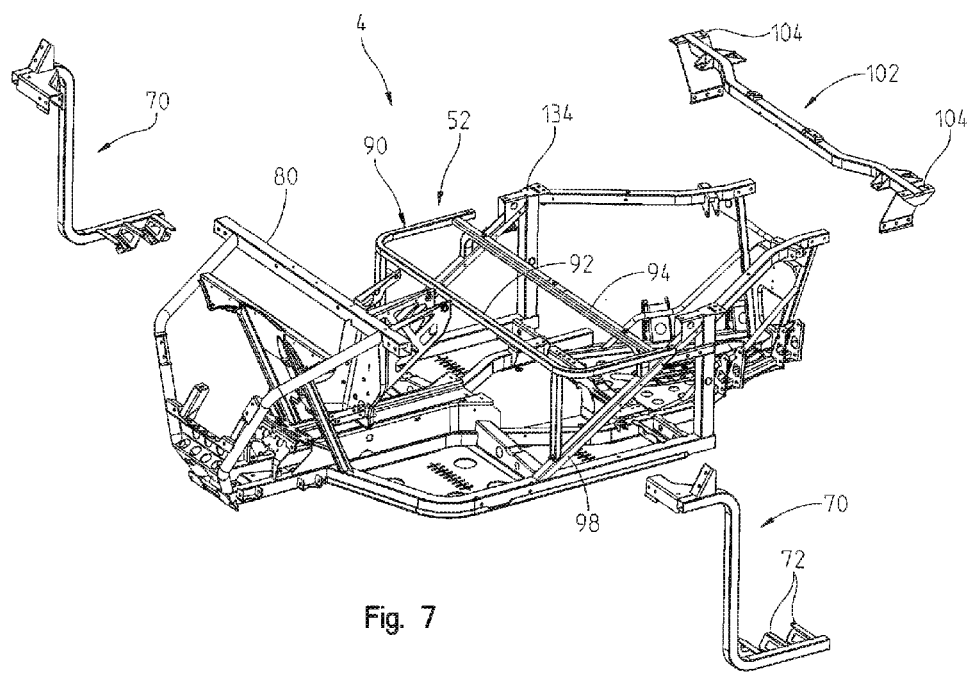
FIG. 7 is a perspective view showing removable frame components of the frame exploded away from the vehicle frame.
Figure 8:
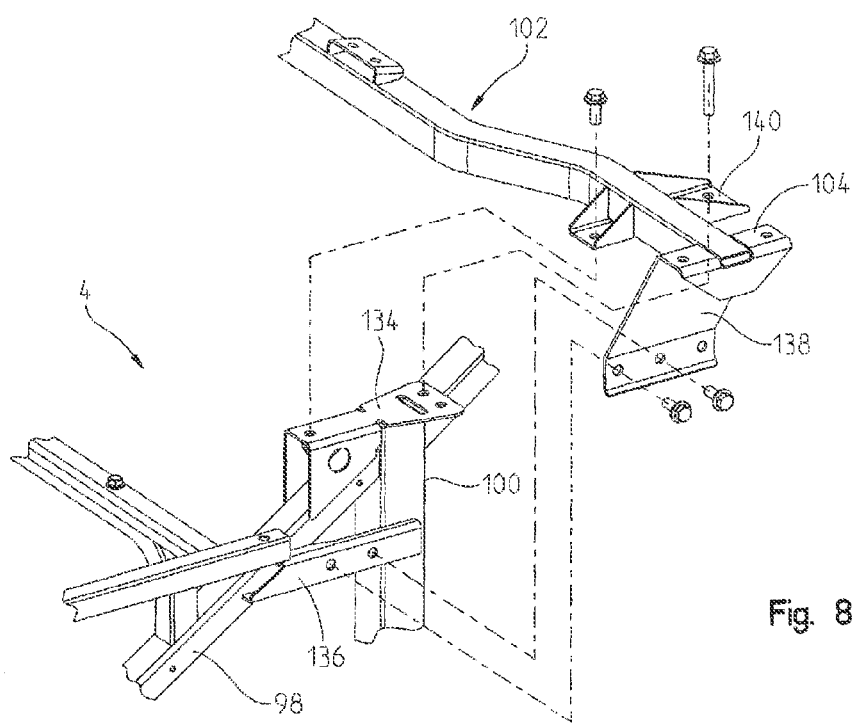
FIG. 8 shows a detailed view of a portion of the removable component.
Figure 9:
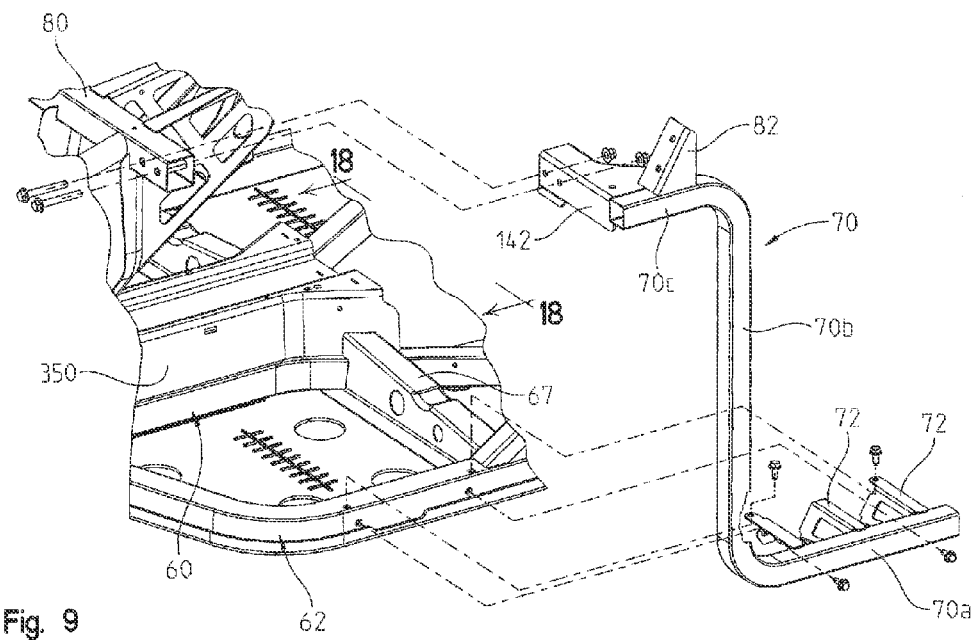
FIG. 9 shows another portion of a removable component.

With respect now to FIGS. 7 and 8, frame 4 further includes an upper mounting flange 134 attached to diagonal tube 98 and a side tube 136 (FIG. 8) extending between diagonal tube 98 and post 100. As shown in FIG. 8, transverse beam 102 is provided with a bracket 138 and a flange 140, where flange 140 attaches to flange 134 and where bracket 138 attaches to side tube 136 by way of fasteners as shown. As shown in FIG. 9, removable frame portion 70 includes a bracket 142 attached to horizontally extending portion 70c which is removably attached to transverse brace 80 by way of fasteners as shown. Lower frame portion 70a is also attached to frame tube 62 by way of fasteners through brackets 72 as shown.

Figure 10A:
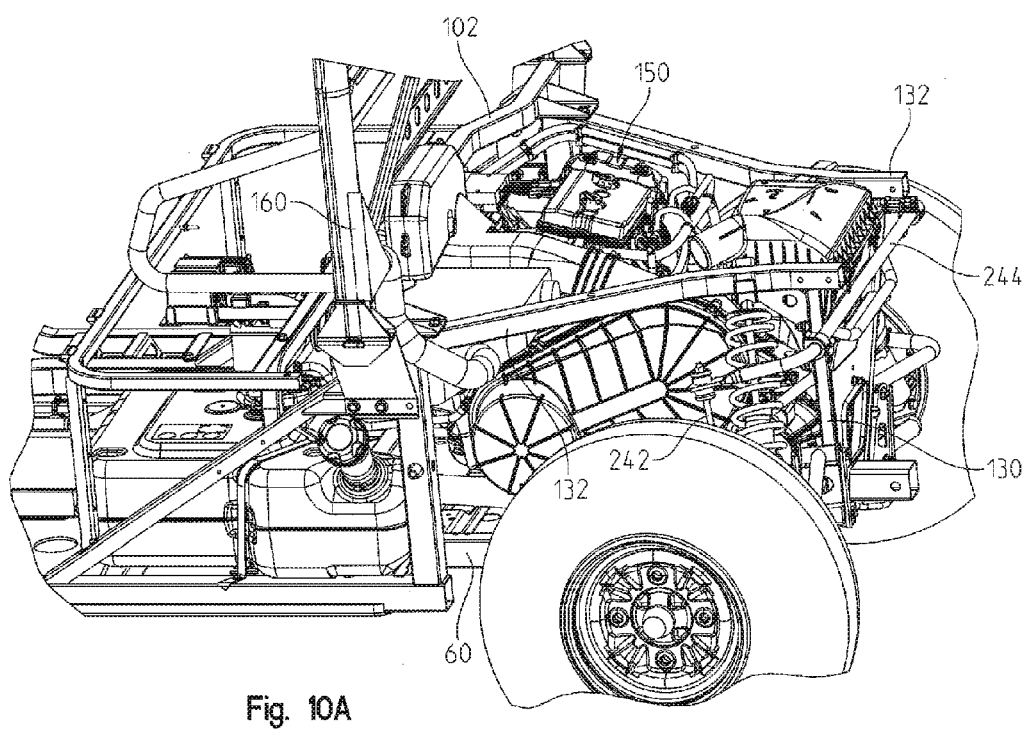
FIG. 10A shows a rear perspective view showing the engine and the transmission positioned in the frame of the present disclosure.
Figure 10B:
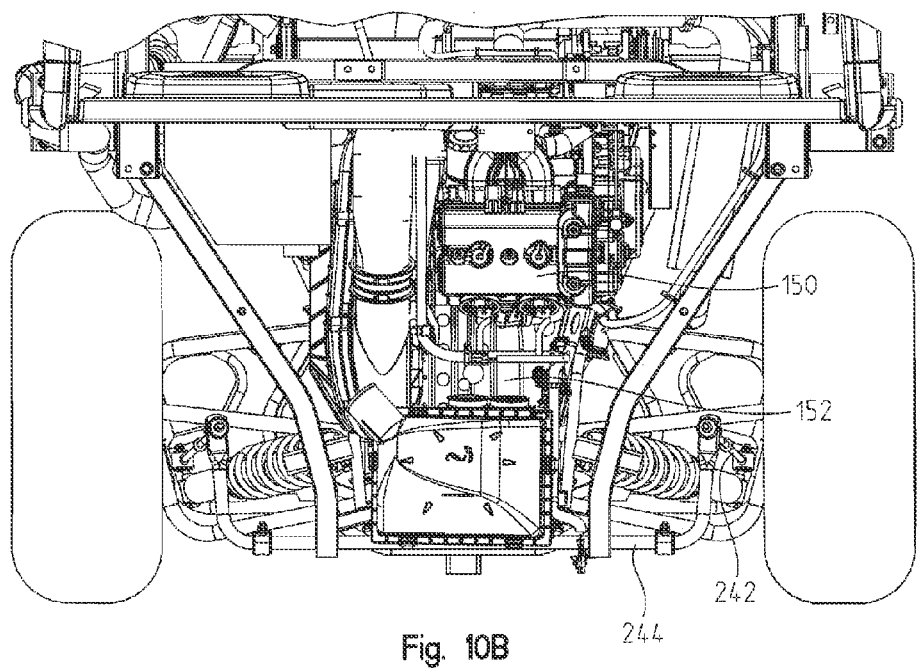
FIG. 10B shows a top plan view showing the engine and the transmission positioned in the frame of the present disclosure.
Figure 11:
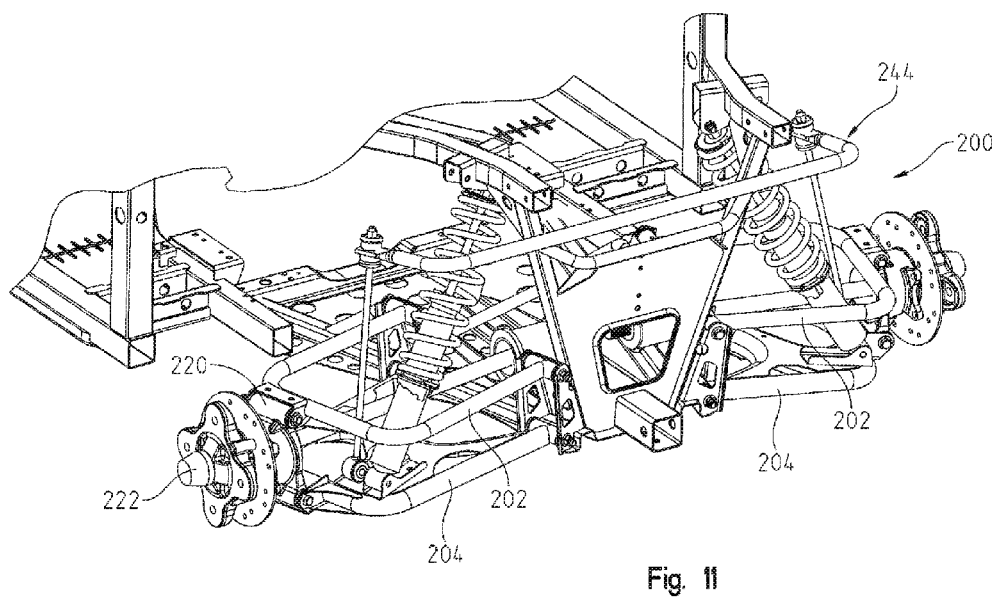
FIG. 11 shows a rear perspective view of the rear suspension.

With reference now to FIG. 10A and 10B, engine 150 is shown mounted on pan 110 together with transmission 152. It should be noted that engine 150 is of the type shown and described in assignee's U.S. Provisional Patent Application Ser. No. 61/385,802 filed Sep. 23, 2010, titled "ENGINE," and corresponding PCT Patent Application No. PCT/US2011/52914, the subject matter of which is expressly incorporated by reference herein. Transmission 152, the mounting of the engine 150 and transmission 152 together, as well as the mounting of the engine 150 and the transmission 152 to frame 4, is similar to that shown in either of U.S. patent application Ser. Nos. 12/849,480 or 12/849,516, both of which were filed on Aug. 3, 2010, and corresponding PCT Patent Application No. PCT/US2011/46395, the subject matter of which is incorporated herein by reference.

As shown, an air intake 160 is shown which would be mounted to a cover which surrounds the roll cage 50.

Figure 12:
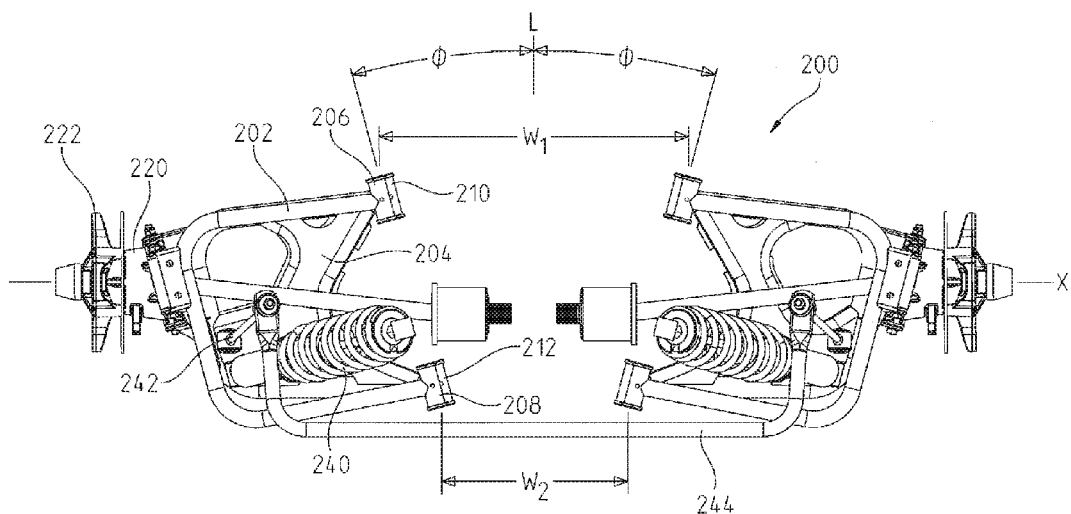
FIG. 12 shows a top view of the A-arms of the present disclosure.
Figure 13:
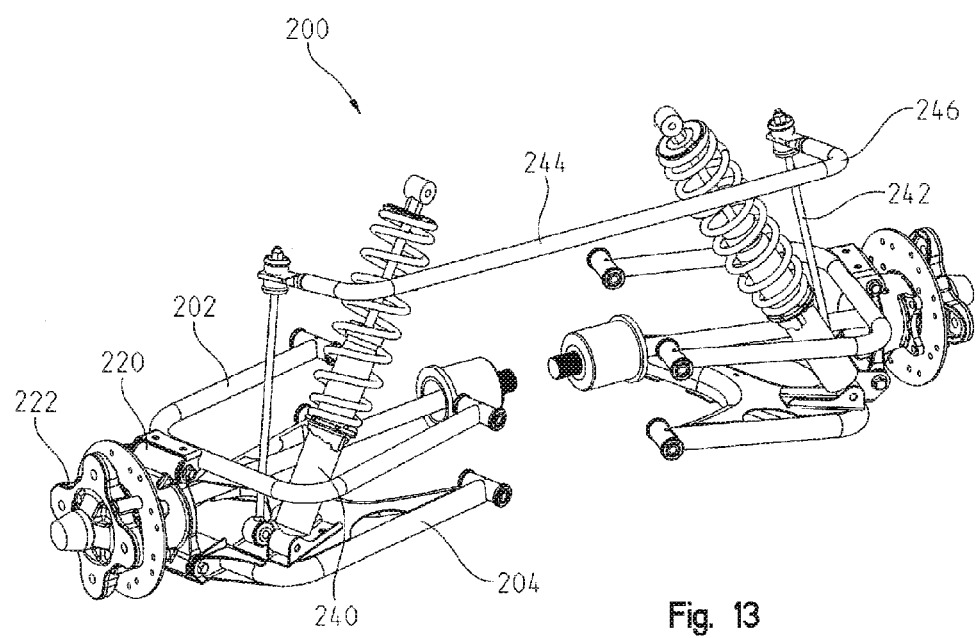
FIG. 13 shows a rear perspective view of the suspension assembly.

A re-designed suspension is shown generally as 200 in FIGS. 11-14. The suspension is re-designed to provide a space for the engine and transmission 150, 152 when the engine and transmission is mounted rearward of the seats as shown herein. More particularly, the rear suspension is provided by upper alignment arms 202 and lower alignment arms 204 whereby forward connections 206 of upper alignment arms 204 are spaced apart by a greater distance than their respective rearward connections 208; that is $W_1 > W_2$ (FIG. 12). This provides a lateral distance or width $W_1$ between the alignment arms which can receive the transmission, or at least a portion of the powertrain, there between. In a like manner, lower alignment arms 204 have forward connections 210 spaced apart at a greater distance than lower connections 212.

Figure 14:
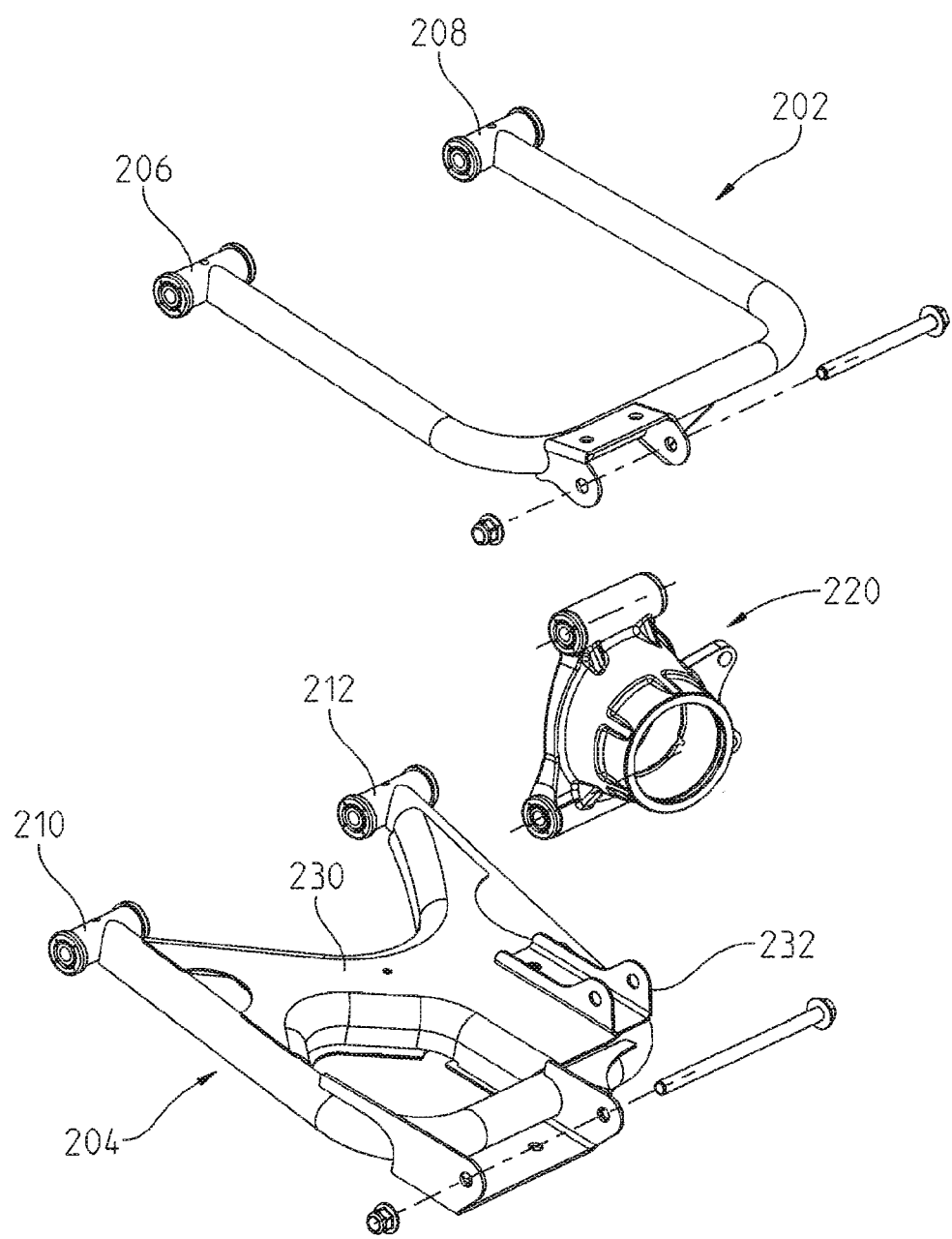
FIG. 14 shows an exploded view of a portion of the suspension of the present disclosure.

As shown, both upper and lower alignment arms 202, 204 are rectangular in configuration, and connect to a hub 220 at a forward and outer corner of the alignment arms. As shown in FIG. 12, the alignment arms extend at oblique angles Ø relative to a longitudinal axis L, and each of the hubs 220 includes a spindle 222 which rotates along an axis X transverse to the longitudinal axis L. As shown in FIG. 14, lower alignment arms 204 further comprise a lower plate portion 230 which provides a bracket 232 for both a shock absorber 240 and a mounting arm 242 of torsion bar 244. Torsion bar 244 is shown in FIGS. 10-13 rotationally mounted to upright 130, and with torsion bar arms 246 extending forwardly. The location of the hubs 220 provides room for the shock absorbers 240 and mounting arm 242 of the torsion bar 244, as best shown in FIG. 12.

Figure 15:
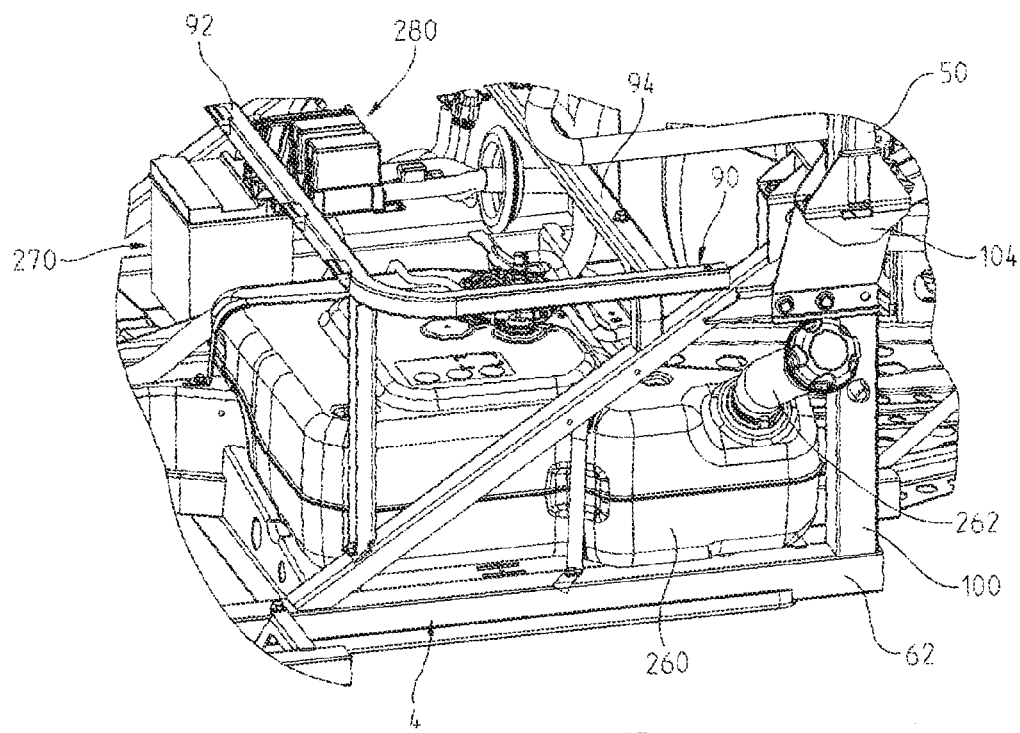
FIG. 15 shows components positioned under the seat frame of the present disclosure.

With reference now to FIG. 15, due to the location of the engine rearward of the seat 32, the area beneath the seat frame 90 is now available for other system components. As shown, fuel tank 260 is shown positioned below the seat frame 90 with a filler tube 262 extending out from the driver's side and beyond the frame formed by frame tube 62 and post 100. Battery 270 is shown positioned below a passenger side of the seat frame 90. Meanwhile an electronic assembly 280 is positioned below the center seat of frame 90, and the electronic assembly may comprise an engine control unit, a vehicle control unit, relays and the like.

Figure 16:
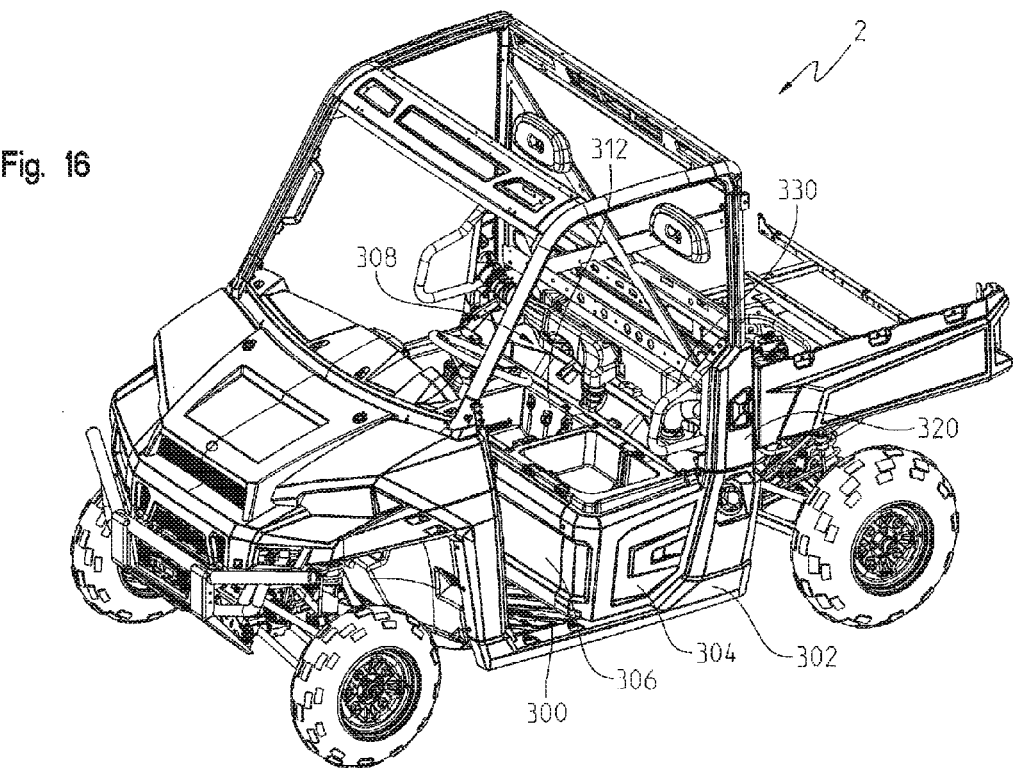
FIG. 16 shows a partially assembled vehicle showing chassis components positioned over the vehicle's seat frame.
Figure 17:
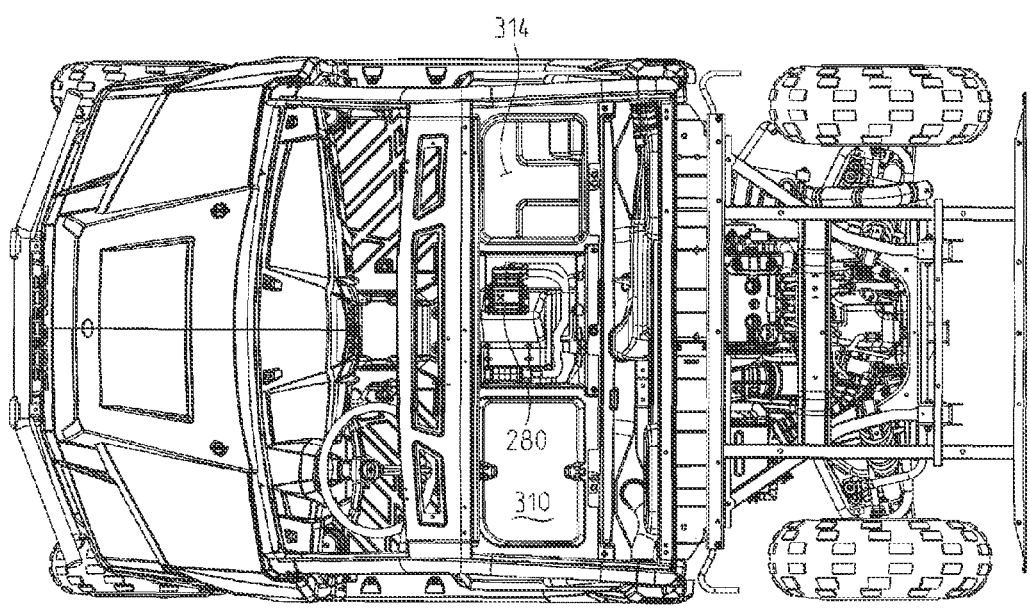
FIG. 17 is a top plan view of the vehicle of FIG. 16.

With respect now to FIGS. 16-17, vehicle 2 is finished off by floor board 300, side panel 302, seat side cover 304 and seat front cover 306. Storage pan 308 is positioned over frame 90 and over transverse bar 102 (FIG. 10) and includes three separate storage areas, namely storage area 310 directly below driver's seat, center storage area 312 accommodating the electronic assembly 280, and storage area 314 (FIGS. 12 and 17) positioned below passenger seating area. Panel 320 surrounds the intersection of rear roll cage portion 402 and plate 104 (FIG. 10) and a sound/heat shield 330 (FIG. 16) is positioned behind seat 32 and forward of engine 150 to prevent heat and noise from the engine 150 into the operator's area.

Figure 18:
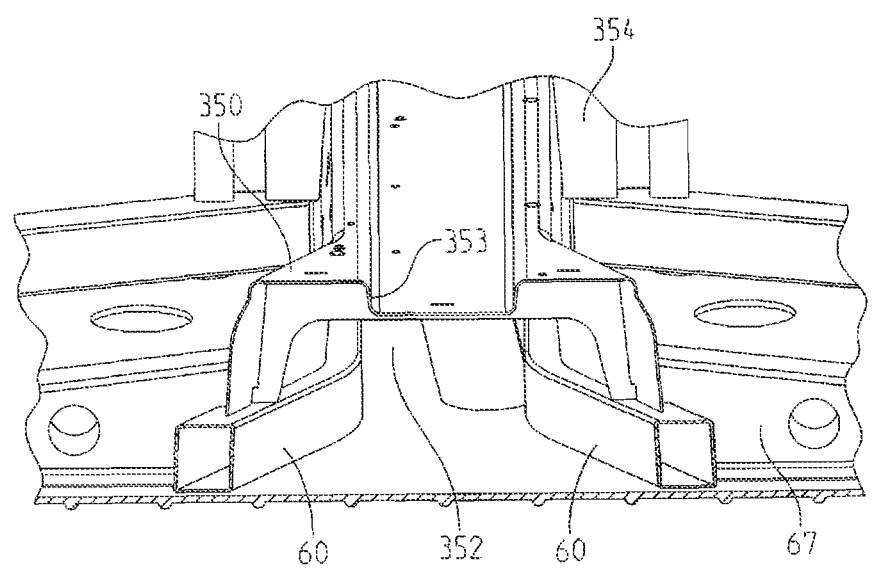
FIG. 18 is a cross sectional view through lines 18-18 of FIG. 9.

With reference now to FIGS. 9 and 18, a channel member 350 is positioned over frame tubes 60 from a position from the front 50 of the vehicle to a position extending over truss member 67 defining an opening 352 (FIG. 18). The channel member 350 defines an opening or tunnel between the front of the vehicle to a position under the seats for receiving the drive shaft that extends from the rear of the vehicle to the front of the vehicle for driving a front differential. The channel member 350 is coupled to the main frame tubes 60, 62 to define a rigid member resistant to torsion. The top of the channel 350 defines a passageway 353 for receiving other essentials extending from the front of the vehicle to the rear of the vehicle, such as a wiring harness (lights, electronic throttle control wiring, etc), cooling tubes, brake lines, etc. As shown best in FIGS. 3 and 18, a shear plate 354 also extends upwardly from frames tubes 62 to upper frame portion 356 also provided to resist torsion to the vehicle frame 4. Shear plate 354 also allows for the mounting of accessories thereto.

Figure 19:
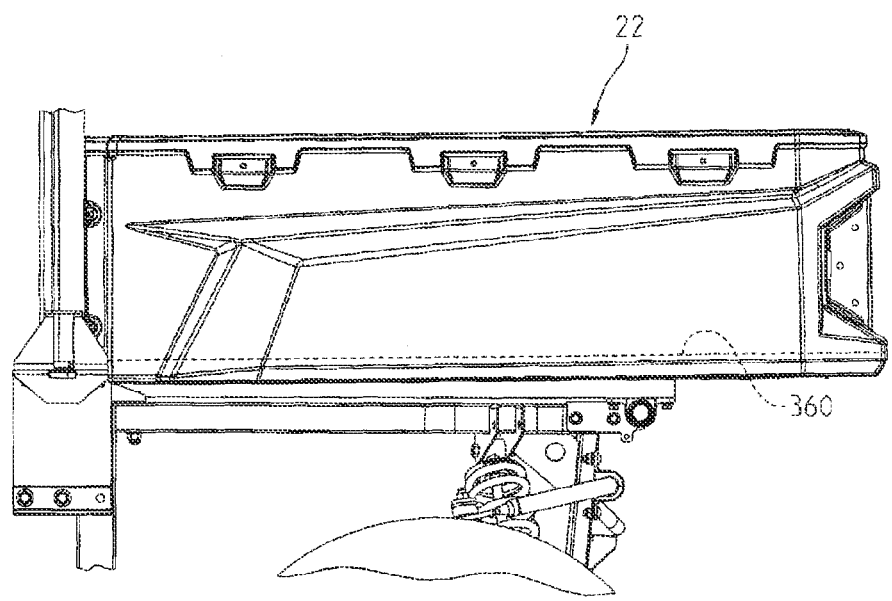
FIG. 19 shows a side view of the utility dump box.
Figure 20:
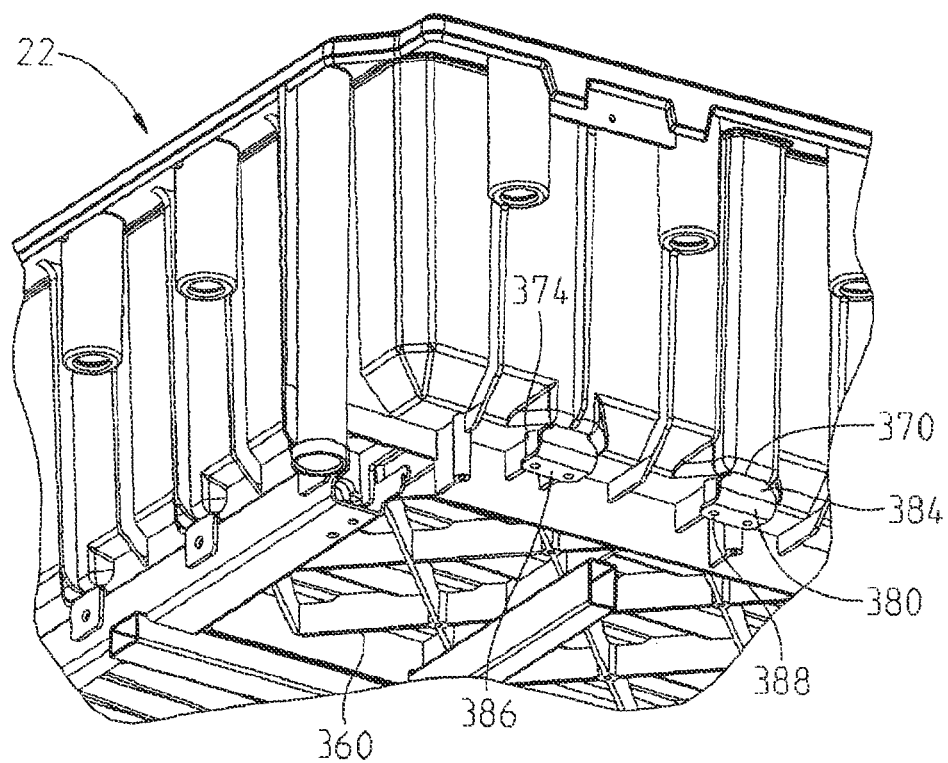
FIG. 20 shows an underside perspective view of a side of the utility dump box.
Figure 21:
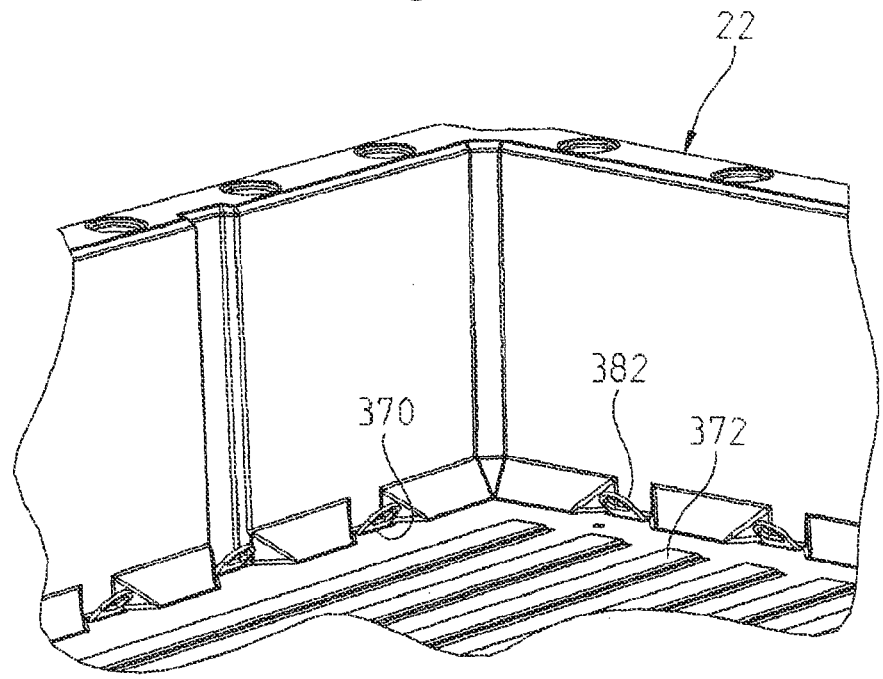
FIG. 21 shows integrated tie downs positioned in the utility dump box.
Figure 22:
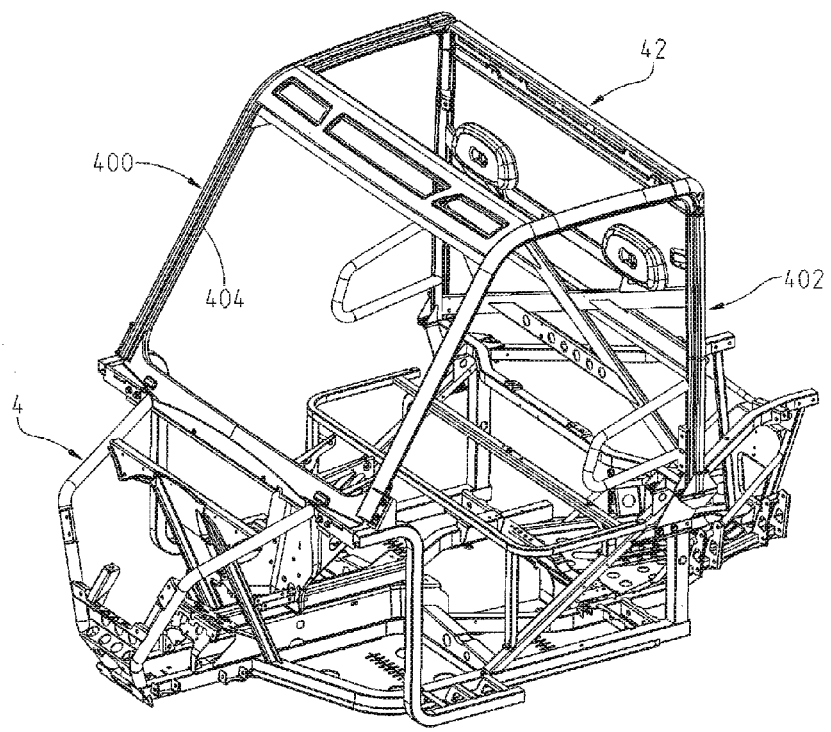
FIG. 22 is a left front perspective view of the roll cage attached to the frame.
Figure 23:
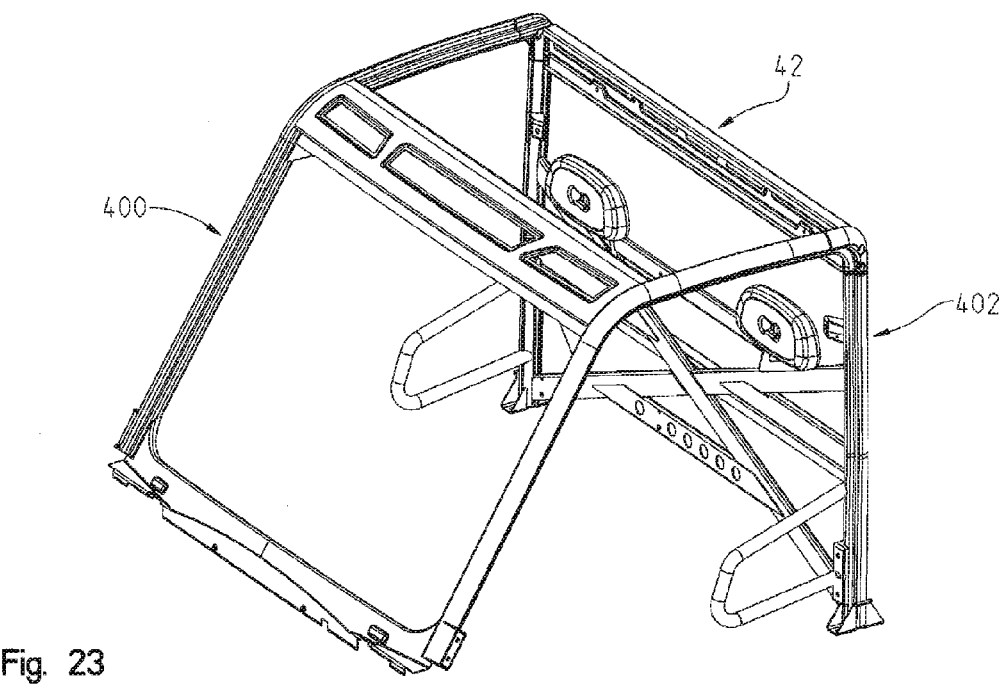
FIG. 23 is a left front perspective view of the roll cage.

With reference now to FIGS. 19-21, the rear utility box 22 is shown in greater detail. As shown in FIG. 19, the utility box 22 has an underside surface 360 which inclines upwardly and forwardly providing a small draft angled surface on the inside of the utility box. This provides for easier dumping of the contents of the utility box, as well as raises the inside surface of the utility box for clearance purposes due to the rearwardly adjusted engine 150 and transmission 152. Furthermore as shown in FIG. 21, the side edges of the utility box include a plurality of molded in slots 370 which extend downwardly through a floor 372 of the box, the slots extending outwardly of inwardly molded posts 374 (FIG. 20). Tie downs 380 are provided having an upwardly extending portion 382 for extending through slots 370, a shank portion 384 for extending downwardly through the slot, and a flange portion 386 for positioning against the post 374. Fasteners may be positioned through apertures 388 of the tie downs 382 fastening the tie downs to the utility box in a semi-fixed fashion. It should be understood that the tie downs may be positioned in alternate orientations as decided by the owner/user.

With reference now to FIGS. 22-26, the roll cage 42 will be described in greater detail. As shown, cage 42 includes a front cage portion 400 and a rear cage portion 402. As shown best in FIG. 24, front cage portion 400 includes upright portions 404, horizontal portions 406, crossbeam 408 and lower crossbeam 410. As defined, front cage portion 400 defines surfaces 412 of uprights 404, surface 414 of crossbeam 408 and surface 416 of lower crossbeam 410 all arranged in a plane for receiving an accessory windshield. In a like manner, surfaces 420 are defined on portions 406 and surface 422 is defined on overhead beam 408 to define a planar surface for receiving either an accessory overhead roof piece or see through moon roof. As shown, upright portions 404 include brackets 422 for connection to gussets 82 (FIG. 9). Finally, cage portion 400 includes rear connectors 424 for connection to rear cage portion 402 as described herein.

Figure 24:
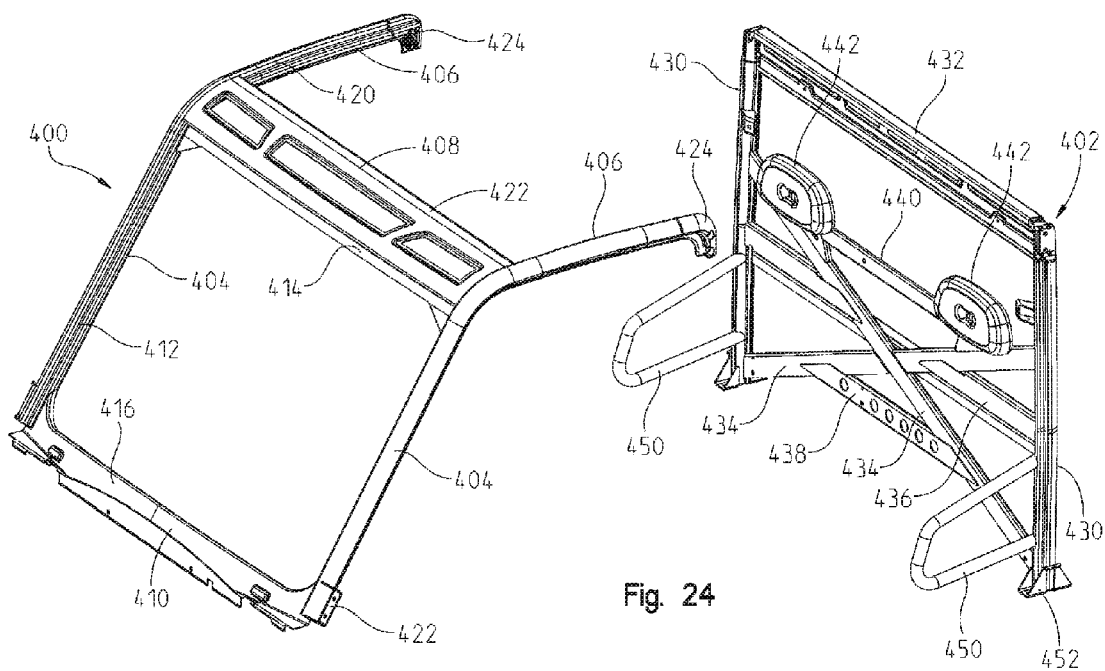
FIG. 24 shows the roll cage of FIG. 23 in an exploded fashion.
Figure 25:
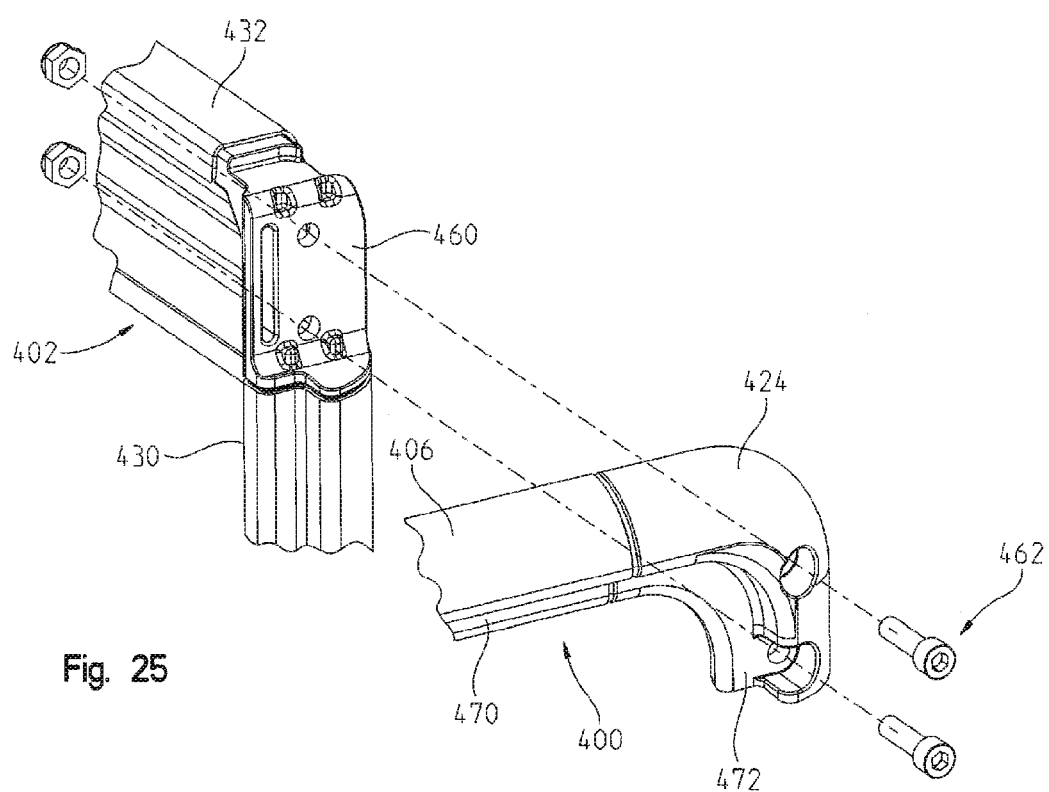
FIG. 25 shows an enlarged view of the connection points of the collapsible roll cage.
Figure 26:
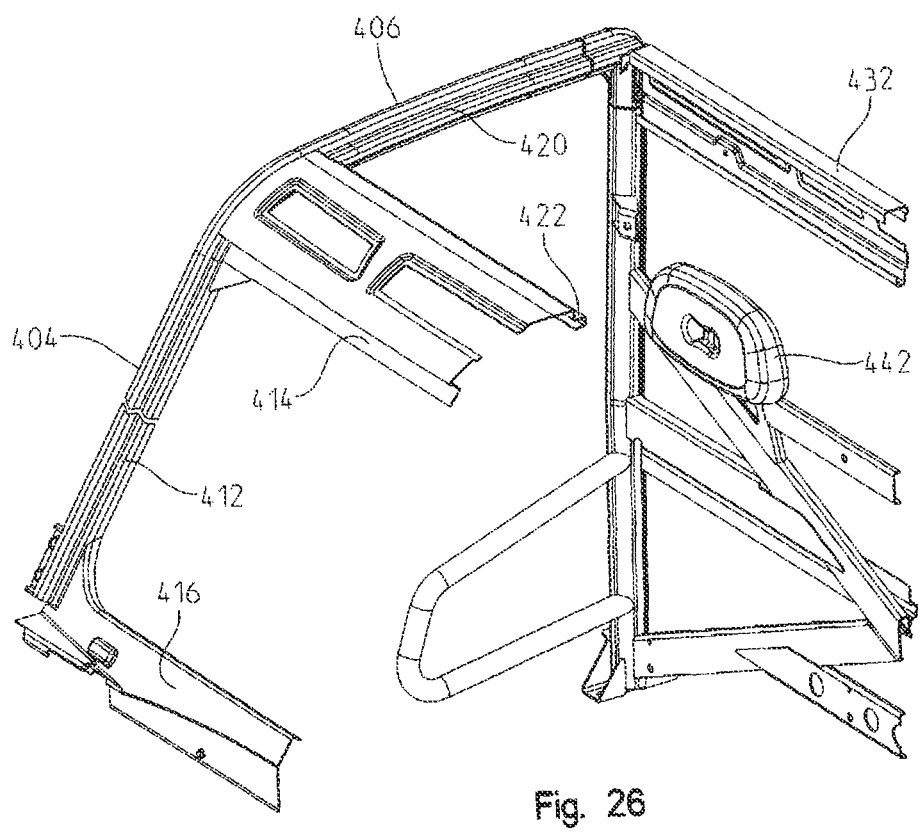
FIG. 26 shows a cross section of the roll cage showing the configuration of the components.
Figure 27:
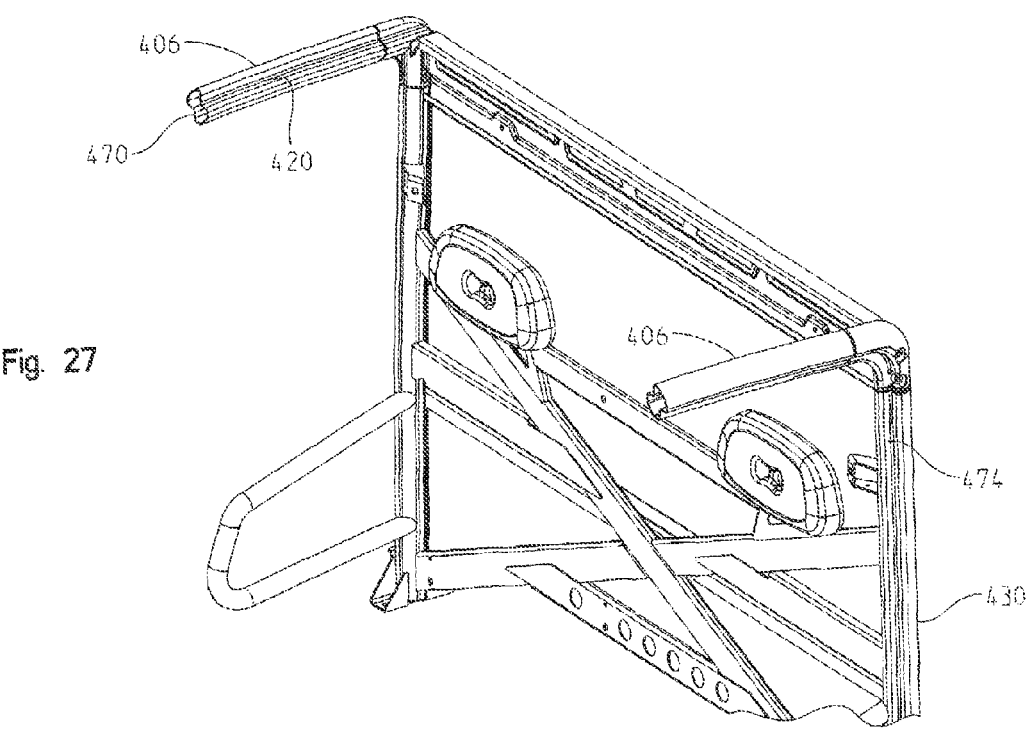
FIG. 27 shows a lateral cross section showing a cross section configuration of the lateral roll cage members.
Figure 30:
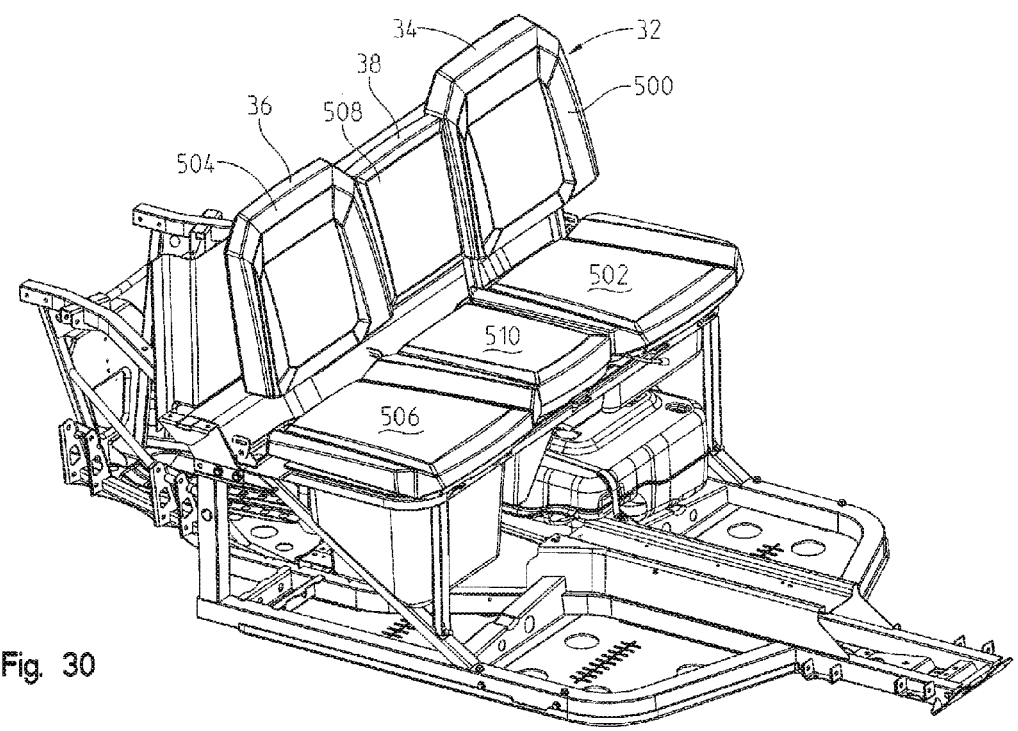
FIG. 30 is a right front perspective view of the seating assembly of FIG. 28.
Figure 31:
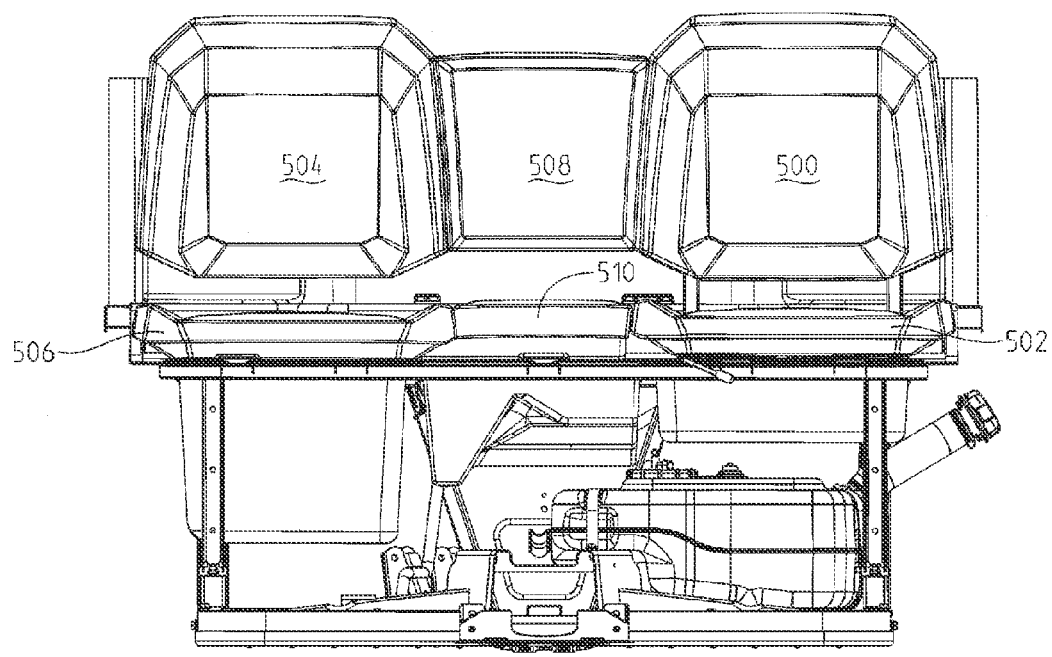
FIG. 31 is a front view of the seating assembly of FIG. 28.
Figure 32:
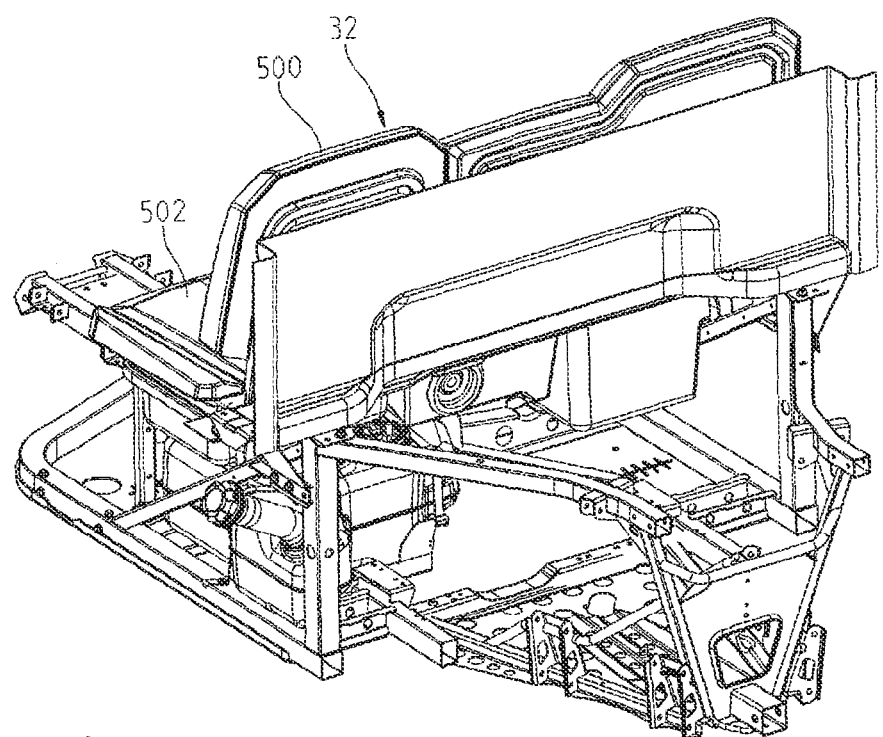
FIG. 32 is a left rear perspective view of the seating assembly of FIG. 28.

As shown best in FIG. 24, rear cage portion 402 includes uprights 430, cross member 432, diagonal braces 434, cross members 436 and 438 and cross member 440 retaining head rests 442. Side supports 450 extend forwardly from uprights 430. Rear portion 402 includes brackets 452 for attachment to upper flange 104 (FIG. 8). As shown best in FIG. 25, the intersection of upright 430 and cross member 432 defines a profile 460 for the receipt of connector 424. Thus, the front and rear cage portions 400, 402 are easily connectable by way of fasteners 462. As also shown in FIG. 25, cage portion 406 includes an outwardly facing surface or lip at 470 which is planar with a surface 472 on connector 424 and with surface 474 (FIG. 27) of rear upright 430. This allows for the addition of an accessory door. The exact configuration of the cross section of cage portion 406 is shown in FIG. 27 which is somewhat hourglass or a figure eight configuration.

With respect now to FIGS. 28-37, the seating assembly of the present disclosure will be described in greater detail. With reference first to FIG. 28, the seating assembly 32 is shown in an installed position in the seat frame 90. As shown, driver's seat 34 includes a seat back 500 and a seat bottom 502, passenger seat 36 includes a seat back 504 and a seat bottom 506; and center seat 38 includes a seat back 508 and a seat bottom 510. Alternatively, seating assembly 32 may include a single seat, such as a bench seat, that extends across the width of seat frame 90 to accommodate both a driver and at least one passenger.

Figure 33:
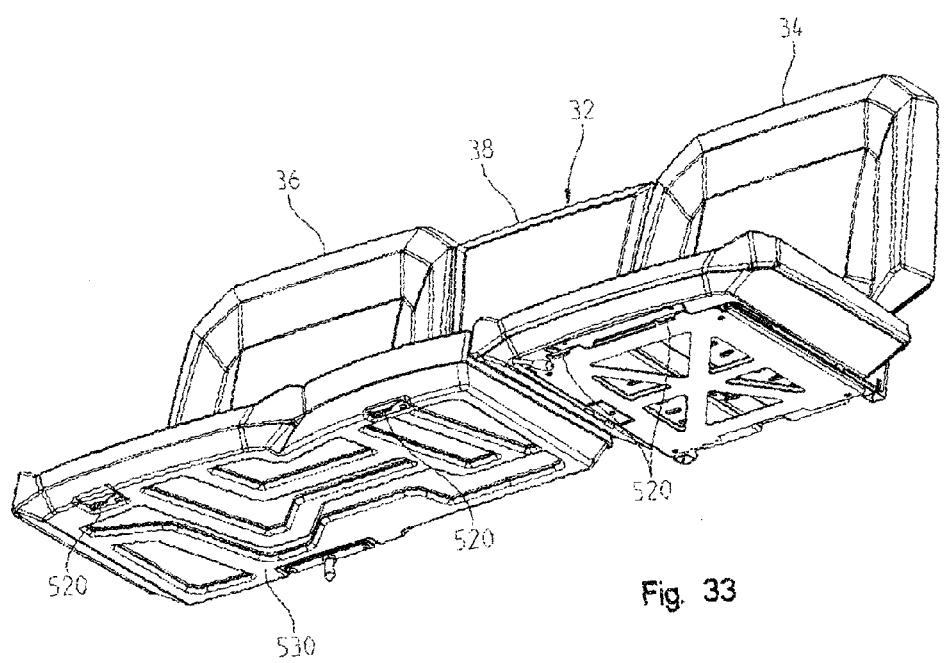
FIG. 33 is an underside perspective view of the seating assembly removed from the vehicle.
Figure 34:
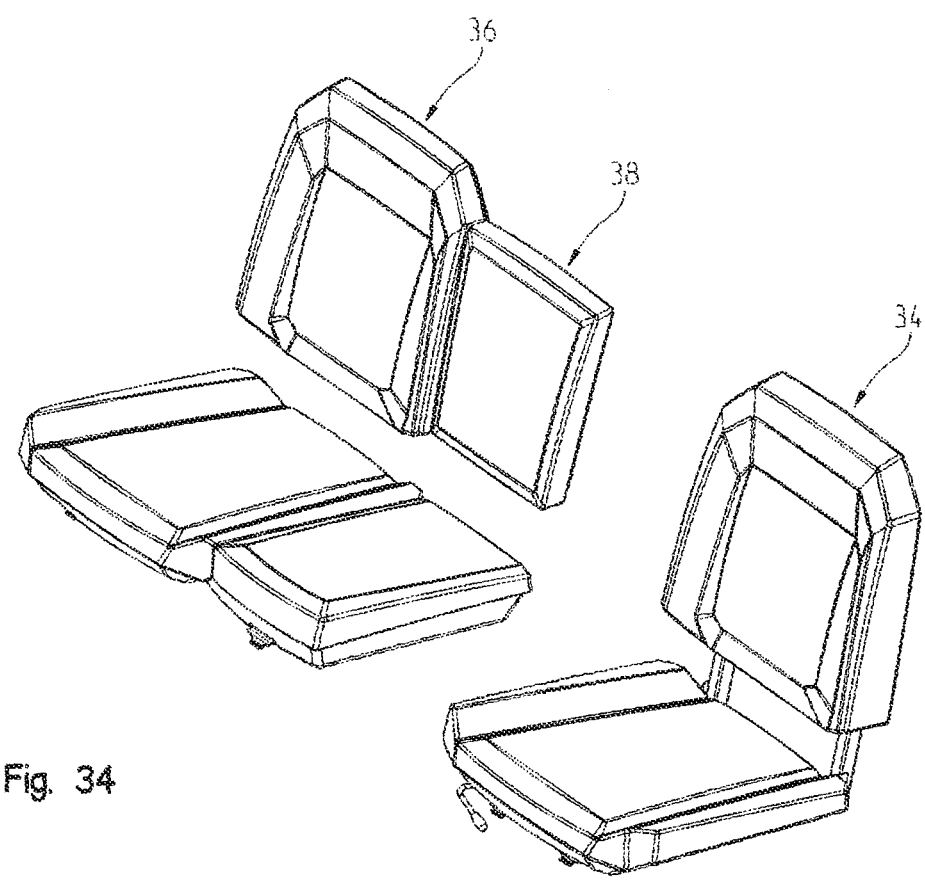
FIG. 34 shows the seating assembly of FIG. 33 exploded from one another.
Figure 35:
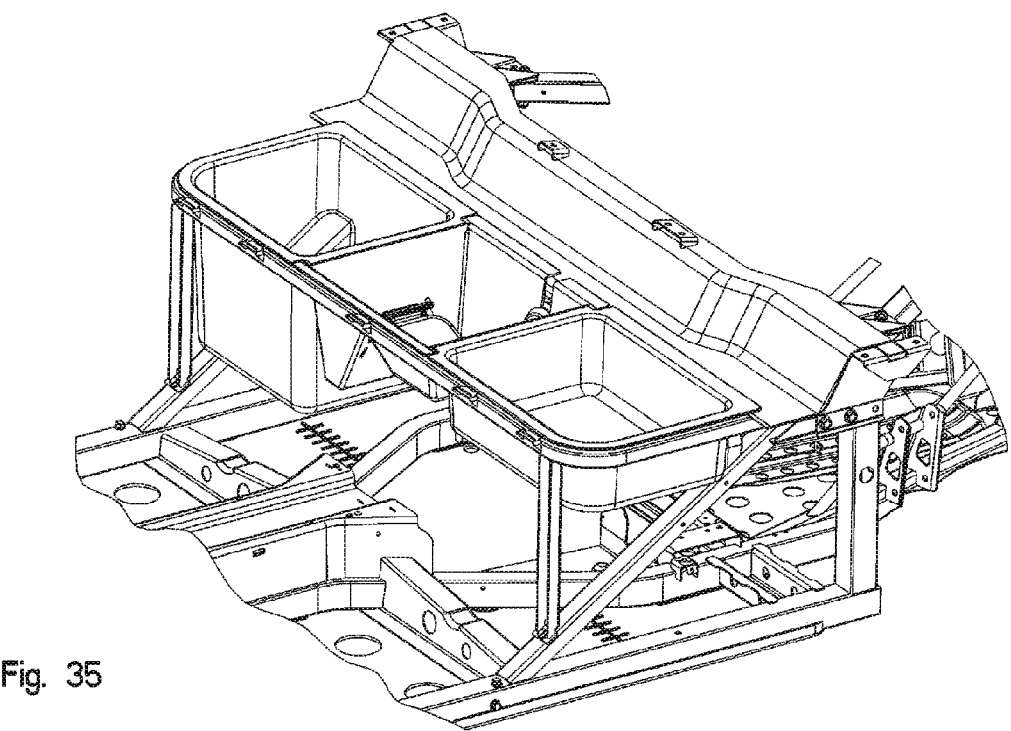
FIG. 35 shows the seat frame of the vehicle.
Figure 36:
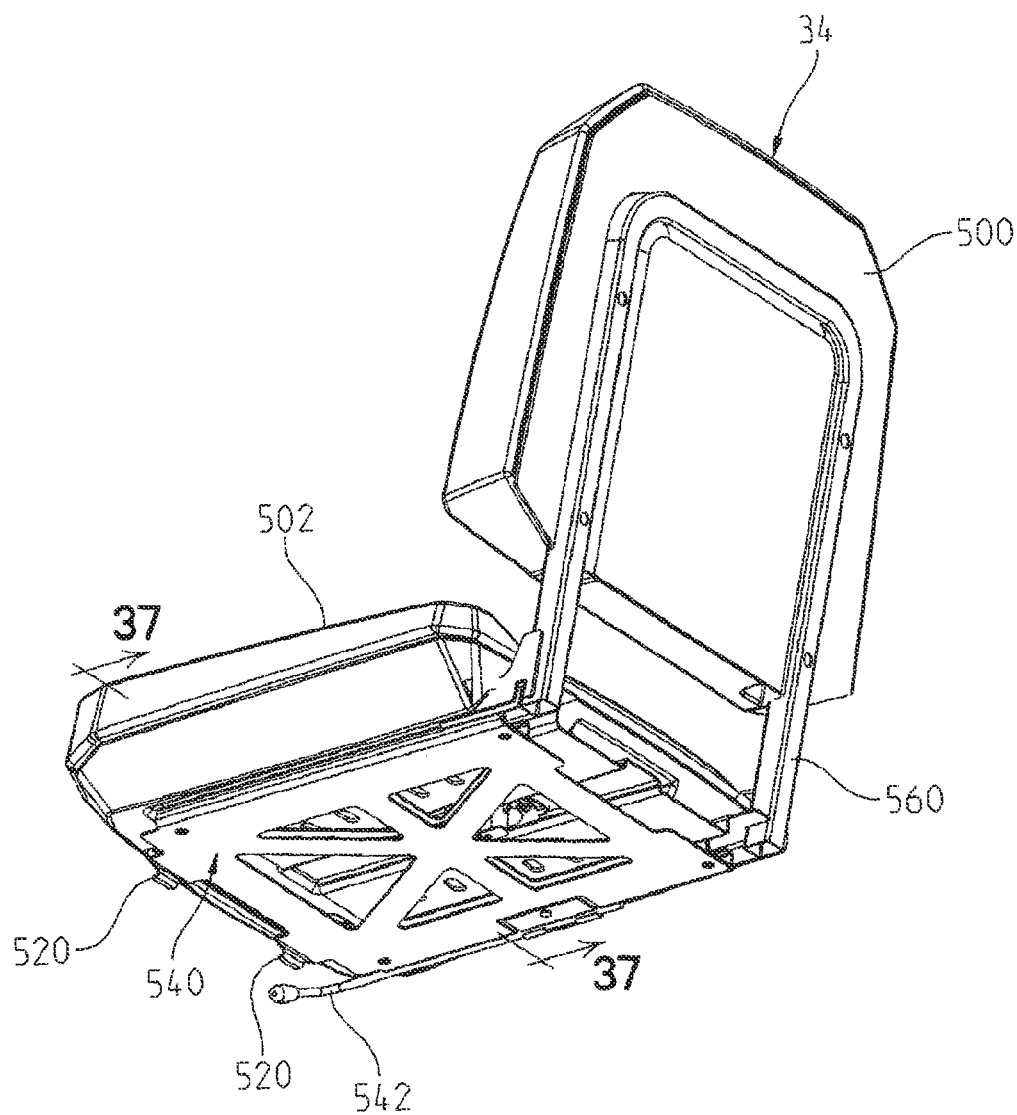
FIG. 36 shows an underside perspective view of the driver's seat.

As shown best in FIGS. 33, 34 and 36, the front edges of the seating assembly 32 include hooks 520 which are pivotally clipped into an opening 522 of a bracket 524 (FIG. 29), clipping the seat into the seat frame 90. It should be appreciated then that the seat can tip forward towards the steering wheel and/or the dash board of the vehicle for removal of the seats and for access to the storage bins under the seat.

As shown best in FIGS. 33 and 34, driver's seat 34 and the combined passenger seat 36 and center seat 38 are separate assemblies, although as detailed above, seating assembly 32 may include a single seat that combines driver's seat 34, passenger seat 36, and center seat 38. As shown, the passenger seat 36 and center seat 38 would include a lower structural frame 530 upon which the seat bottom would be constructed, and to which hooks 520 would be assembled or integrated.

Figure 37:
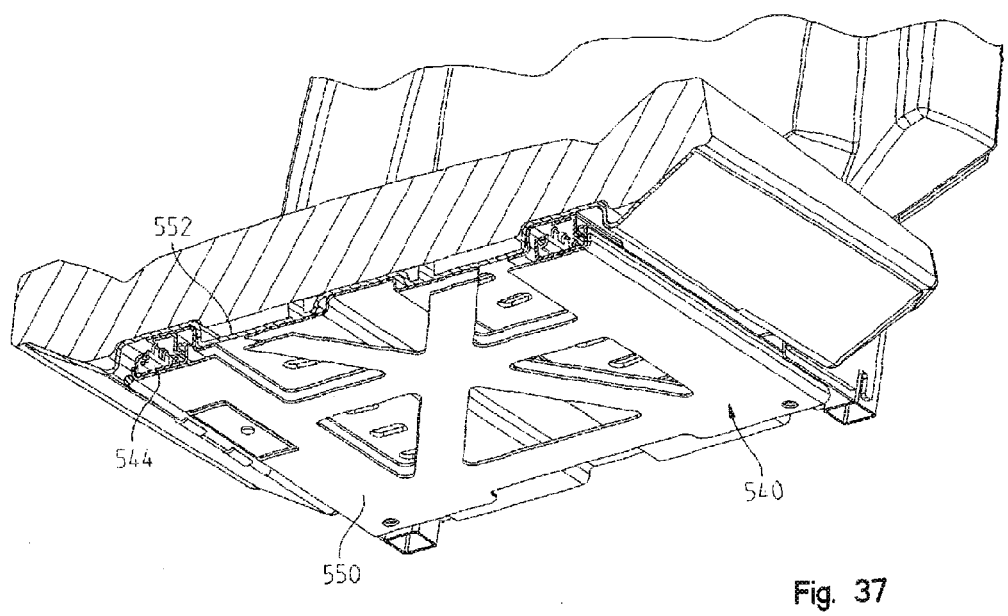
FIG. 37 shows a cross sectional view through lines 37-37 of FIG. 36.

As shown best in FIGS. 36 and 37, driver's seat 34 includes a lower slide assembly 540 to which hooks are provided. Seat 34 further includes an adjustment mechanism 542 as well as an inner slide track 544 (FIG. 37) allowing sliding movement between a lower track member 550 and an upper track member 552 of track assembly 540. Frame 560 of seat back 500 is attached to the lower track assembly 540, and thus when upper track portion 552 moves relative to lower track portion 550, seat back moves with seat bottom 502. Alternatively, passenger seat 36 and center seat 38 also may include a lower slide assembly to allow sliding movement of the seat. Other embodiments of seating assembly 32 may include a stationary seating assembly that remains fixed in a specified position.

While the power source of the present disclosure is shown as a combustion engine, illustratively a combustion engine, the engine could also take on the form of a multi-fuel engine capable of utilizing various fuels. An exemplary multi-fuel engine capable of utilizing various fuels is disclosed in U.S. patent application Ser. No. 11/445,731, filed Jun. 2, 2006, (and corresponding PCT Patent Application No. PCT/US07/70220), the disclosure of which is expressly incorporated by reference herein. In another embodiment, the power source could be a hybrid electric engine. In another embodiment, the power source could be an electric engine, where the spacing under the seats is utilized for the battery packs. An illustrative electric vehicle is shown in any one of assignee's U.S. patent application Ser. No. 12/484,921 filed Jun. 15, 2009 (and corresponding PCT Patent Application No. PCT/US2010/38711), or U.S. patent application Ser. No. 12/816,004, filed Dec. 16, 2010, the subject matter of which is expressly incorporated by reference herein.

The vehicle could also include a range extender of the type disclosed in U.S. patent application Ser. No. 12/928,479 filed Dec. 13, 2010 (and corresponding PCT Patent Application No. PCT/US2010/049167), the subject matter of which is expressly incorporated by reference herein.

Figure 38:
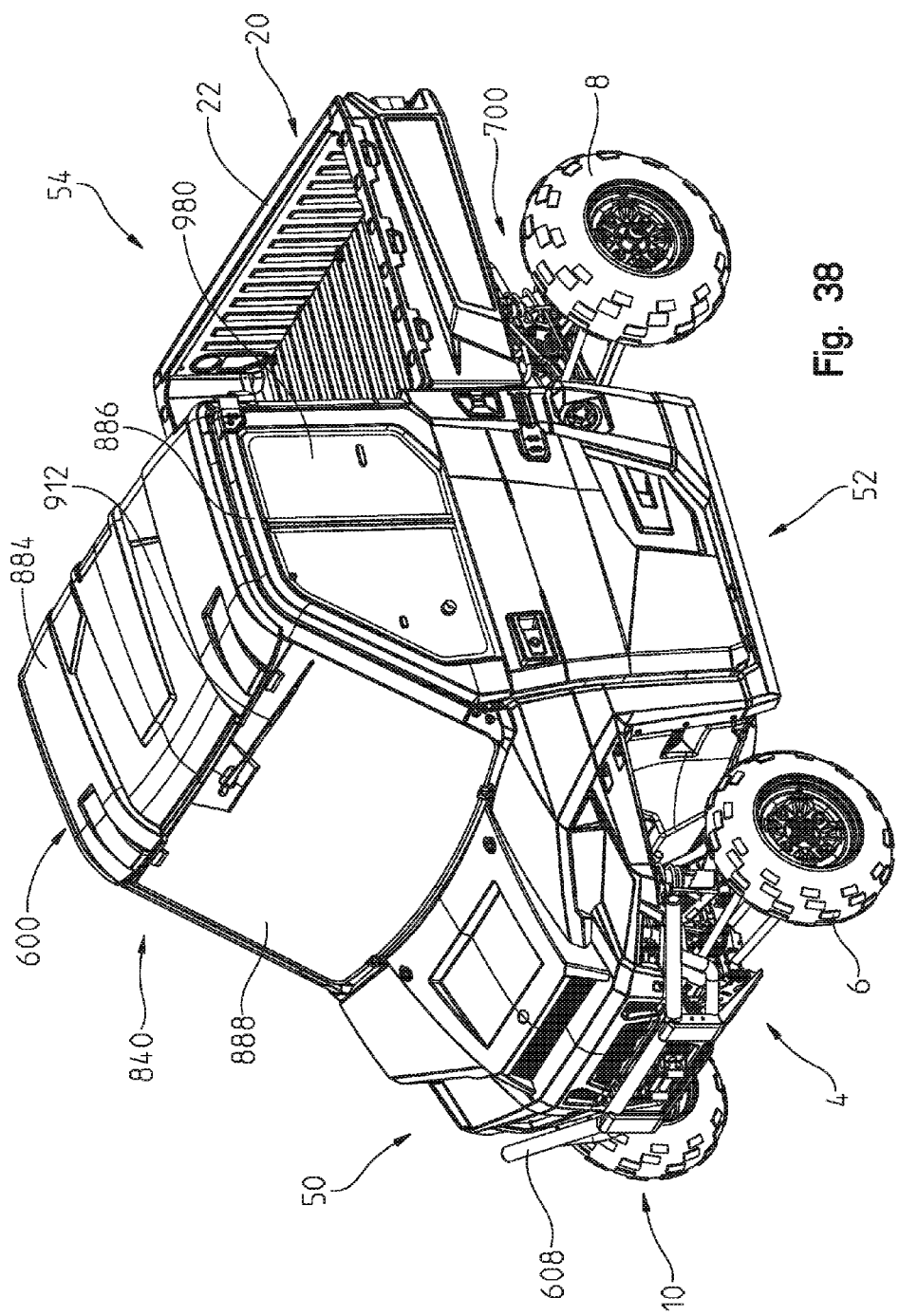
FIG. 38 is a front perspective view of an alternative embodiment vehicle of the present disclosure.
Figure 39:
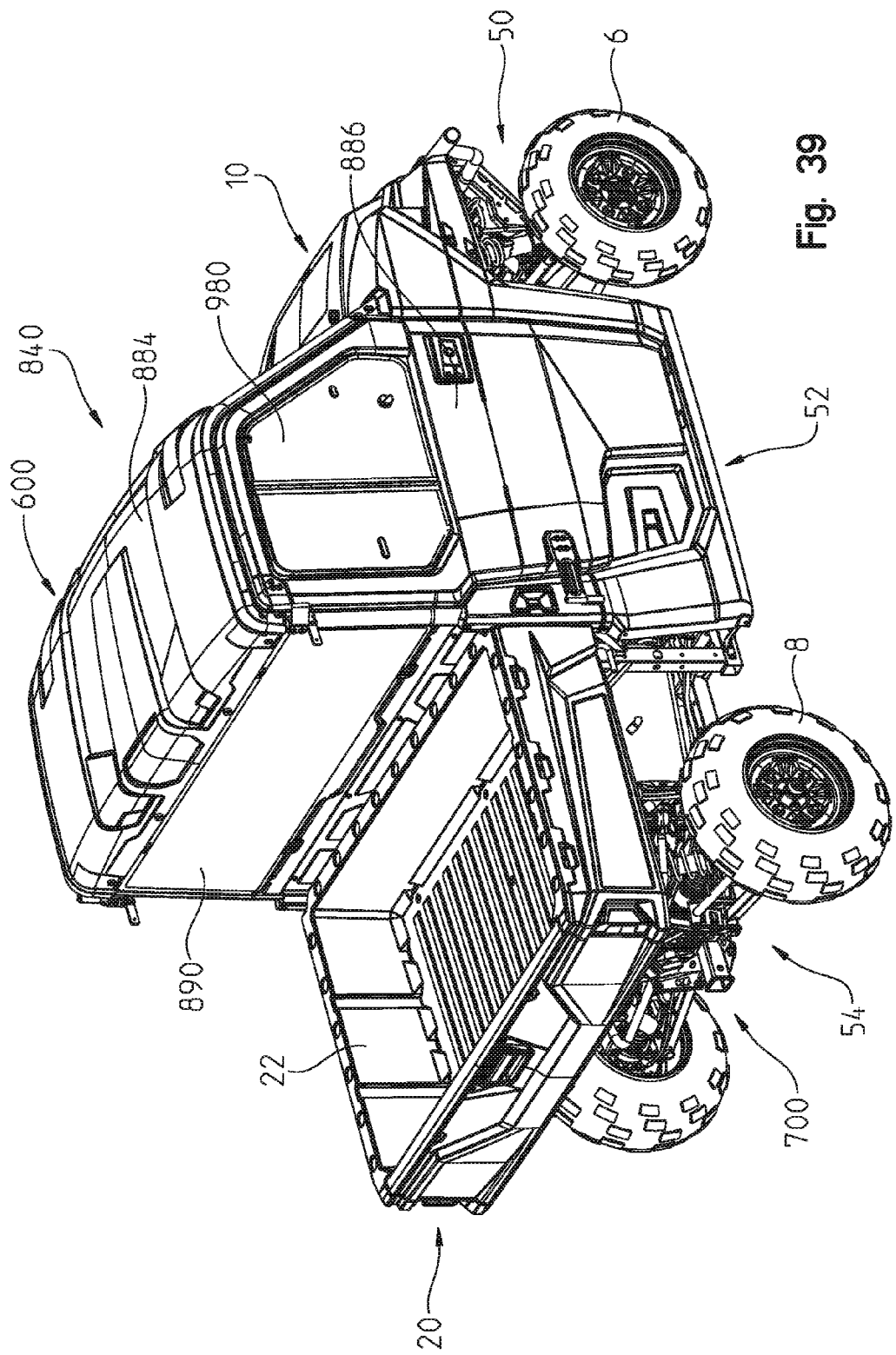
FIG. 39 is a rear perspective view of the vehicle of FIG. 38.
Figure 99:
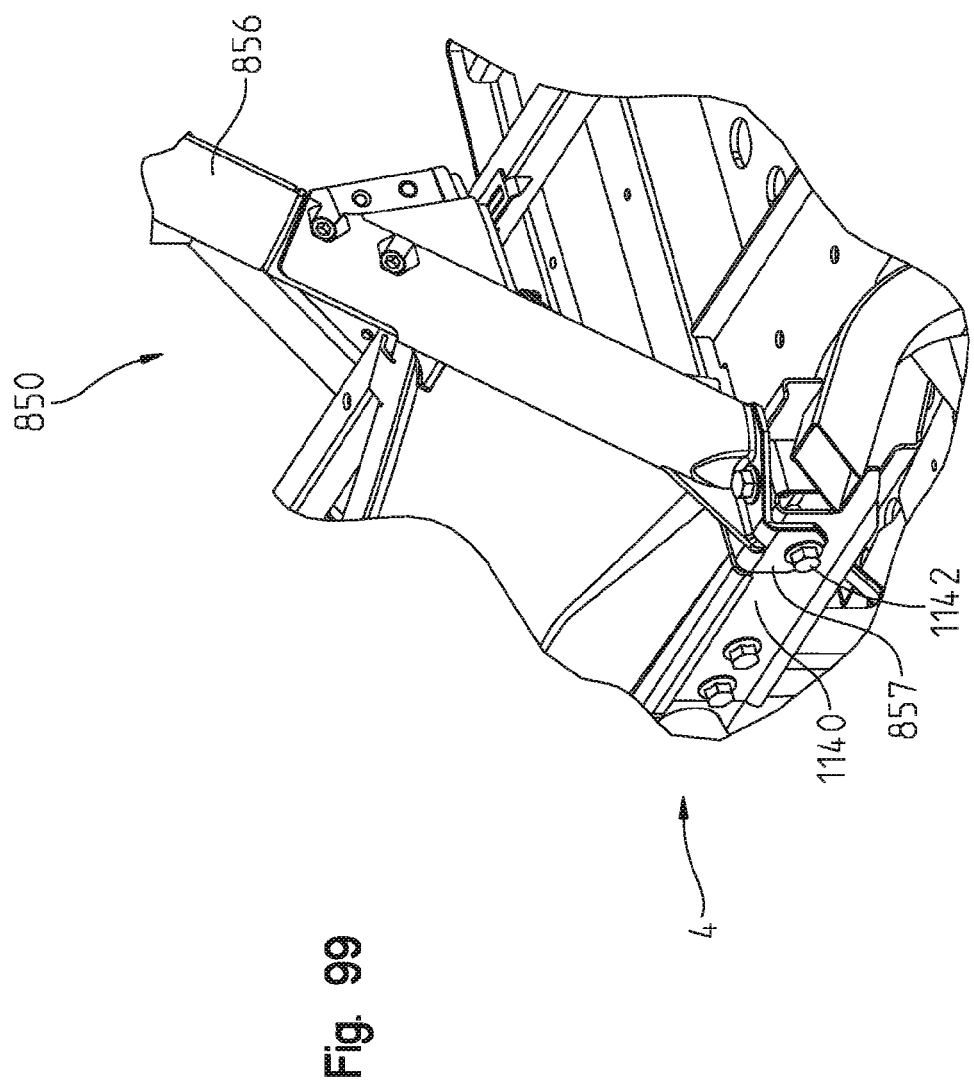
FIG. 99 is a detailed view of the roll cage and the frame of FIG. 96.

Referring to FIGS. 38-99, an alternative embodiment of the present disclosure is shown. Utility vehicle 600 may alternatively include an enclosed cab 840, having a roof 884, doors 886, a front windshield 888, and a rear panel, illustratively a rear windshield 890. Utility vehicle 600 of FIGS. 38-99 includes features similar to utility vehicle 2 of FIGS. 1-37, with like reference numerals indicating like elements having like functionality and structure, except as described below.

As shown in FIGS. 38-42, vehicle 600 includes frame 4 supported by front wheels 6 and rear wheels 8. Frame 4 also supports operator area 30 comprising driver's seat 34, passenger seat 36, and center passenger seat 38 (FIG. 1). Front end 10 of utility vehicle 600 is supported by front wheels 6 and may include a brush guard 608. Additionally, front end 10 supports the front suspension. Rear end 20 is supported by rear wheels 8 and illustratively includes cargo box 22. Additionally, rear end 20 supports a rear suspension 1102, as is detailed herein.

Figure 43:
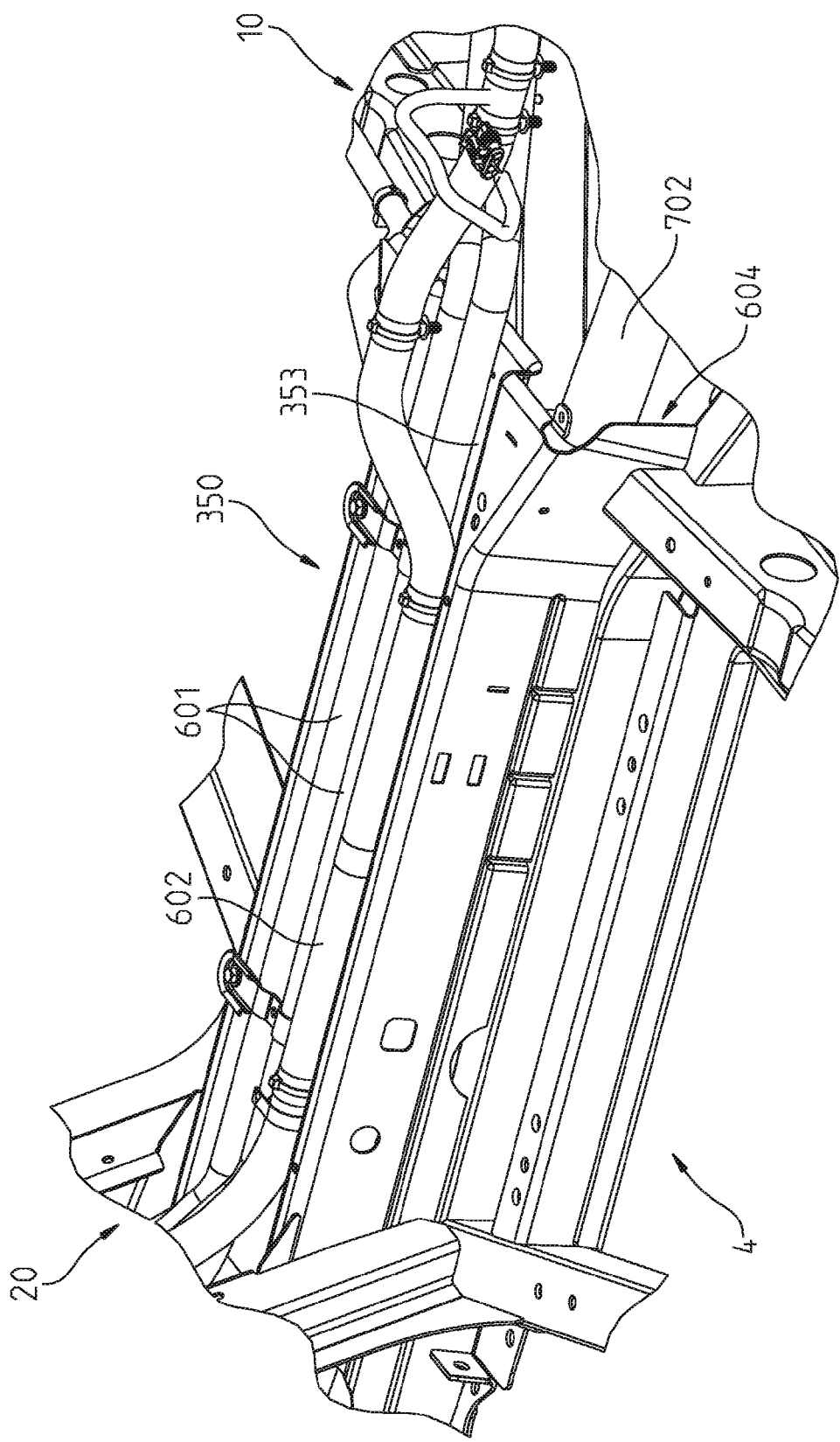
FIG. 43 is a front perspective view of a channel member of the frame of the vehicle of FIG. 38.
Figure 44:
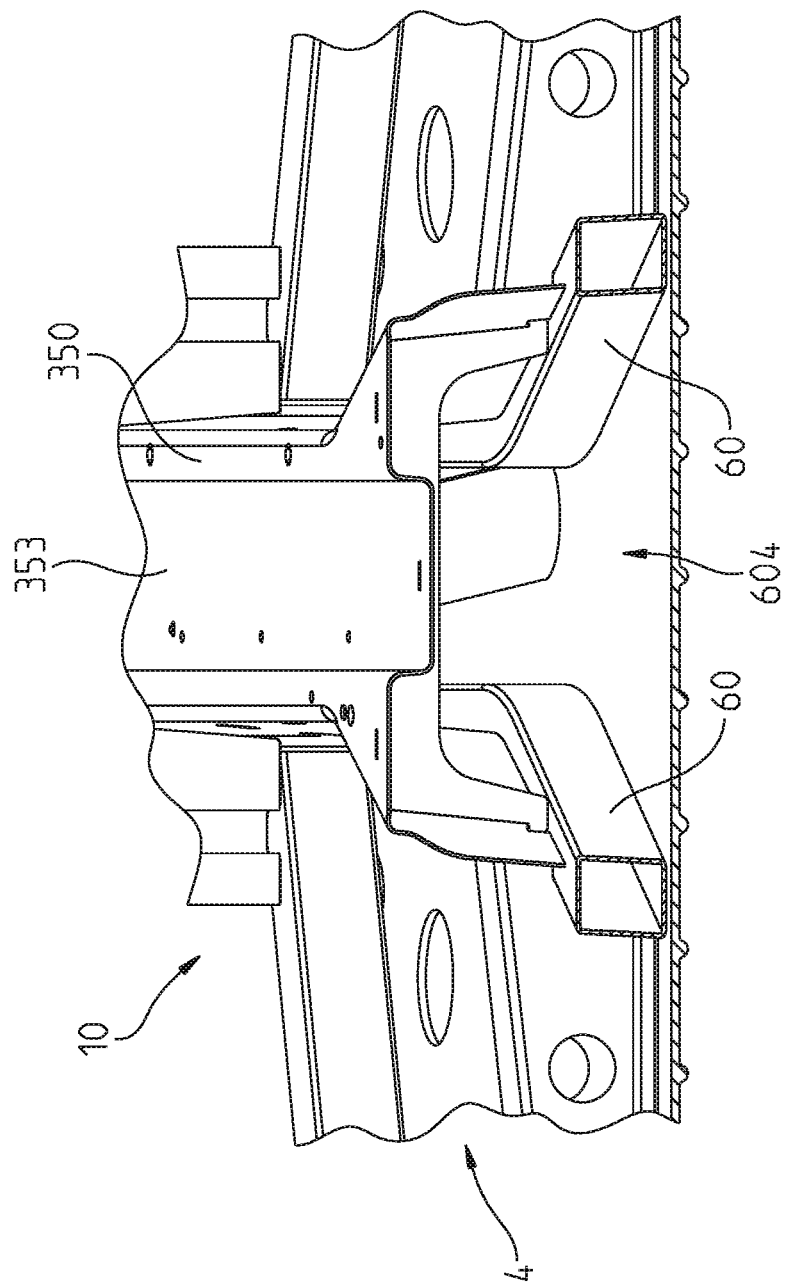
FIG. 44 is a front perspective view of the channel member of FIG. 44.
Figure 45:
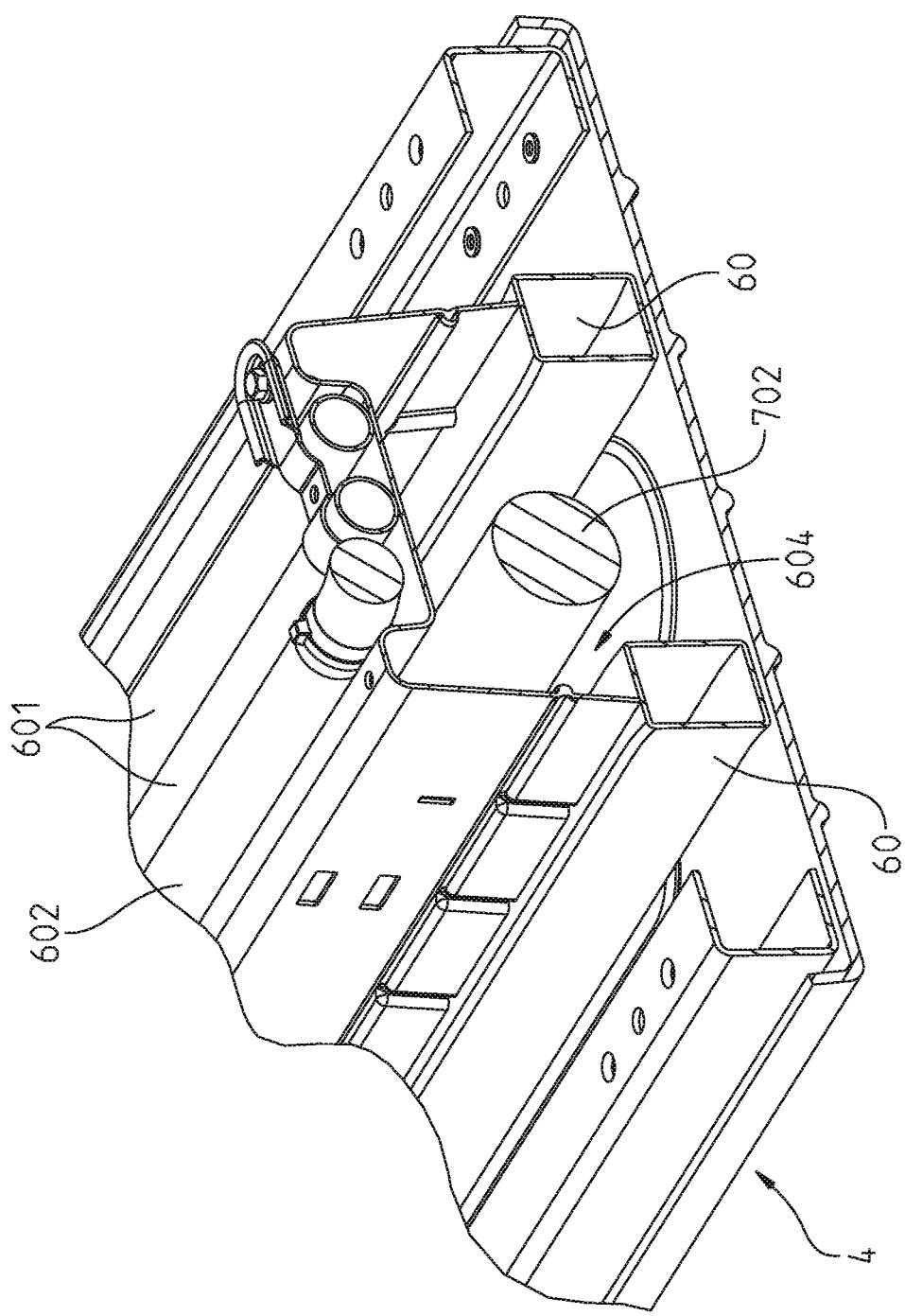
FIG. 45 is a front perspective view of the channel member of FIG. 44 supporting a plurality of lines and positioned above a drive shaft.

With reference now to FIGS. 43-45, frame 4 will be described in greater detail. As with utility vehicle 2 of FIGS. 1-37, frame 4 of utility vehicle 600 includes front portion 50, mid portion 52, and rear portion 54. As shown in FIG. 43, frame 4 includes channel member 350 centrally positioned on utility vehicle 600. In particular, illustrative channel member 350 generally extends from front portion 50 to rear portion 54. Channel member 350 may be coupled to central frame tubes 60 through conventional means (e.g., welds, bolts, rivets), as best shown in FIG. 44. Channel member 350 generally extends along longitudinal axis L of utility vehicle 600 to provide rigidity and stiffness to frame 4. For example, channel member 350 may increase the bending stiffness of frame 4. Additionally, channel member 350 may cooperate with shear plate 354 (FIG. 3) to increase the torsional stiffness or rigidity of frame 4.

Referring to FIG. 45, illustrative channel member 350 is elevated or raised relative to floor board 300 (FIG. 57) to define an opening or tunnel 604. Tunnel 604 may house a portion of a drive shaft 702 of a powertrain assembly 700. Due to the raised configuration of channel member 350, tunnel 604 may be configured to accommodate drive shafts with larger diameters.

With reference to FIGS. 44 and 45, channel member 350 further includes recessed passageway 353 for receiving other components of utility vehicle 600. In particular, components extending from front end 10 to rear end 20 of utility vehicle 600, such as a wiring harness (lighting, electronic throttle control wiring, etc), cooling tubes, brake lines, and other auxiliary lines or components, etc., may be seated in passageway 353. Illustratively, passageway 353 supports at least one electrical connector or line 601 and/or at least one fluid connector or line 602. For example, lines 601 may be used to provide air flow from front end 10 to rear end 20 of utility vehicle 600 to increase venting and cooling of powertrain assembly 700. Lines 601, 602 may be coupled to channel member 350 with conventional fasteners. It may be appreciated that channel member 350 separates components of utility vehicle 600, for example illustrative channel member 350 separates drive shaft 702 from lines 601, 602.

Figure 57:
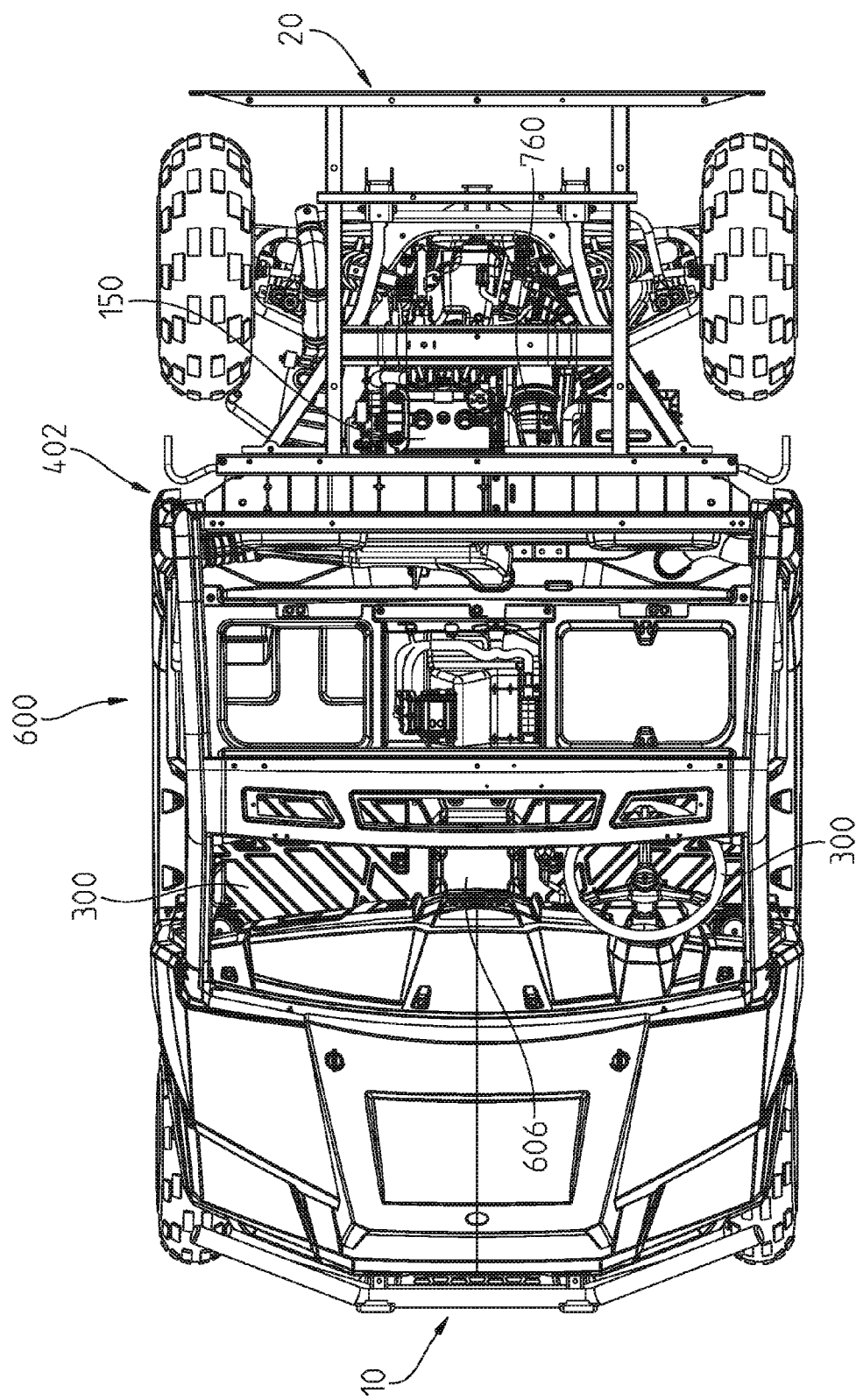
FIG. 57 is a top view of the vehicle of FIG. 38 with the front windshield, doors, and roof removed.

Additionally, floor board 300 (FIG. 57) may be positioned over channel member 350 and lines 601, 602 in order to cover channel member 350 and lines 601, 602. Alternatively, floor board 300 may include an access panel 606, which may pivot or be removed in order to access channel member 350 and lines 601, 602, as shown in FIG. 57.

Figure 46:
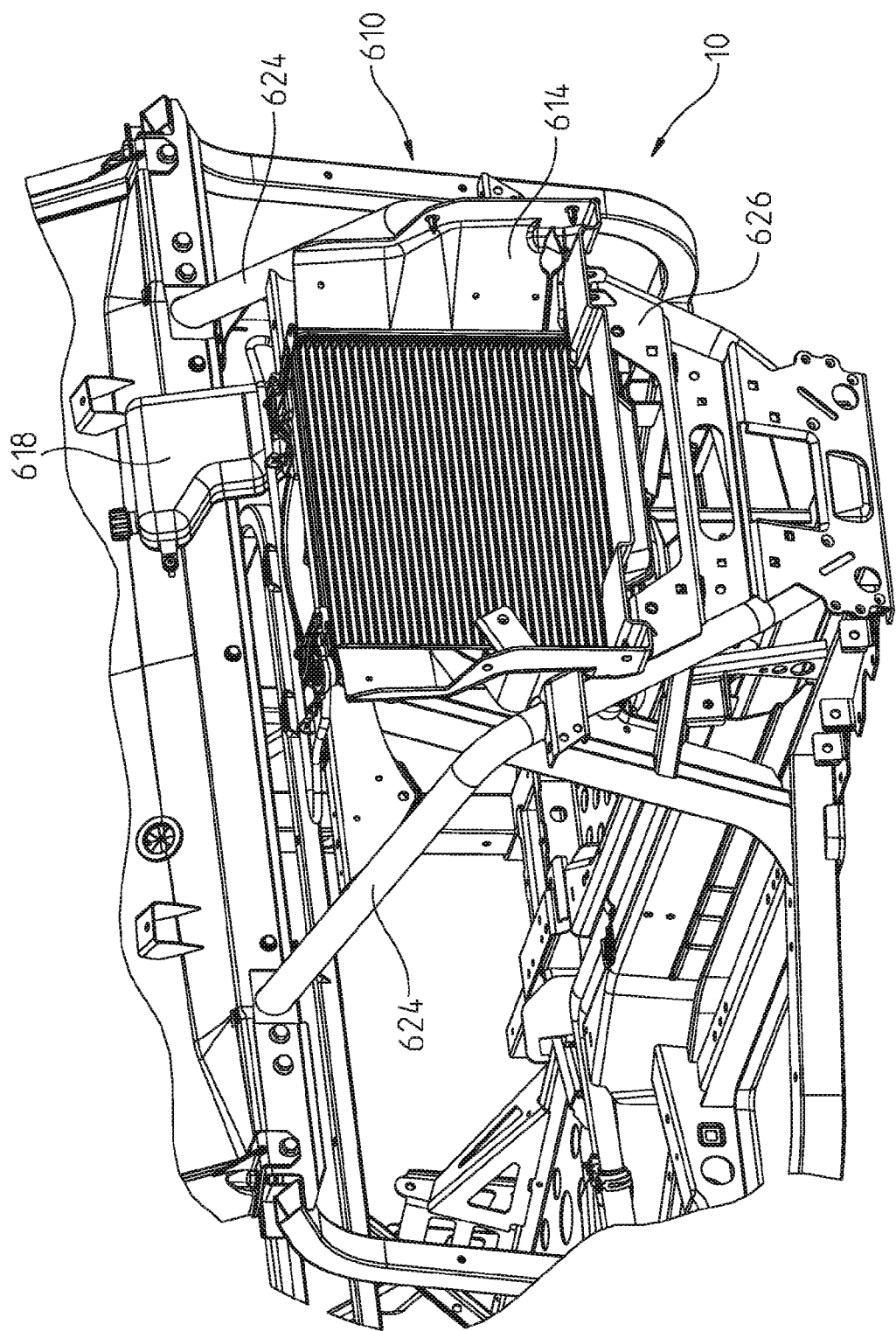
FIG. 46 is a front perspective view of a radiator assembly of the vehicle of FIG. 38.
Figure 47:
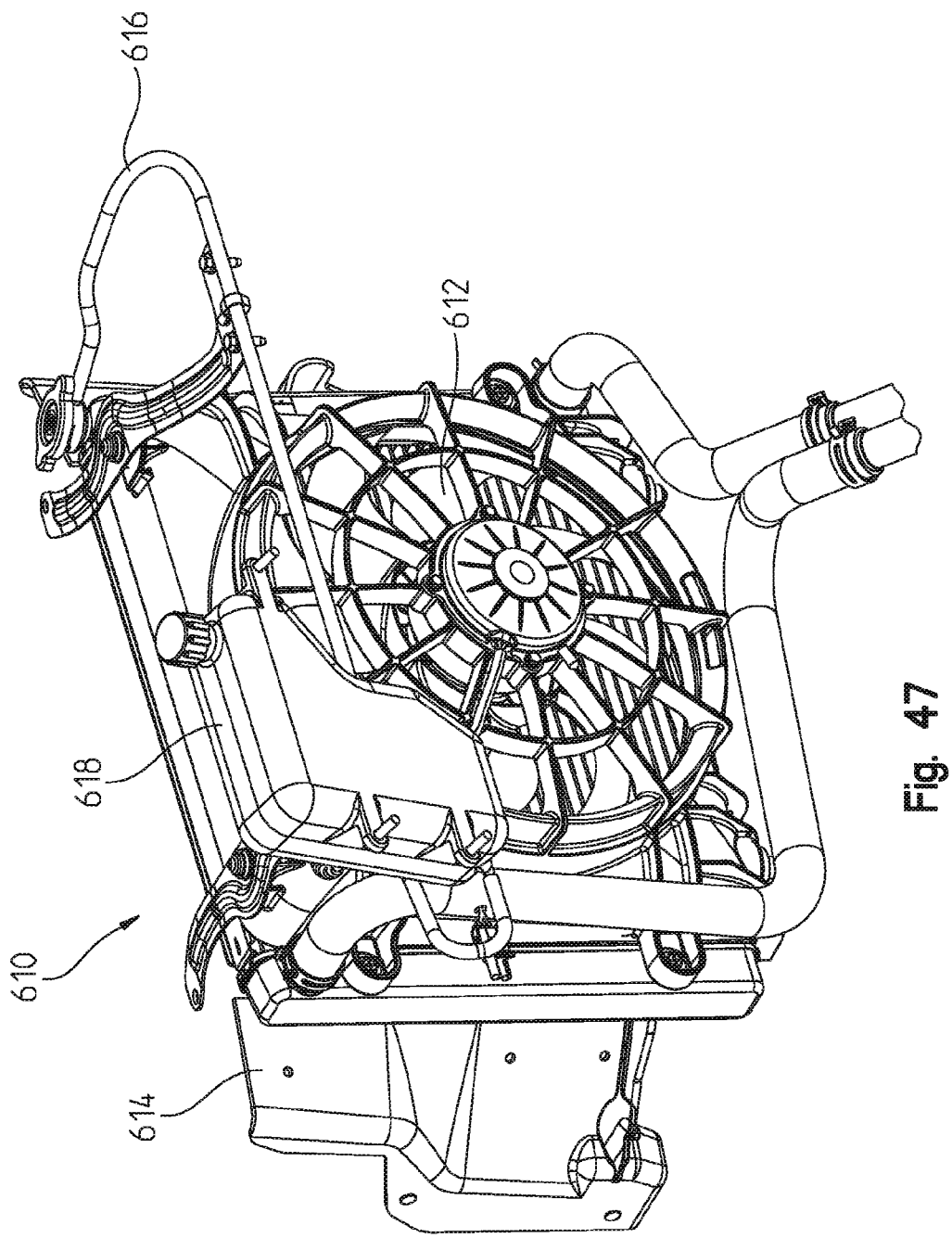
FIG. 47 is a rear perspective view of the radiator assembly of FIG. 46.
Figure 48:
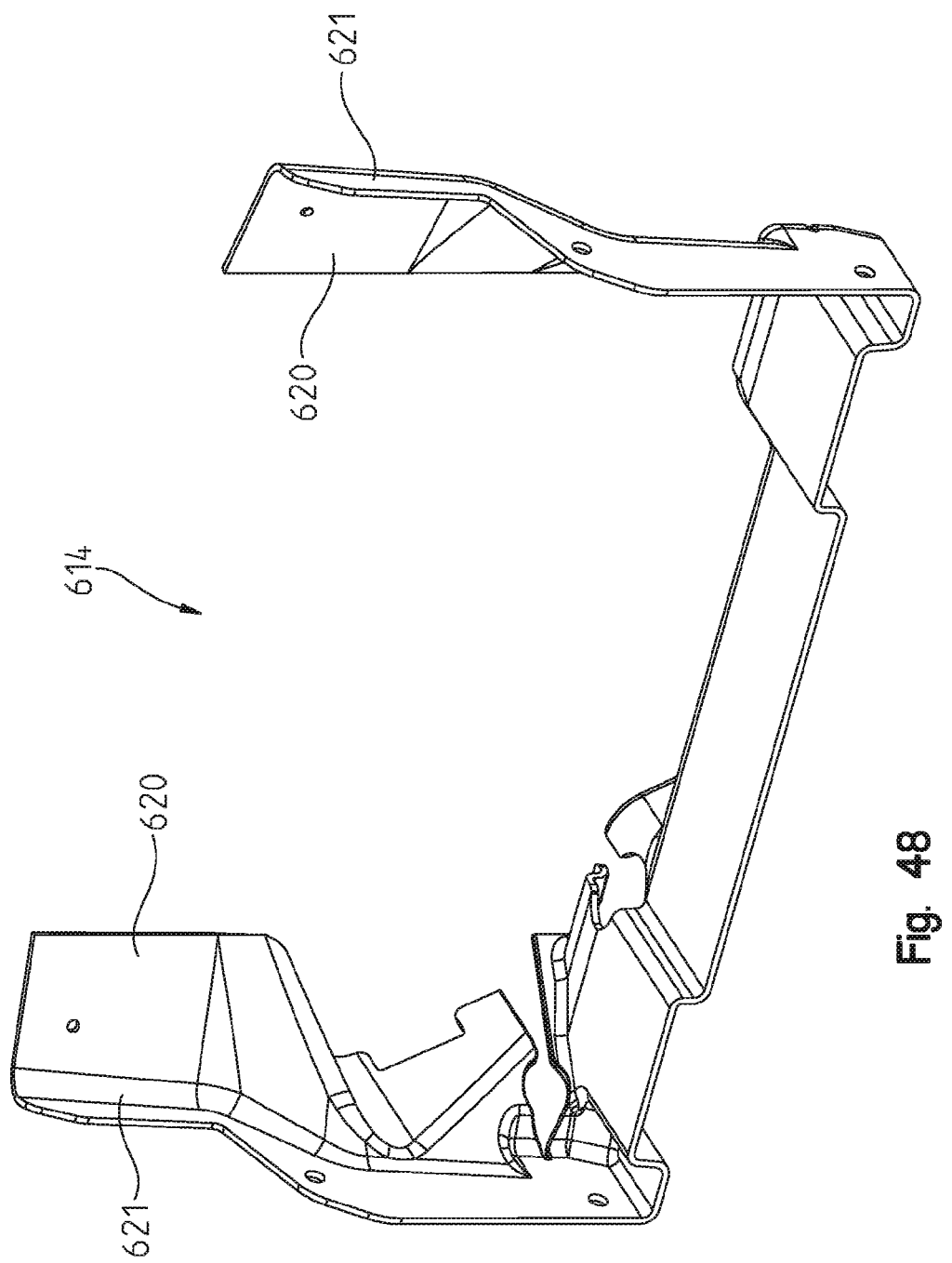
FIG. 48 is a front perspective view of a radiator shroud of the radiator assembly.

Referring to FIGS. 46-48, utility vehicle 600 may include a radiator assembly 610, including a fan 612, a radiator shroud 614, and a coolant supply line 616 coupled to a coolant supply, illustratively a bottle 618. Radiator assembly 610 may be coupled to frame tubes 624 and/or chassis panel 626 at front portion 50 of frame 4 with conventional couplers (not shown).

Radiator shroud 614 extends in forward direction relative to fan 612, as shown in FIGS. 46 and 47. As such, radiator shroud 614 may facilitate air flow in the direction of fan 612, thereby increasing the air flowing into radiator assembly 610. In particular, illustrative radiator shroud 614 is comprised of generally flat portions 620 and corner portions 621. Corner portions 621 may provide a hinging function, for example corner portions 621 may be a living hinge, as best shown in FIG. 48. Corner portions 621 fold, bend, or otherwise move to angle flat portions 620 toward fan 612. As shown in FIG. 48, radiator shroud 614 generally has an illustrative U-shape. Radiator assembly 610 may be coupled with cooling lines 602 (FIG. 47) to cool the components of utility vehicle 600.

Figure 49:
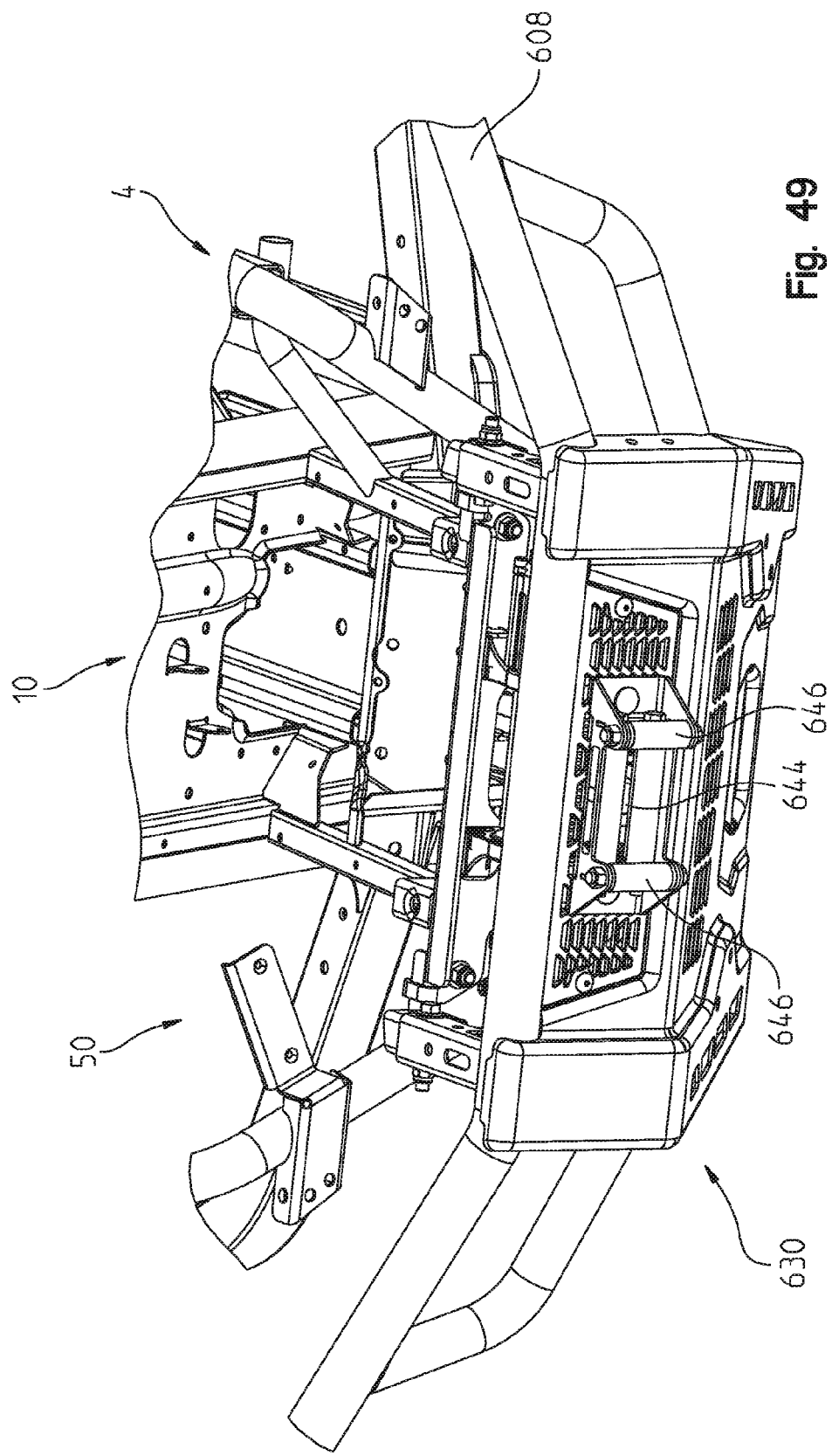
FIG. 49 is a front perspective view of a winch assembly of the vehicle of FIG. 38.
Figure 50:
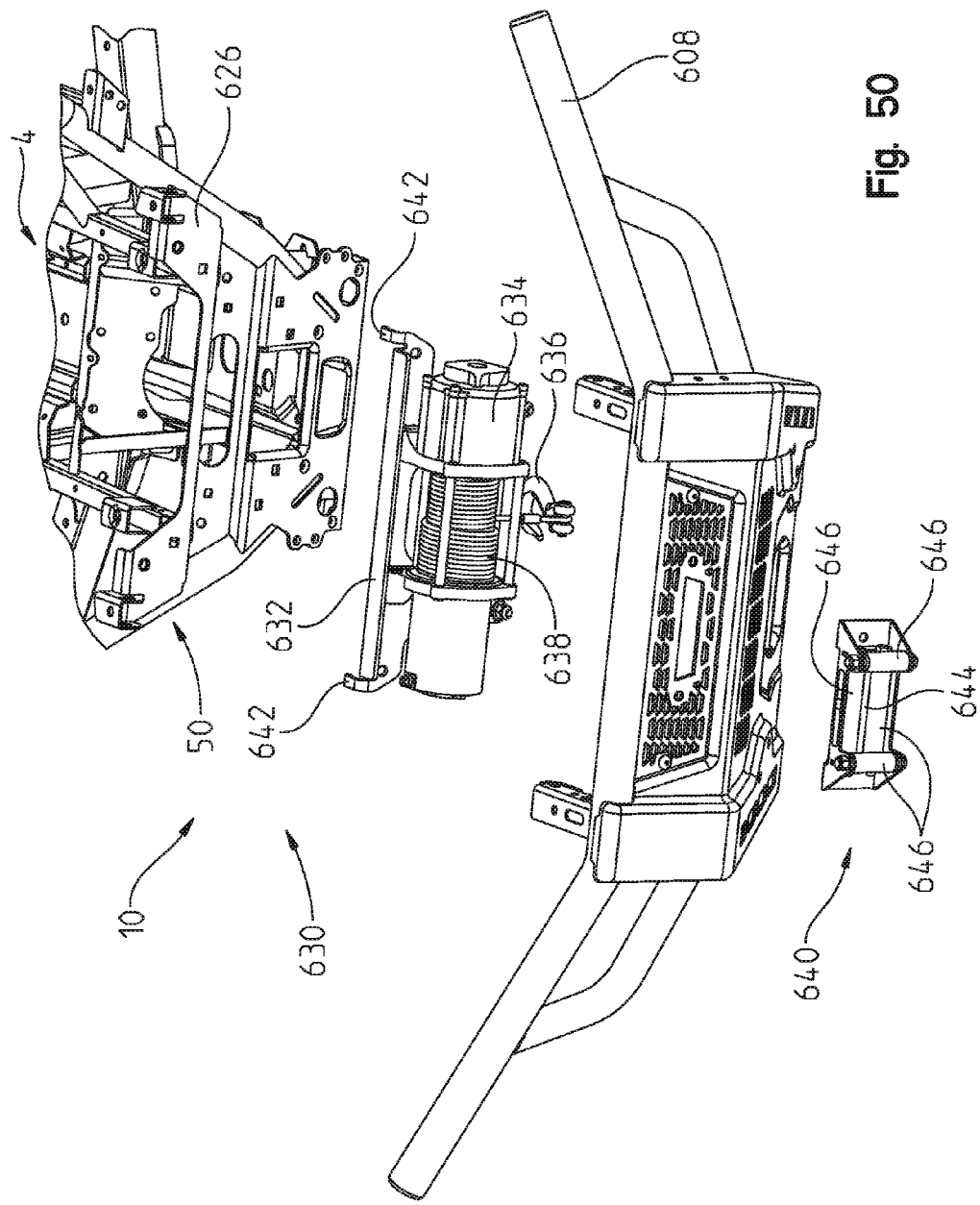
FIG. 50 is a front exploded view of the winch assembly of FIG. 49.
Figure 51:
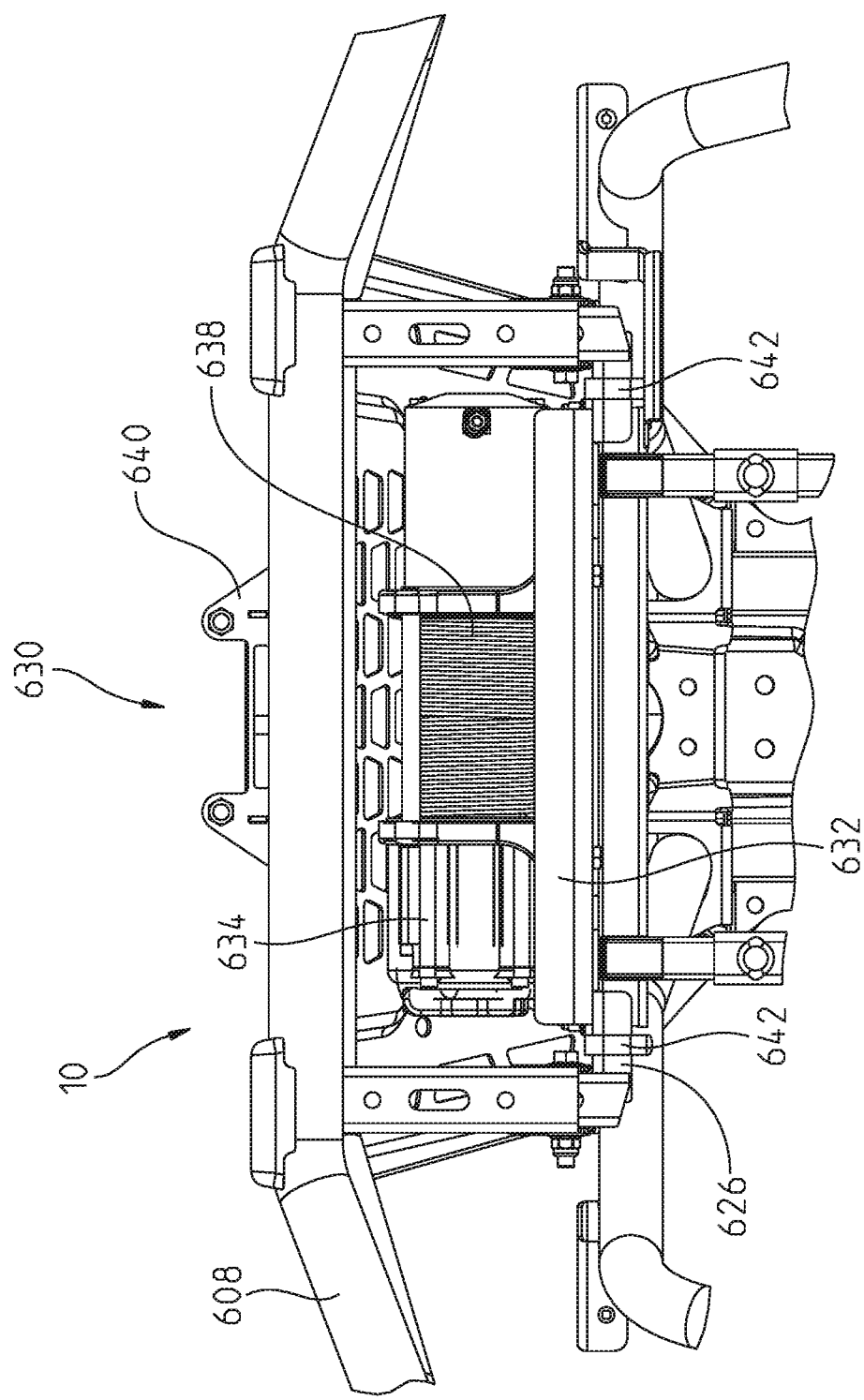
FIG. 51 is a top plan view of the winch assembly of FIG. 49.

With respect to FIGS. 49-51, a winch assembly 630 also may be positioned at front end 10 of utility vehicle 600 and is illustratively positioned generally below radiator assembly 610. Winch assembly 630 may be coupled to chassis panel 626 with conventional fasteners (not shown). Chassis panel 626 may be stamped in order to facilitate coupling between winch assembly 630 and front end 10 of utility vehicle 100. Referring to FIGS. 50 and 51, winch assembly 630 includes a bracket 632, a winch device 634 having a latching member 636, illustratively a hook, a cable 638, and a guide member 640.

Bracket 632 is coupled to chassis panel 626 to support winch device 634. Chassis panel 626 is configured to support bracket 632 without the use of fasteners during installation of winch assembly 630. More particularly, illustrative bracket 632 includes ears 642 that engage with a top surface of chassis plate 626 and bend rearwardly over the top surface of chassis plate 626. In this way, ears 642 support bracket 632 on chassis plate 626 when winch assembly 630 is being coupled to front portion 50 of frame 4 with conventional couplers (not shown), such as bolts or welds. As such, it is not necessary to hold bracket 632 and winch device 634 during installation.

Brush guard 608 also may be mounted to chassis plate 626 at front end 10 of utility vehicle 600. Guide member 640 illustratively is coupled to brush guard 608 with conventional fasteners. As shown in FIG. 51, guide member 640 extends from front end 10 of utility vehicle 600. Referring now to FIGS. 49 and 50, guide member 640 includes an aperture 644 and rollers 646 positioned along each side of aperture 644. Illustratively, aperture 644 is rectangular and rollers 646 are positioned along each of the four sides of aperture 644. In use, latching member 636 and cable 638 may extend through aperture 644 and rollers 646 prevent damage to brush guard 608 and cable 638 when winch assembly 630 is in use.

Referring to FIGS. 52-56, illustrative utility vehicle 600 also includes a powertrain assembly 700 operably coupled to front wheels 6 and/or rear wheels 8. Powertrain assembly 700 includes engine 150 (FIG. 57) and a transmission. As is further detailed herein and best shown in FIG. 52, the transmission may be a continuously variable transmission ("CVT") 704 positioned rearward of rear roll cage portion 854.

Figure 53:
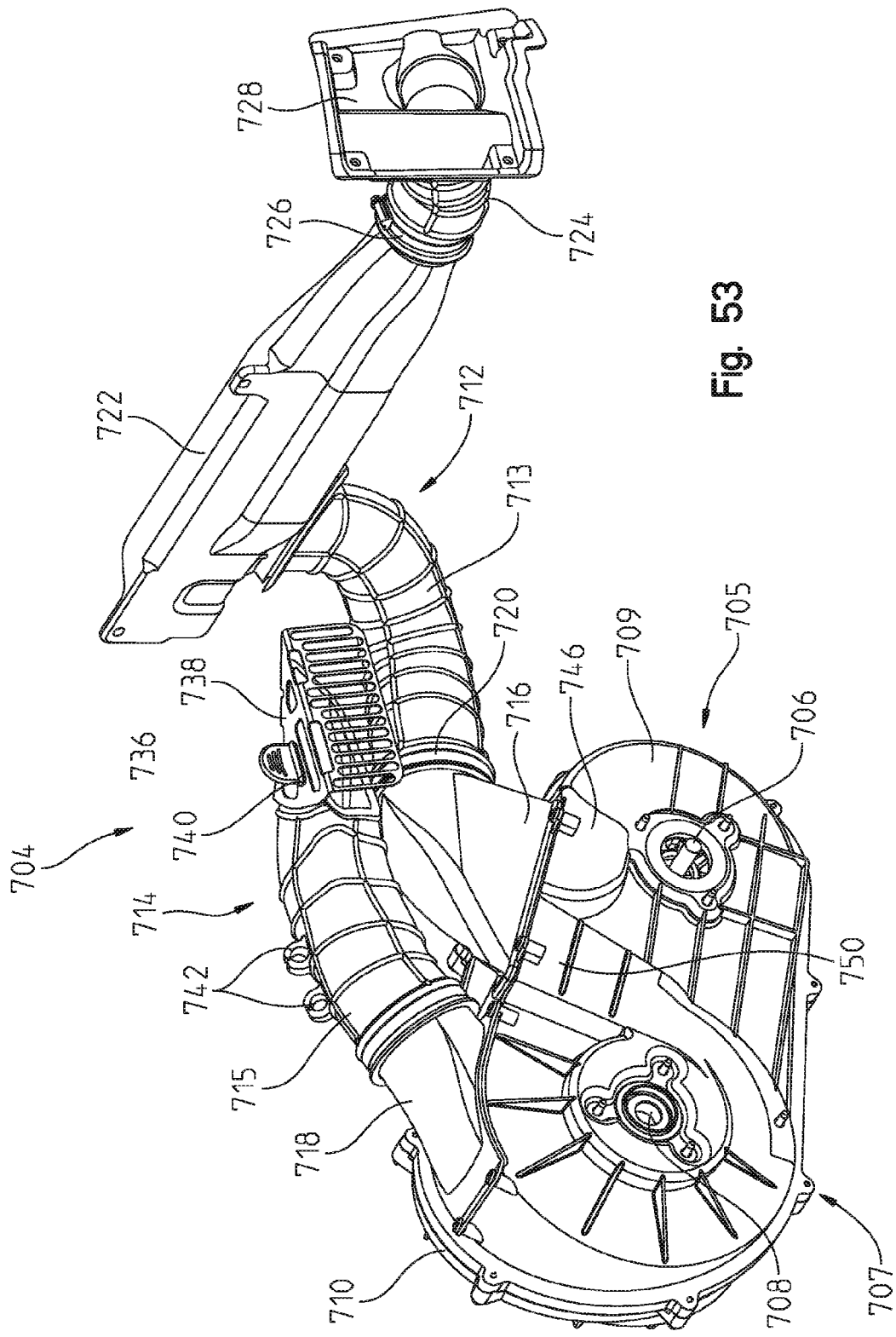
FIG. 53 is a rear perspective view of a continuously variable transmission ("CVT") of the powertrain assembly of FIG. 52.

As shown in FIG. 53, illustrative CVT 704 includes a drive side 705 having a drive pulley assembly 706, a driven side 707 having a driven pulley assembly 708, and a belt (not shown) extending therebetween supported in a housing 709. Housing 709 of CVT 704 couples with a cover 710 to house pulley assemblies 706, 708. A clutch air intake system 712 and a clutch exhaust system 714 are included on CVT 704. Clutch air intake system 712 provides air to both drive pulley assembly 706 and driven pulley assembly 708, and the air exits CVT 704 through clutch exhaust system 714.

Figure 52:
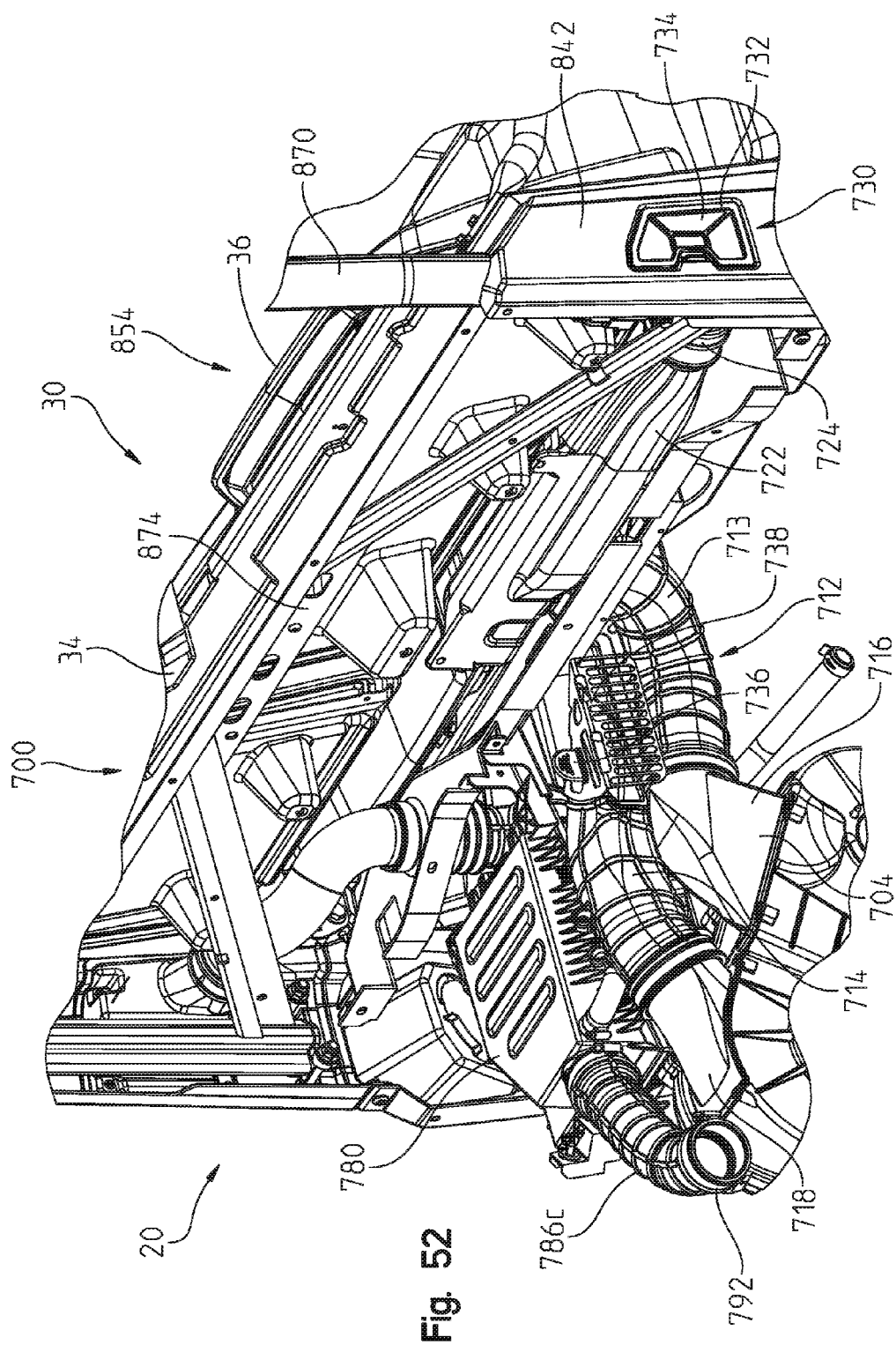
FIG. 52 is a rear perspective view of a rear portion of the vehicle of FIG. 38, illustrating a powertrain assembly.

Clutch air intake system 712 is illustratively positioned rearward of passenger seat 36 and upright portion 870 of rear roll cage portion 854 (FIG. 52). Referring to FIGS. 53-56, clutch air intake system 712 includes an air intake tube 713 removably coupled to an inlet port 716 with fasteners 720. Inlet port 716 may be divided into various channels, for example inlet channels 746 and 750, as is further detailed herein. Illustratively, inlet channels 746, 750 are angled away from each other and form a "Y" or "V" shape. Air intake tube 712 also is coupled to a first intake member 722, which may be supported on rear roll cage portion 854 (FIG. 52) with conventional fasteners (not shown). First intake member 722 may be comprised of a generally rigid material (e.g., high density polyethylene) and coupled to a second intake member 724 with a fastener 726. Additionally, second intake member 724 is illustratively coupled to a filter support member 728 and a filter cover 730. Illustrative air intake tube 713 and second intake member 722 are comprised of a flexible material.

As shown in FIG. 52, filter support member 728 (FIG. 53) may be coupled to a side panel 842 of cab 840 and is positioned rearward of rear roll cage portion 854. Filter cover 730 includes a frame portion 732 and filter portions 734. Filter portions 734 may be comprised of a mesh or other finely-woven material to provide a pre-filtering function for CVT 704. Frame portion 732 generally extends around each filter portion 734. Illustratively, filter cover 730 includes at least three filter portions 734.

Figure 54:
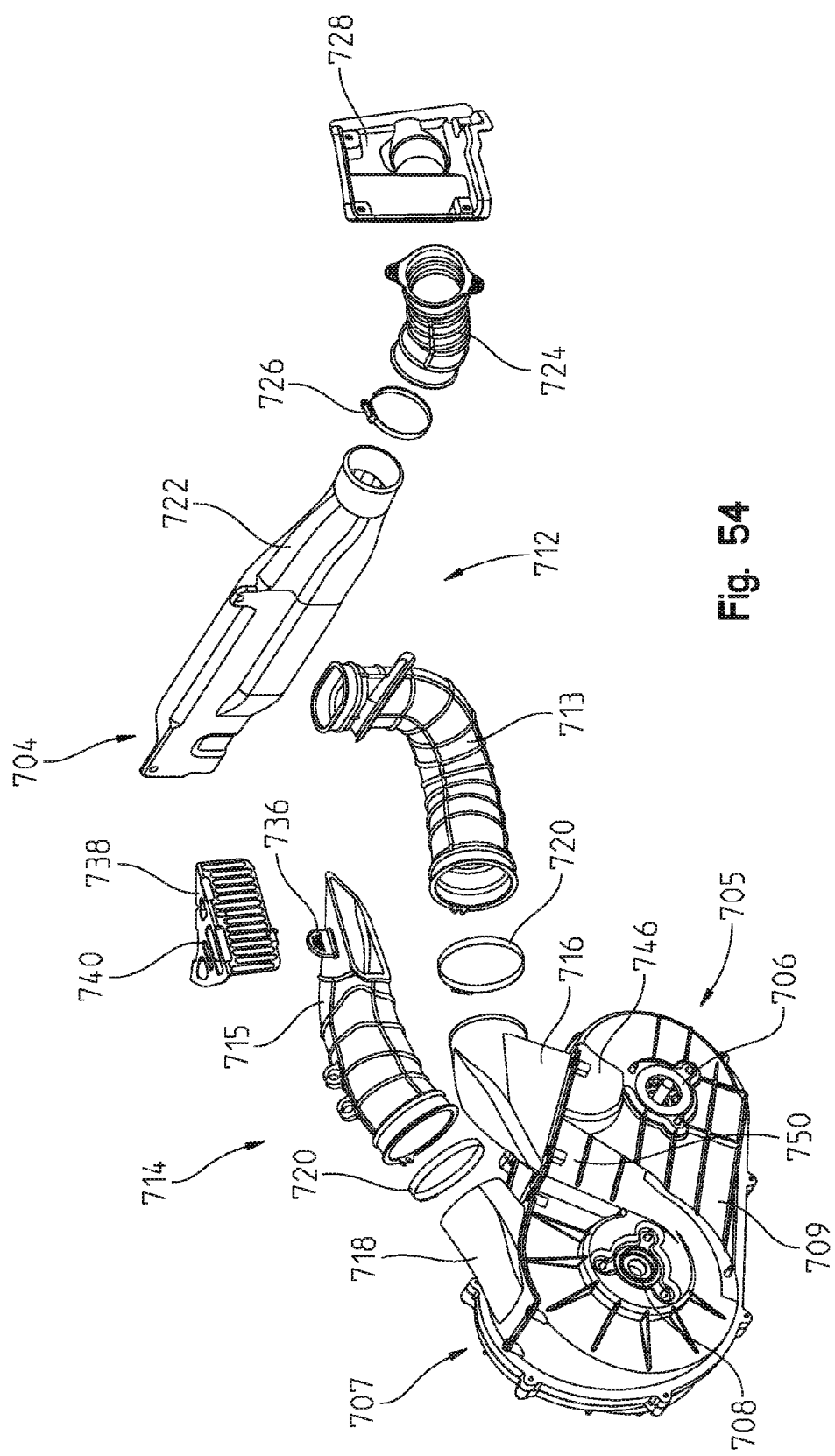
FIG. 54 is a rear exploded view of the CVT of FIG. 53.
Figure 55:
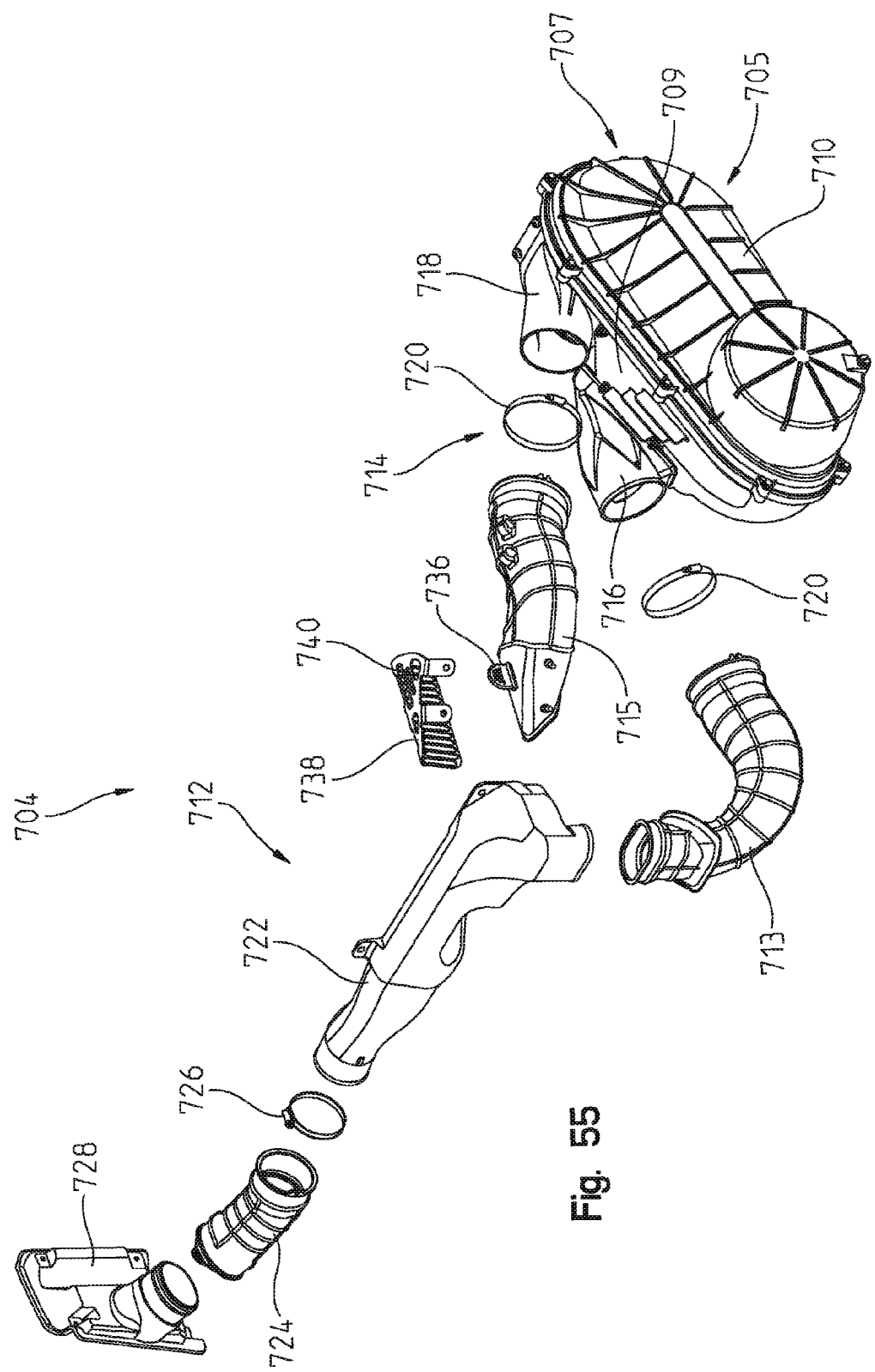
FIG. 55 is a further rear exploded view of the CVT.

Referring to FIGS. 54 and 55, clutch exhaust system 714 is positioned rearward of operator area 30 and includes a flexible exhaust tube 715 coupled to an exhaust port 718. Exhaust tube 715 includes a tab or support 736 that secures a catch filter 738 to exhaust tube 715. In particular, a top portion of catch filter 738 includes at least one opening 740 to receive tab 736. Catch filter 738 prevents debris from entering clutch exhaust system 714. Illustrative exhaust tube 715 further includes supports 742, which may stabilize wires or other lines at rear end 20 of vehicle 700.

Clutch air intake system 712 and clutch exhaust system 714 are modular systems comprised of multiple components removably coupled to each other. More particularly, air intake tube 713 is removably coupled to inlet port 716 and first intake member 722. Similarly, second intake member 724 is removably coupled to first intake member 722 and filter support member 728. Likewise, exhaust tube 715 is removably coupled to exhaust port 718 and catch filter 738. In this way, clutch air intake system 712 and clutch exhaust system 714 of CVT 704 may be easily assembled without needing to re-tool other attachments. Additionally, the modular arrangement of clutch air intake system 712 and clutch exhaust system 714 allows the various components to be easily replaced and/or interchanged.

Figure 56:
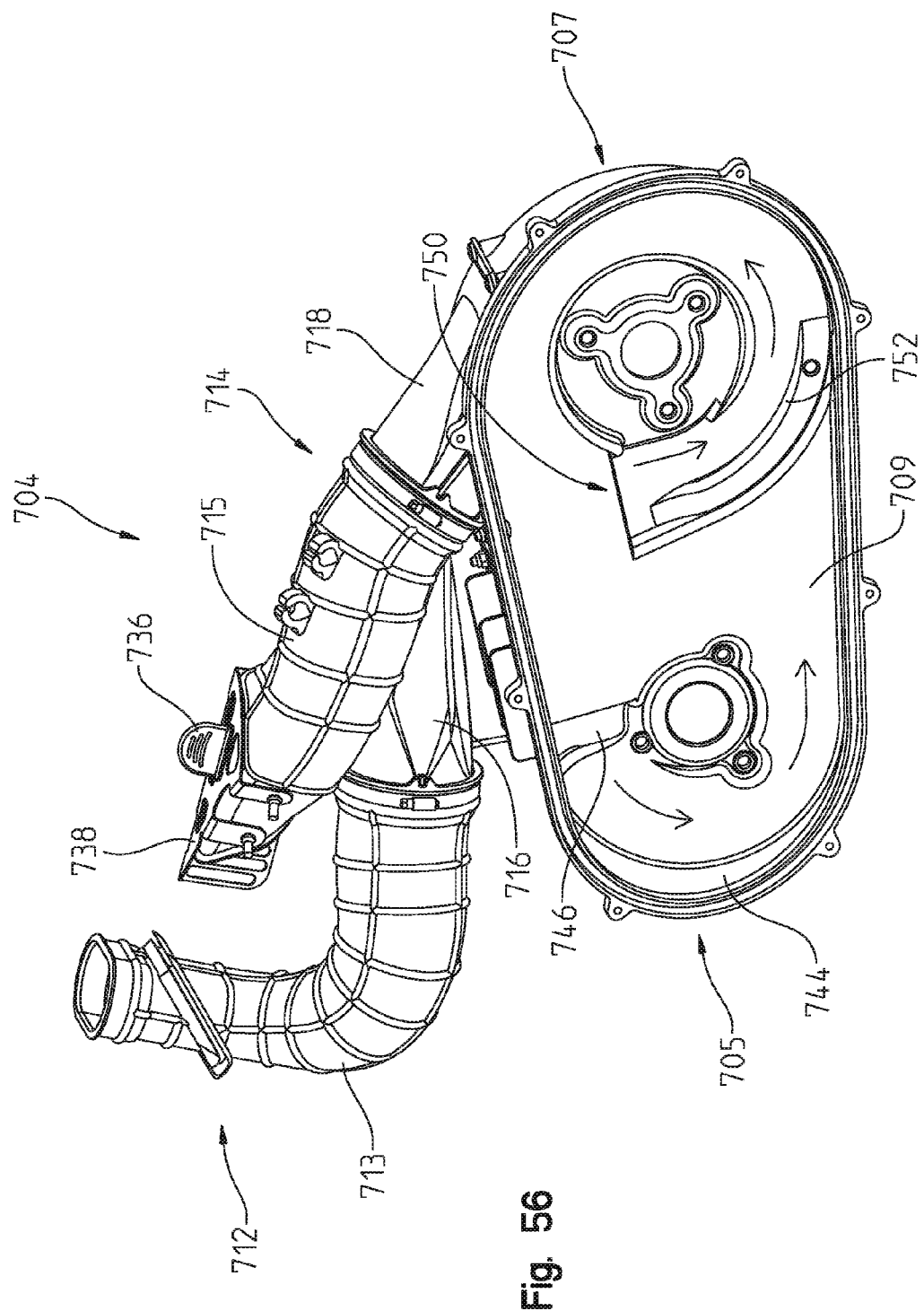
FIG. 56 is a side view of the CVT without a cover.

Housing 709 of CVT 704 is shown in FIG. 56 with cover 710 removed. Housing 709 includes a wall 744 extending around drive side 705 and driven side 707 of CVT 704. Drive side 705 includes inlet channel 746 of inlet port 716 and a duct or passageway 748 generally extends from inlet channel 746. Similarly, air is directed to drive side 707 through inlet channel 750 of inlet port 716 and a duct or passageway 752 generally extends from inlet channel 750. Passageways 748, 752 may be molded into housing 709 through conventional forming techniques.

As detailed above, inlet channels 746, 750 are angled away from each other such that clutch air intake system 712 provides at least two different, but simultaneous, flows of air through CVT 704. Air from drive side 705 and air from driven side 707 may combine near the bottom of wall 744 and flow together toward exhaust port 724 (FIG. 55). In this way, clutch air intake system 712 may split or divide incoming air between drive side 705 and drive side 707 of CVT 704. However, all air in CVT 704 exits through a common outlet, in particular, exhaust port 718 of clutch exhaust system 714. In one embodiment, the tangential area of clutch exhaust system 714 is increased to facilitate air flow through exhaust tube 715.

Figure 58:
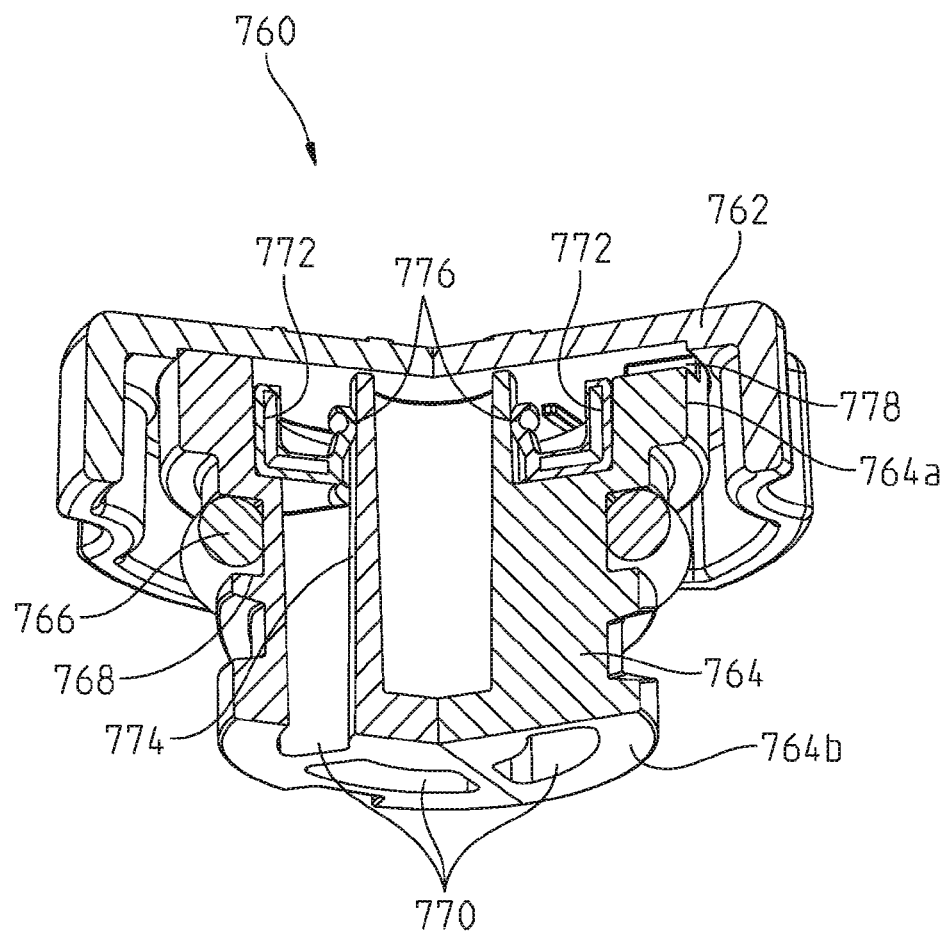
FIG. 58 is a cross-sectional view of an oil cap of an engine of the powertrain assembly.

CVT 704 is operably coupled to engine 150. During operation, engine 150 may be lubricated with a fluid, for example oil. As shown in FIG. 57, an oil cap 760 may be coupled to the top surface of engine 150. Oil cap 760 allows excessive pressure in the crankcase system of engine 150 to be vented while continuing to maintain the pressure in the crankcase system at, or below, a predetermined level. Referring to FIG. 58, oil cap 760 includes a cap portion 762 and a body portion 764, illustratively a pressure-relief valve. Body portion 764 may be positioned within engine 150, however cap 762 couples with the top surface of engine 150. The illustrative embodiment of oil cap 760 is comprised of a nylon material, however, other suitable materials may be used. An o-ring or other sealing member 766 may be received within a groove 768 and extends between body portion 764 and the top surface of engine 150 to seal oil within engine 150.

Illustratively, as best shown in FIG. 58, body portion 764 includes upper end 764a, a lower end 764b, and a plurality of internal channels 770 extending therebetween. Channels 770 intersect with an upper seal 772, illustratively a lip seal, which may be press fit or otherwise coupled to body portion 764. Upper seal 772 has a circular shape and extends around an inner surface 774 of body portion 764. Upper seal 772 includes a circular lip 776 that engages inner surface 774 to close internal channels 770. Lip 776 is comprised of a flexible polymeric material and may move away from inner surface 774 when pressure is applied to lip 776. Additionally, upper end 764a of body portion 764 includes a plurality of openings 778 above channels 770.

The illustrative embodiment of oil cap 760 is configured to vent pressure from engine 150, and more particularly, from a closed crankcase system of engine 150. For example, if vehicle 600 is used at low ambient temperature, the breather or exhaust means of engine 150 may freeze or otherwise be compromised. However, oil cap 760 is configured to release pressure from engine 150. In particular, pressure from engine 150 may act on internal channels 770 and, therefore, on upper seal 772. Lip 776 may be pushed away from inner surface 774 by the pressure in channels 770 to provide a passageway from internal channels 770 to openings 778. When lip 776 is pushed away from inner surface 774, pressure is able to vent from engine 150, through internal channels 770, past upper seal 772, and exit through openings 778. It may be appreciated that cap portion 762 directs the venting pressure downwardly toward the top surface of engine 150. In this way, external fluids are prevented from entering openings 778 and engine 150.

Figure 59:
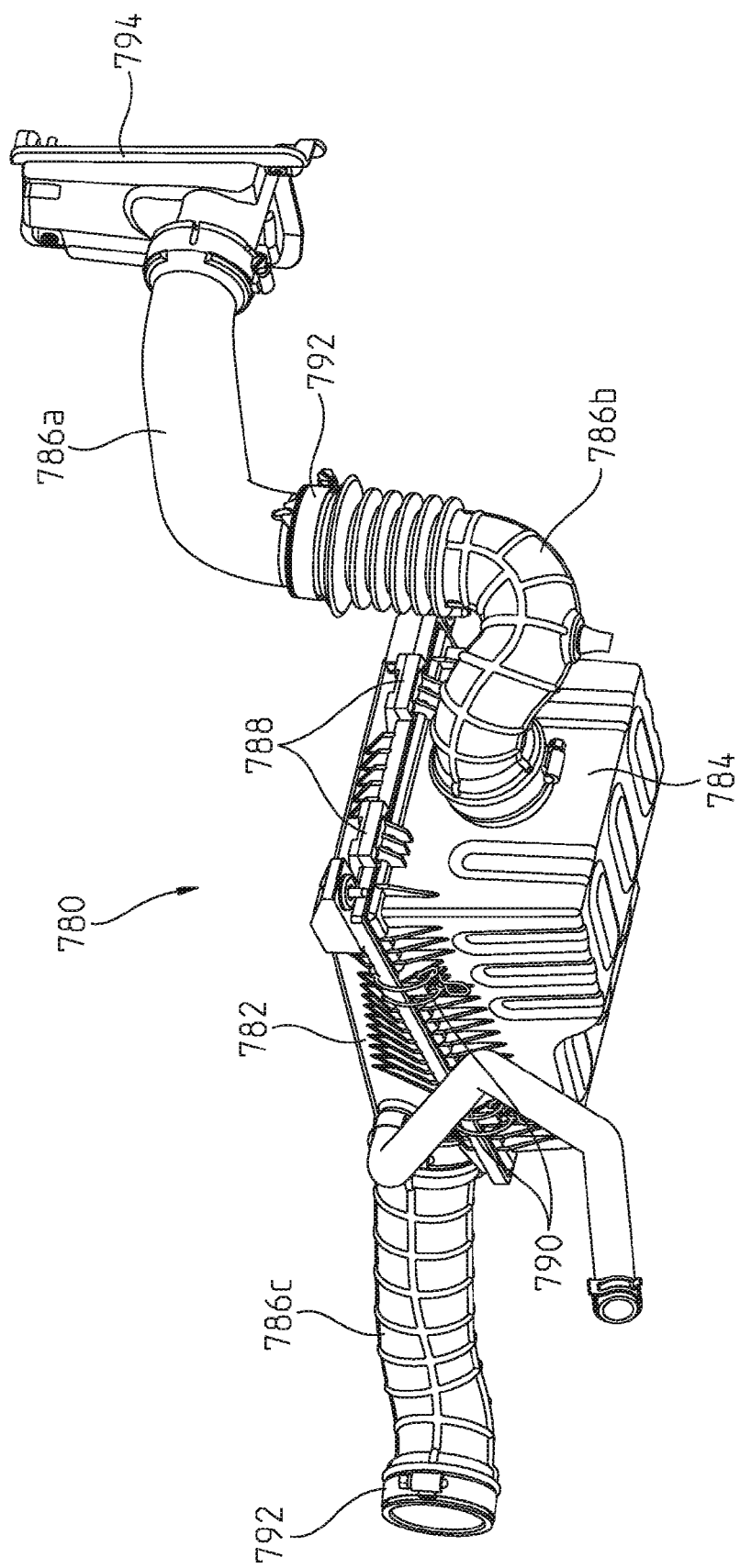
FIG. 59 is a rear perspective view of an air box assembly of the powertrain assembly.
Figure 60:
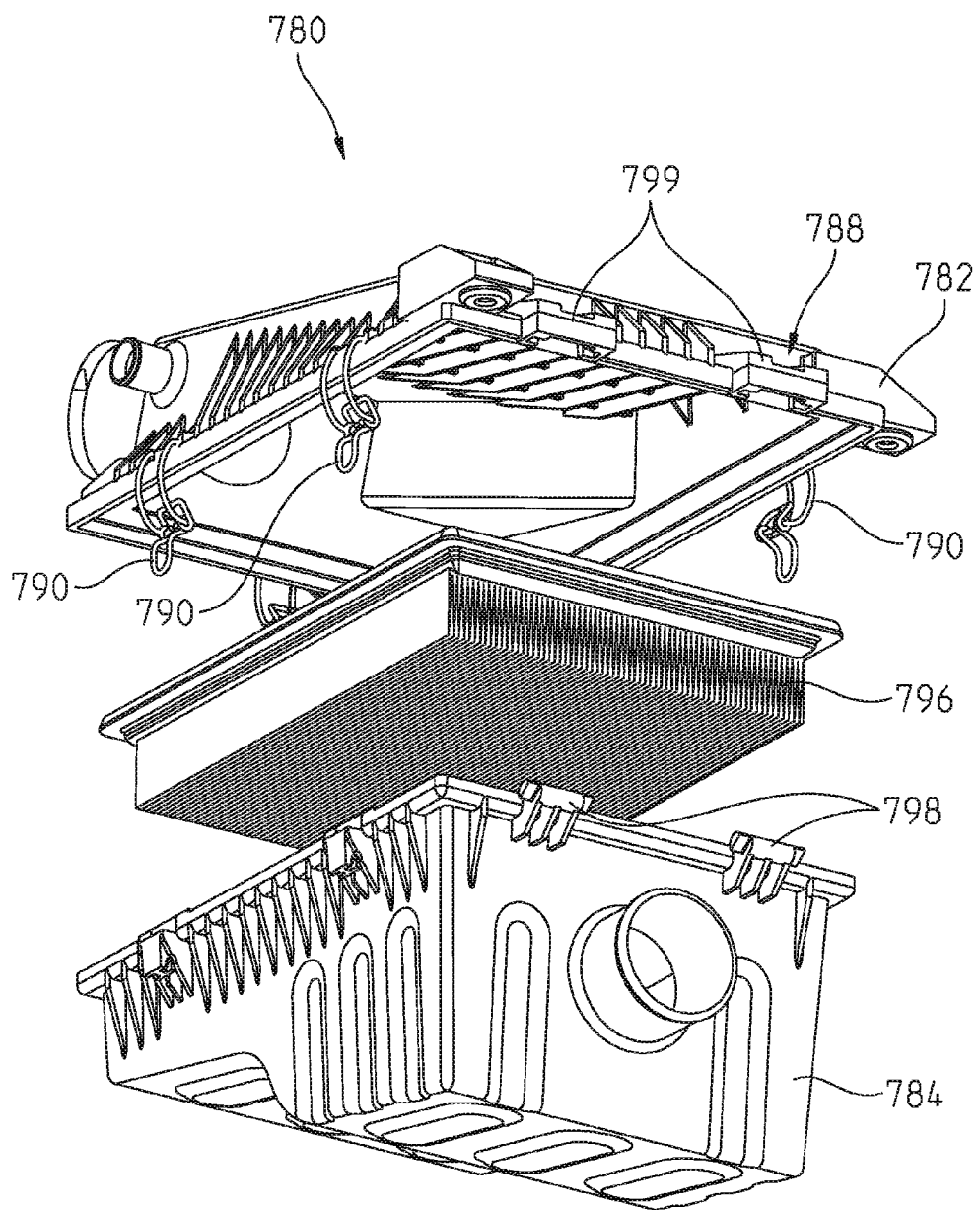
FIG. 60 is an exploded view of the air box assembly of FIG. 59.
Figure 61:
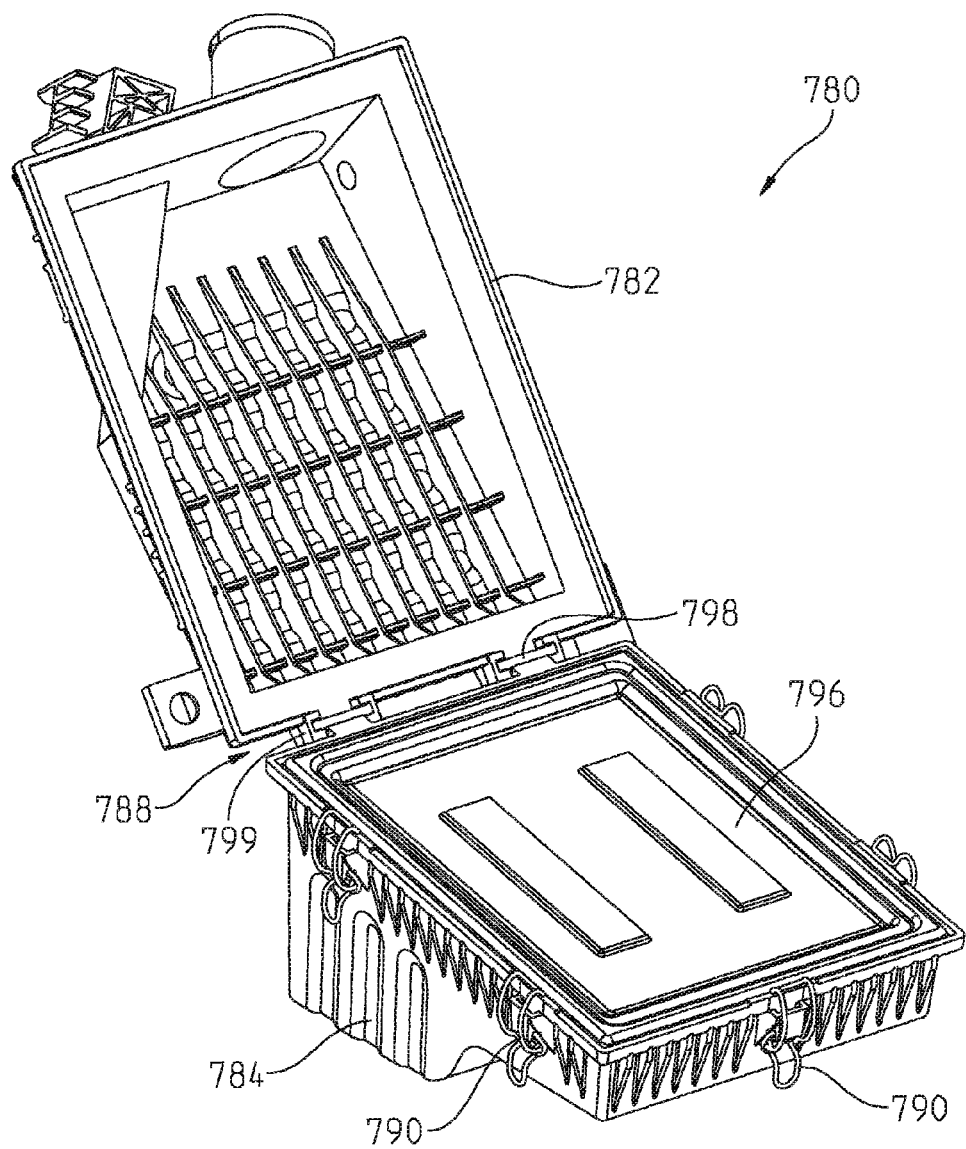
FIG. 61 is a rear perspective view of the air box assembly with the lid open.

Referring to FIGS. 59-61, an air box assembly 780 is operably coupled to engine 150. In particular, air box assembly 780 draws air into engine 150 to facilitate combustion. As shown in FIG. 59, air box assembly 780 includes a lid 782, a base 784, a plurality of hoses 786 to transport air, a hinge assembly 788 for coupling lid 782 to base 784, and a filter 796 (FIG. 60). Referring now to FIG. 60, filter 796 contains debris or other matter to prevent such matter from entering engine 150. Additionally, if filter 796 is dirty (i.e., contains debris), the debris on filter 796 from entering engine 150.

Hoses 786 are coupled to base 784 and lid 782 and, more particularly, hose 786b is coupled to base 784 and hose 786c is coupled to lid 782. Hose 786b is further coupled to hose 786a with a fastener 792. Hose 786a also is coupled to an intake port 794, which is coupled to a side panel 844 of cab 840 and is positioned rearward of rear roll cage portion 854 and driver's seat 34. Hoses 786b, 786c may be comprised of a flexible, polymeric material, however, hose 786a may be comprised of a rigid material.

Referring to FIG. 61, filter 796 is positioned intermediate lid 782 and base 784. Lid 782 may pivot relative to base 784 about hinge assembly 788. In particular, lid 782 and base 784 form a "clamshell" arrangement. Hinge assembly 788 includes posts 798 coupled to base 784 and cover members 799 coupled to lid 782. Posts 798 are received within cover members 799. Cover members 799 retain posts 798 therein such that lid 782 may be pivoted or rotated about posts 798 and remain coupled to base 784. In this way, hinge assembly 788 prevents lid 782 from separating from base 784, however, hinge assembly 788 allows lid 782 to rotate relative to base 784. Hinge assembly 788 further provides an orienting function for lid 782 and base 784. More particularly, hinge assembly 788 properly aligns and orients lid 782 with base 784. In addition to hinge assembly 788, air box assembly 780 may include closing members 790 to further secure lid 782 to base 784.

Figure 62:
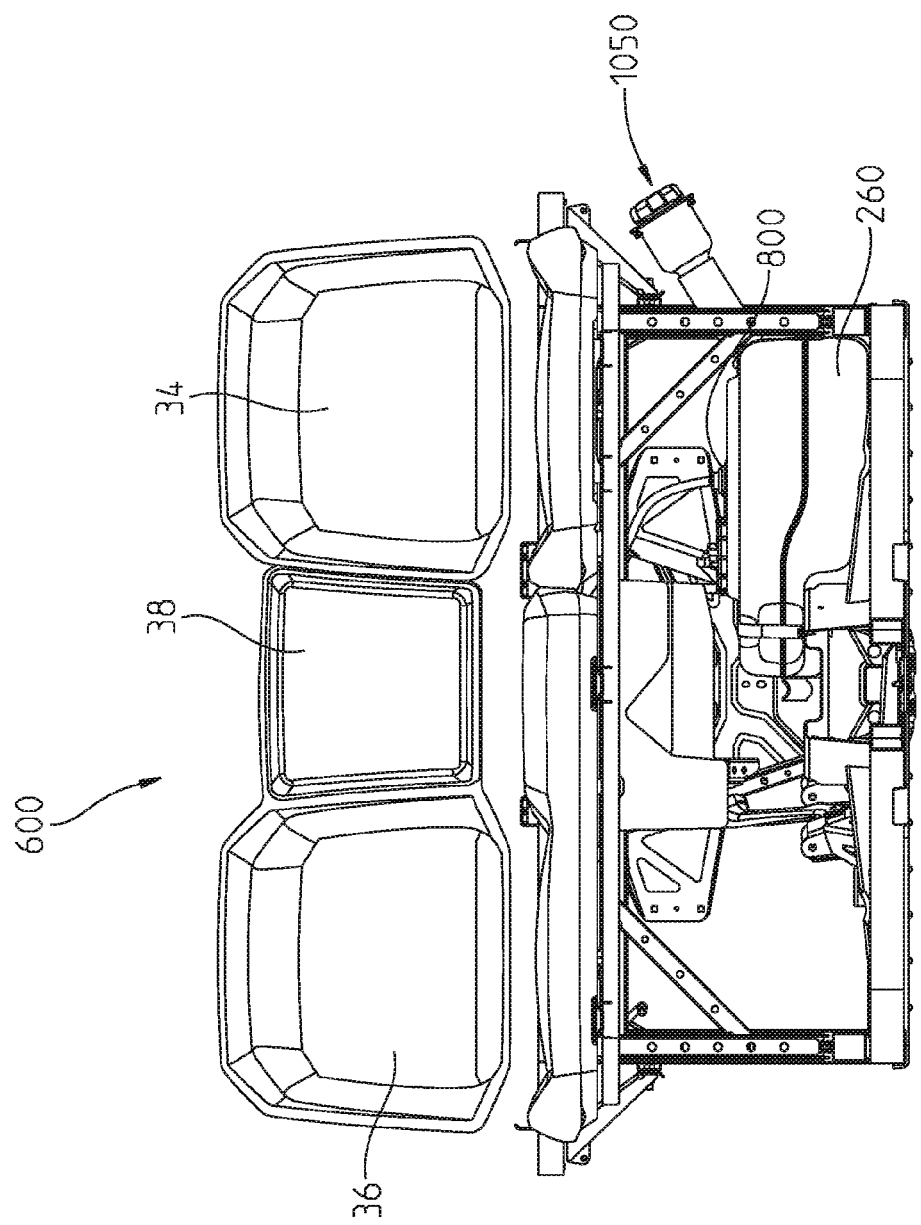
FIG. 62 is a front plan view of an operator area of the vehicle of FIG. 38 illustrating a fuel tank under a seating area.
Figure 63:
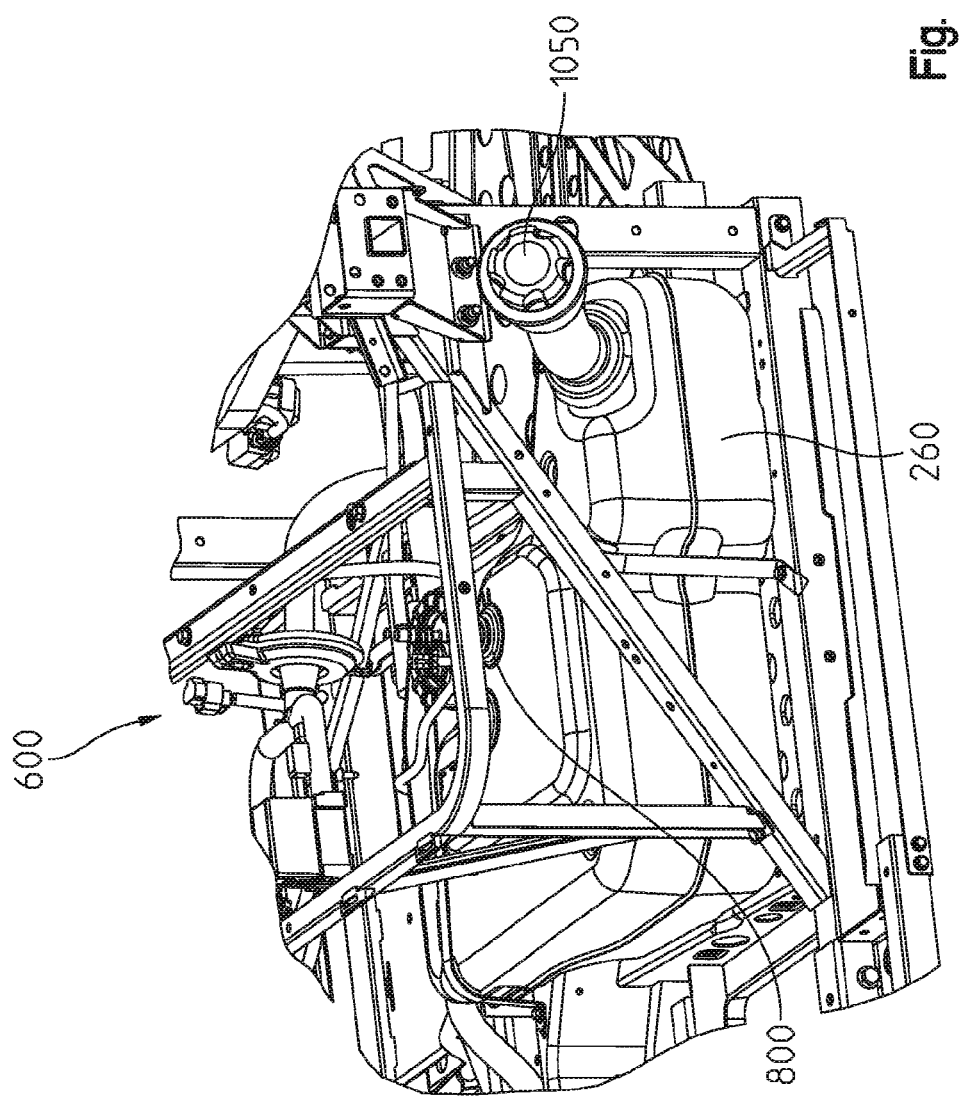
FIG. 63 is a side perspective view of the fuel tank of FIG. 62.
Figure 66:
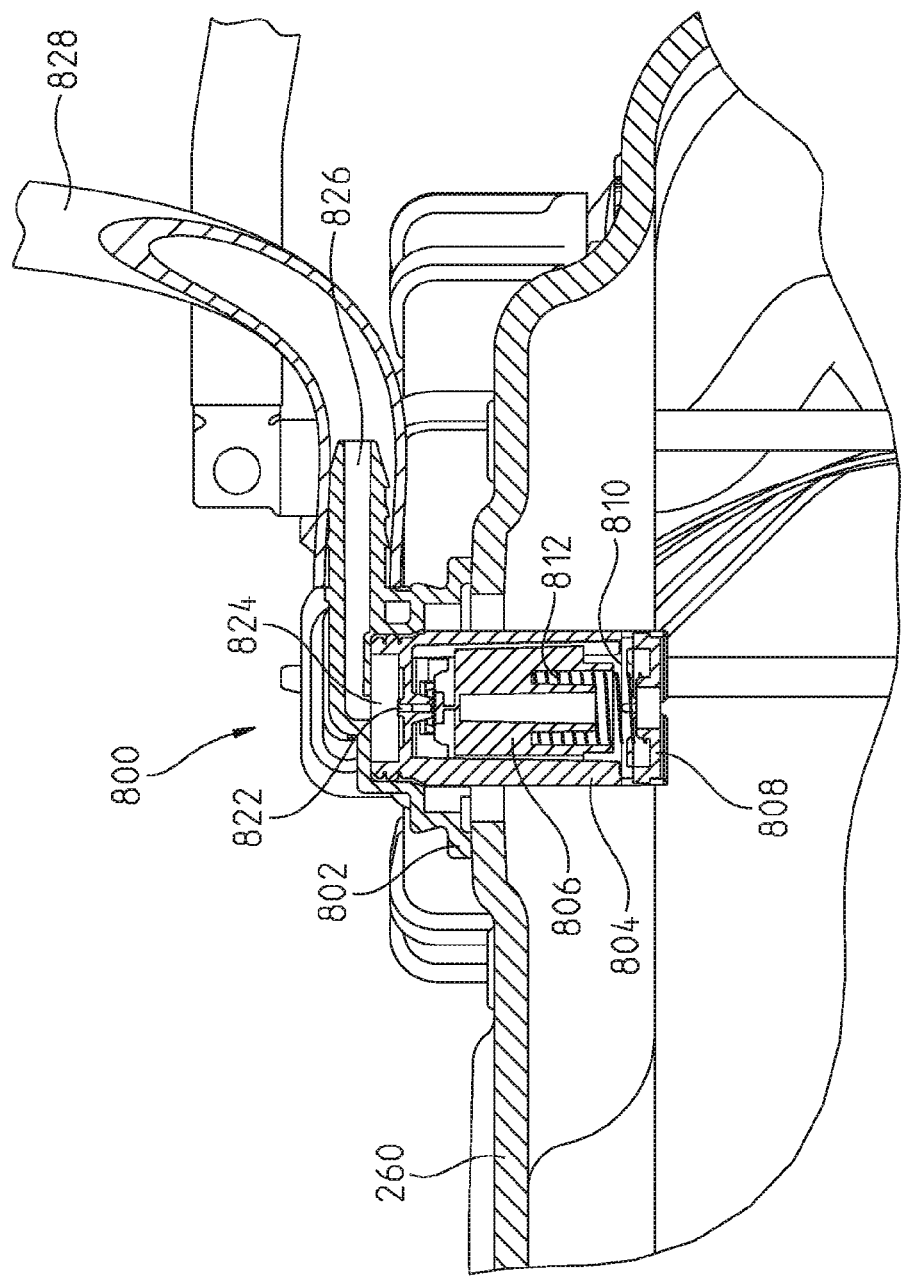
FIG. 66 is a cross-sectional view of a fuel filter assembled with the fuel tank of FIG. 64.

As shown in FIGS. 62 and 63, fuel tank 260 supplies fuel to engine 150 for operation thereof and may be positioned in a generally inboard location under driver's seat 34. Illustrative fuel tank 260 includes at least a fuel filter 800, for example a roll-over valve, coupled to a top surface of fuel tank 260 and a fuel fill cup 1050 extending from a side portion of fuel tank 260. Referring to FIG. 66, if pressure in fuel tank 260 increases, the pressure may be relieved through fuel filter 800 and hose 828. Additionally, the arrangement of fuel filter 800 may prevent external fluids from entering fuel filter 800 and, therefore, fuel tank 260.

Figure 40:
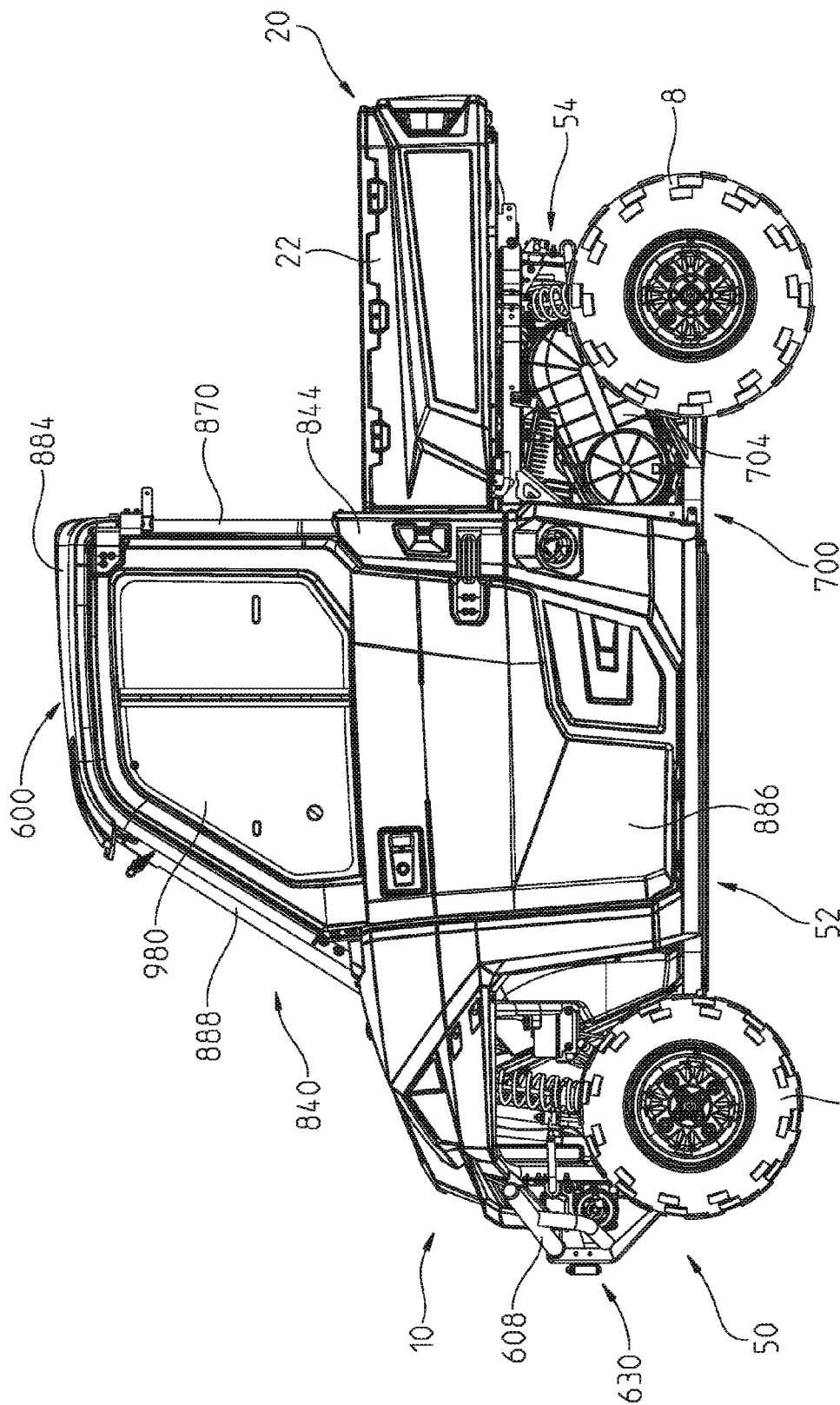
FIG. 40 is a side elevational view of the vehicle of FIG. 38.
Figure 64:
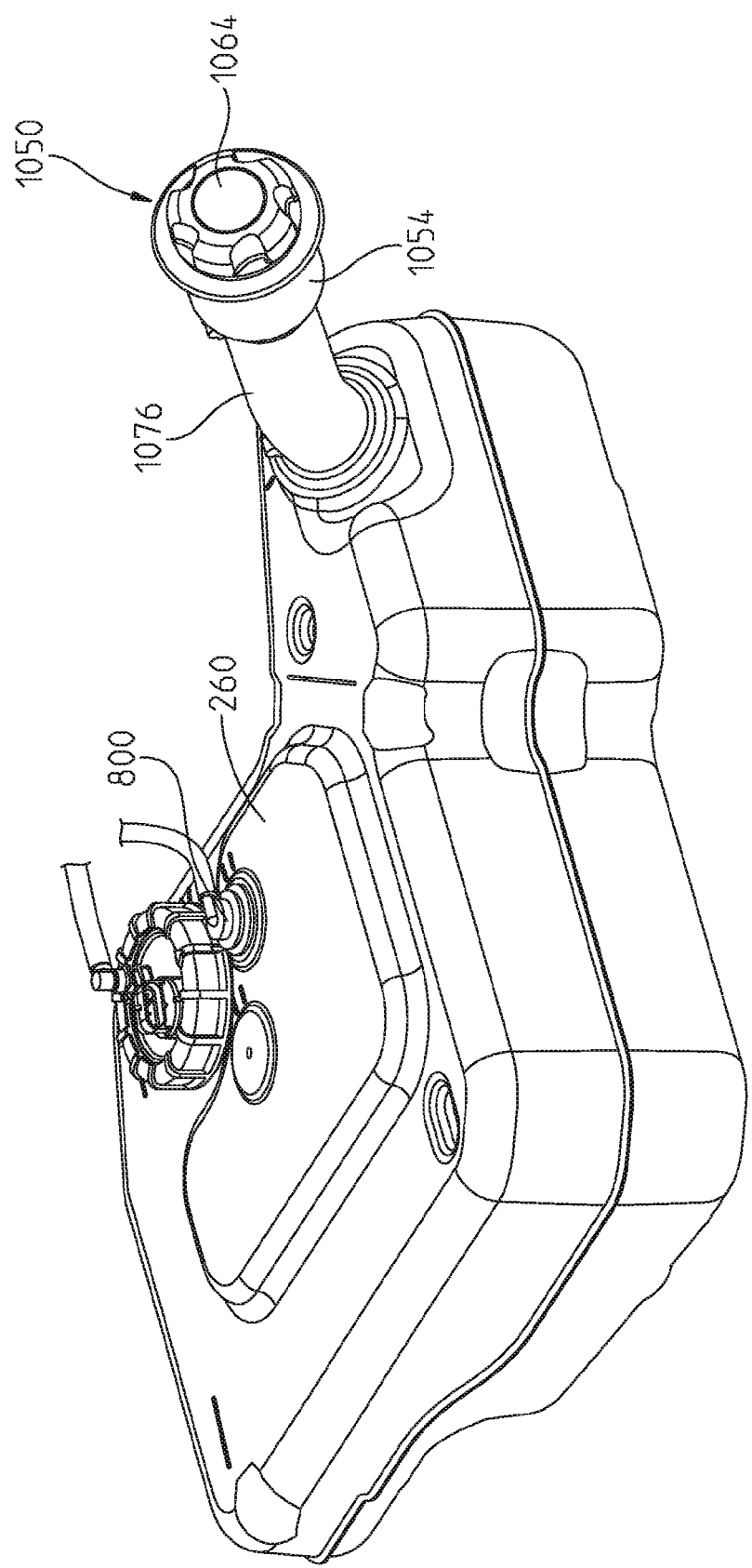
FIG. 64 is a front perspective view of the fuel tank of FIG. 62.
Figure 65:
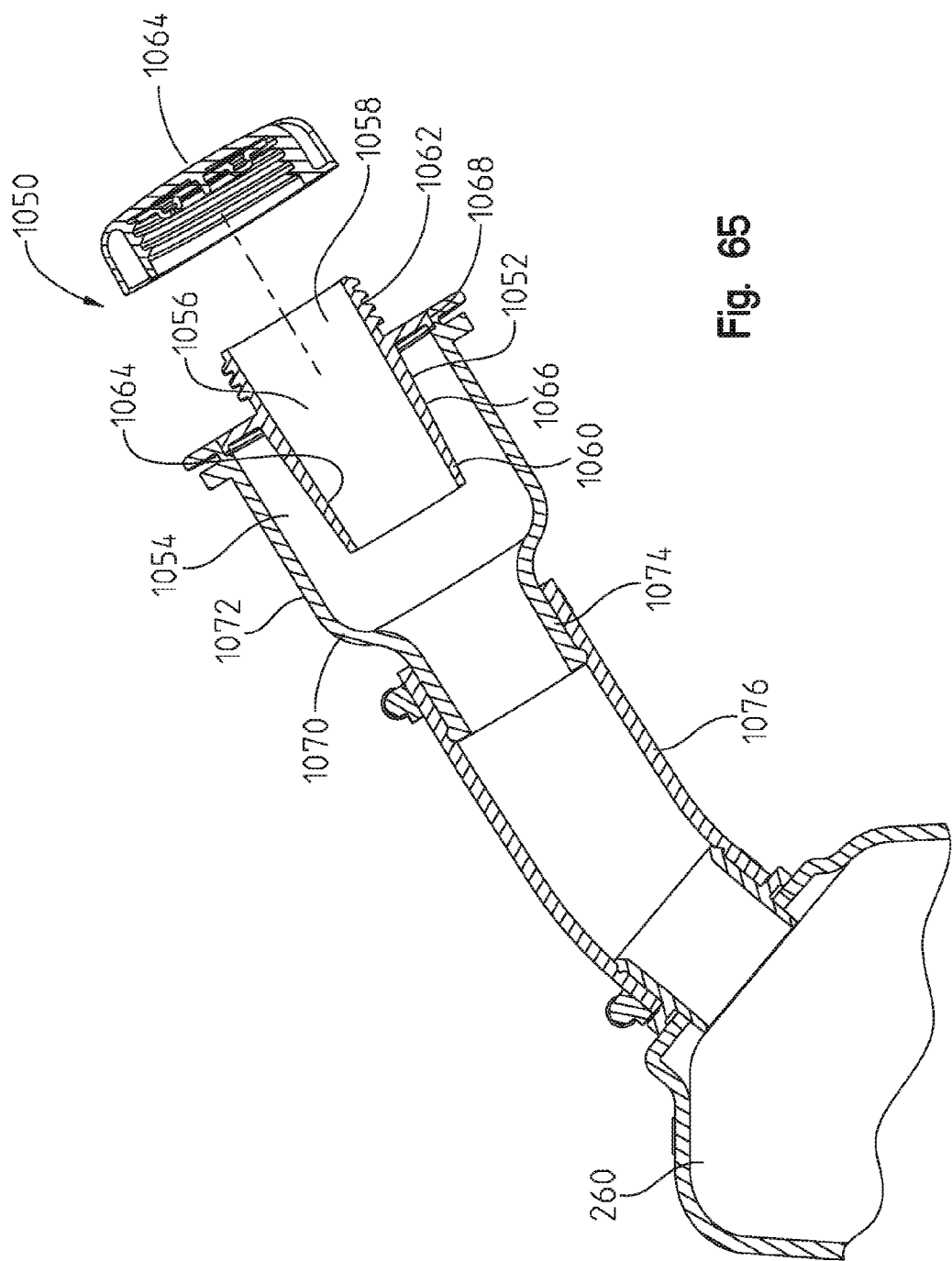
FIG. 65 is a cross-sectional view of a fuel fill cup of the fuel tank of FIG. 64.

Referring to FIGS. 64 and 65, the arrangement of fill cup 1050 allows fuel tank 260, which is located at an inboard, or generally central, location of vehicle 600, to be filled at an outboard side of vehicle 600, for example at side panel 844 (FIG. 40). Illustrative fill cup 1050 includes a fill tube 1052 and a chamber 1054 generally surrounding fill tube 1052.

Chamber 1054 includes a proximate end 1068, a distal end 1070, and a side wall 1072 extending therebetween. Proximate end 1068 may be substantially flat and perpendicular to fill tube 1052. Distal end 1070 may have a curved or rounded shape that extends into a neck 1074. Neck 1074 couples with a hose 1076 to direct fuel into fuel tank 260. Conventional fasteners (e.g., clamps) may be used to secure hose 1076 to neck 1074 and to fuel tank 260. Illustratively, neck 1074 has a smaller diameter than chamber 1054 and hose 1076.

Chamber 1054 has a generally cylindrical shape and may have a diameter of approximately three inches. Additionally, the length of illustrative side wall 1072 may be approximately 2.5 inches. However, the size of chamber 1054 may vary, depending on the vehicle and other parameters. Furthermore, the length of side wall 1072 may be established by determining the length required to properly align a fuel nozzle and the volume required to contain fuel in chamber 1054. As such, these two requirements are considered and balanced in order to determine the dimensions of side wall 1072.

The illustrative embodiment of fill tube 1052 is defined by a diameter of approximately two inches. Fill tube 1052 includes an exterior portion 1062 and an interior portion 1060. Illustratively, proximate end 1068 is intermediate interior portion 1060 and exterior portion 1062. Exterior portion 1062 extends outwardly from fill cup 1050 to define an aperture 1058 to receive a fuel nozzle. Exterior portion 1062 also may be threaded to receive a fuel cap 1064 thereon. Additionally, interior portion 1060 extends into chamber 1054 to define a channel 1056 to receive and guide the fuel nozzle toward neck 1074. More particularly, interior portion 1060 directs the fuel nozzle toward a center portion of chamber 1054 and neck 1074, thereby preventing the fuel nozzle from directly contacting neck 1074 when fuel is being supplied to fuel tank 260. An inner surface 1064 of interior portion 1060 is substantially smooth and properly aligns the fuel nozzle toward hose 1076. An outer surface 1066 of interior portion 1060 has a tapered shape to allow more fuel to accumulate in chamber 1054 and, therefore, prevents spilling when fuel tank 260 is full.

In operation, illustrative fuel cup 1050 has a fill rate of approximately 10 gallons/minute. Additionally fuel cup 1050 allows fuel tank 260 to be filled with a five-gallon gas can and maintains sufficient fuel fill quality while also allowing vapors to vent from fuel tank 260. While fuel is entering fuel tank 260 through fill tube 1052, vapors may simultaneously exit fuel tank 260 through fill tube 1052. In particular, the diameter of fill tube 1052 accommodates a fuel nozzle and also provides sufficient clearance for vapors to exit.

As the fuel nozzle shuts off when fuel tank is full, any excess fuel flowing from fuel tank 260 may be contained within chamber 1054. By containing excess fuel in chamber 1054, the fuel is prevented from overflowing and spilling from fill tube 1052. The arrangement of fill cup 1050 has the effect of slowing down the rate of fuel flowing toward fill tube 1052. Furthermore, the arrangement of fill tube 1052 and chamber 1054 separates the vapors that exit through fill tube 1052 from the liquid fuel that is contained within chamber 1054.

Figure 41:
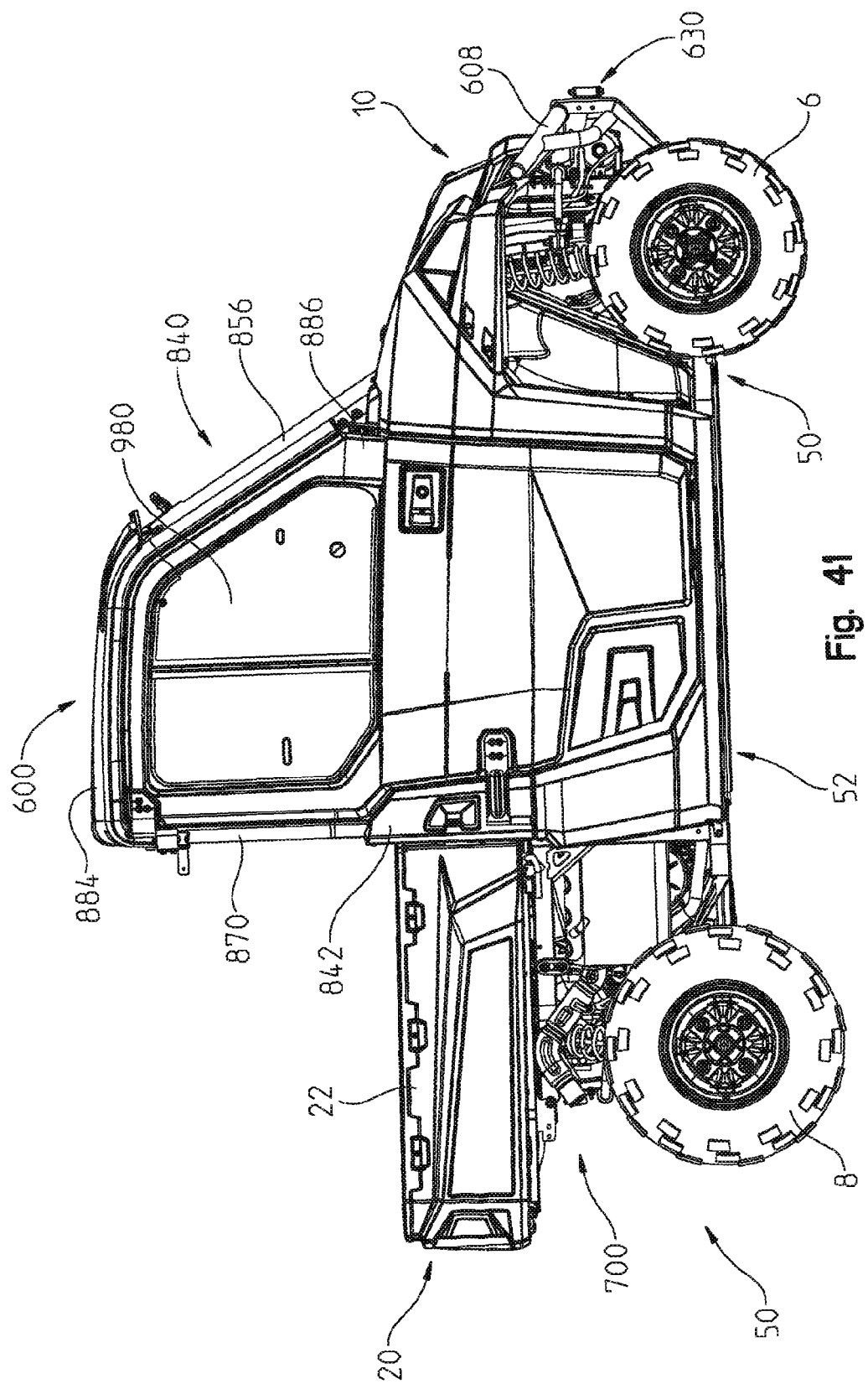
FIG. 41 is another side elevational view of the vehicle of FIG. 38.
Figure 42:
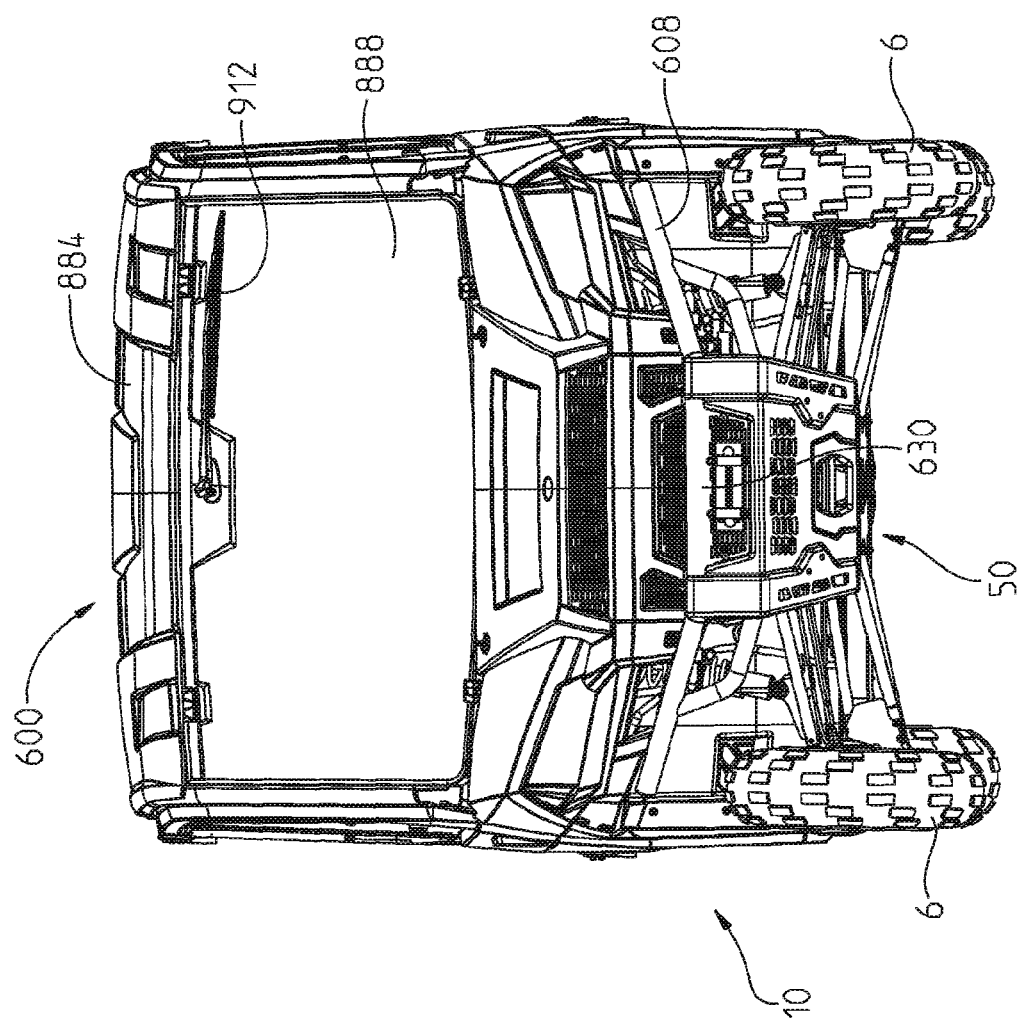
FIG. 42 is a front elevational view of the vehicle of FIG. 38.

Referring to FIGS. 94-98, rear end 20 of vehicle 600 is supported by rear wheels 8 and rear suspension assembly 1102. Rear suspension assembly 1102 may include components similar to those of the suspension assembly of FIGS. 12 and 13 and, illustratively, includes an upper alignment arm 1104 and a lower alignment arm 1106. As shown, both upper and lower alignment arms 1104, 1106 have a rounded outer end that connects to a hub 1108. More particularly, hub 1108 coupled with upper and lower alignment arms 1104, 1106 at a center portion of the rounded end of arms 1104, 1106. Illustratively, hub 1108 may be coupled to upper and lower alignment arms 1104, 1106 generally forward of the center portion of the rounded ends. Each of hubs 1108 includes a spindle 1110, which rotates along an axis generally transverse to the longitudinal axis L (FIG. 41). Lower alignment arms 1106 further comprise a lower plate portion 1112 which supports a bracket 1114 for a mounting arm 1118 of a torsion or sway bar 1120. A shock absorber 1116 also may be supported on lower plate portion 1112 and spaced apart from bracket 1114 and mounting arm 1118.

Figure 94:
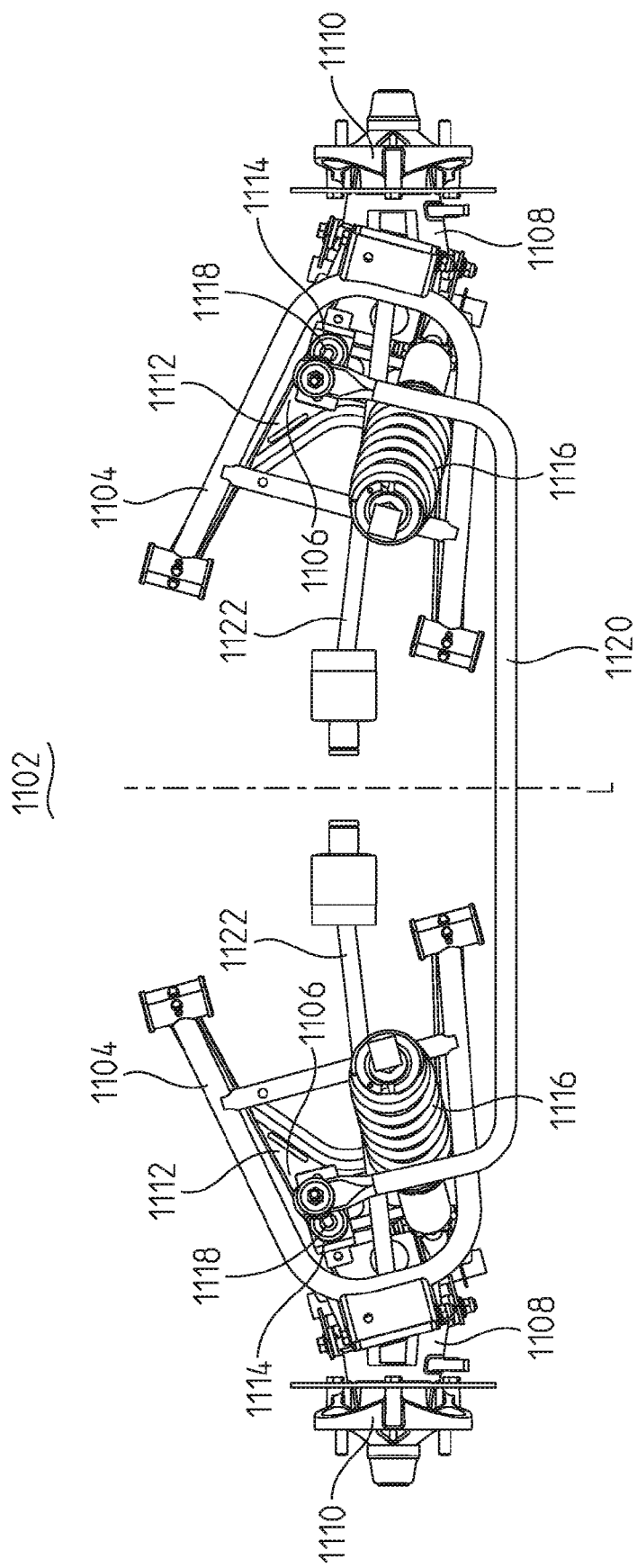
FIG. 94 is a top plan view of a rear suspension assembly of the vehicle of FIG. 38.
Figure 95:
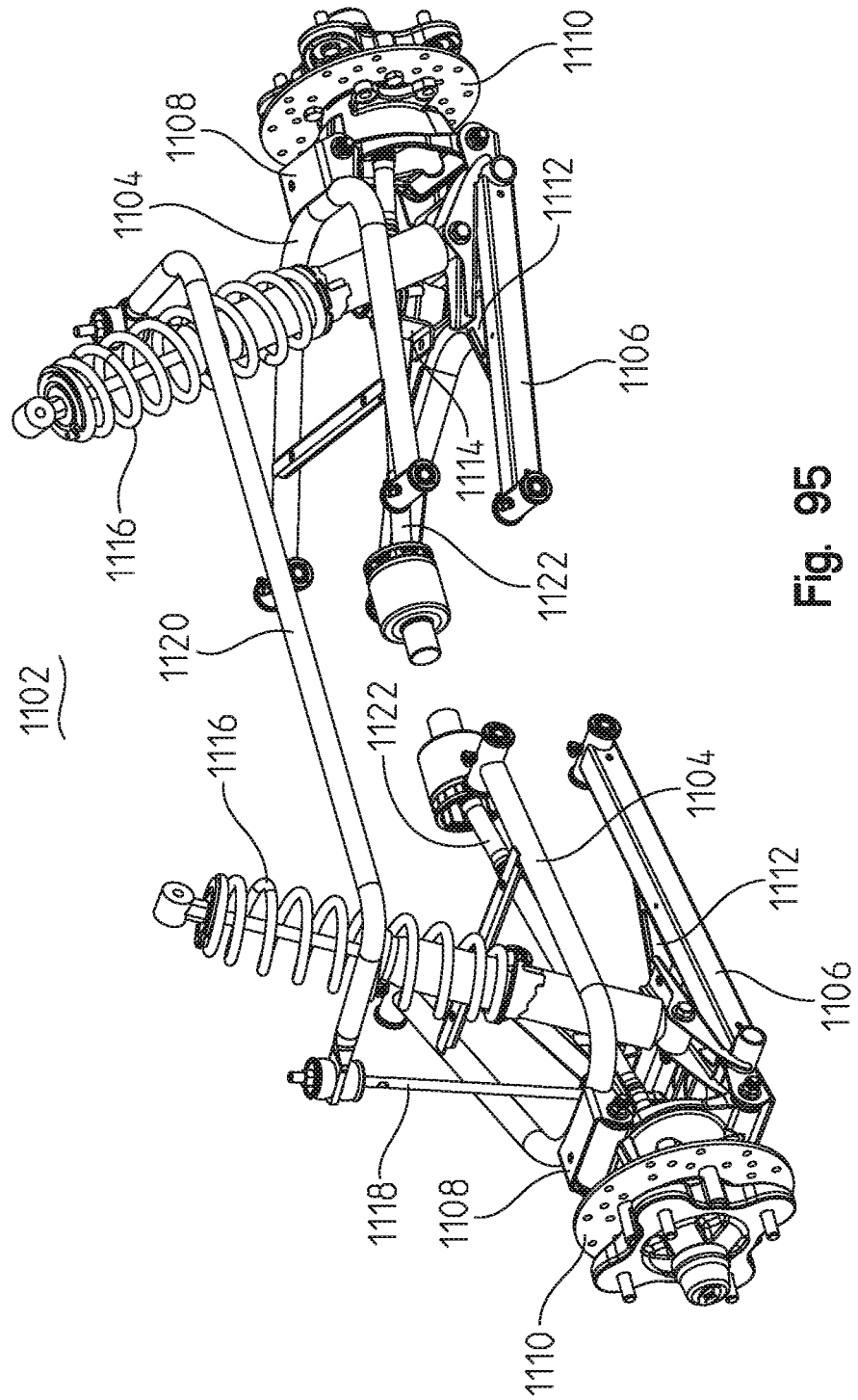
FIG. 95 is a rear perspective view of the rear suspension assembly of FIG. 94.
Figure 96:
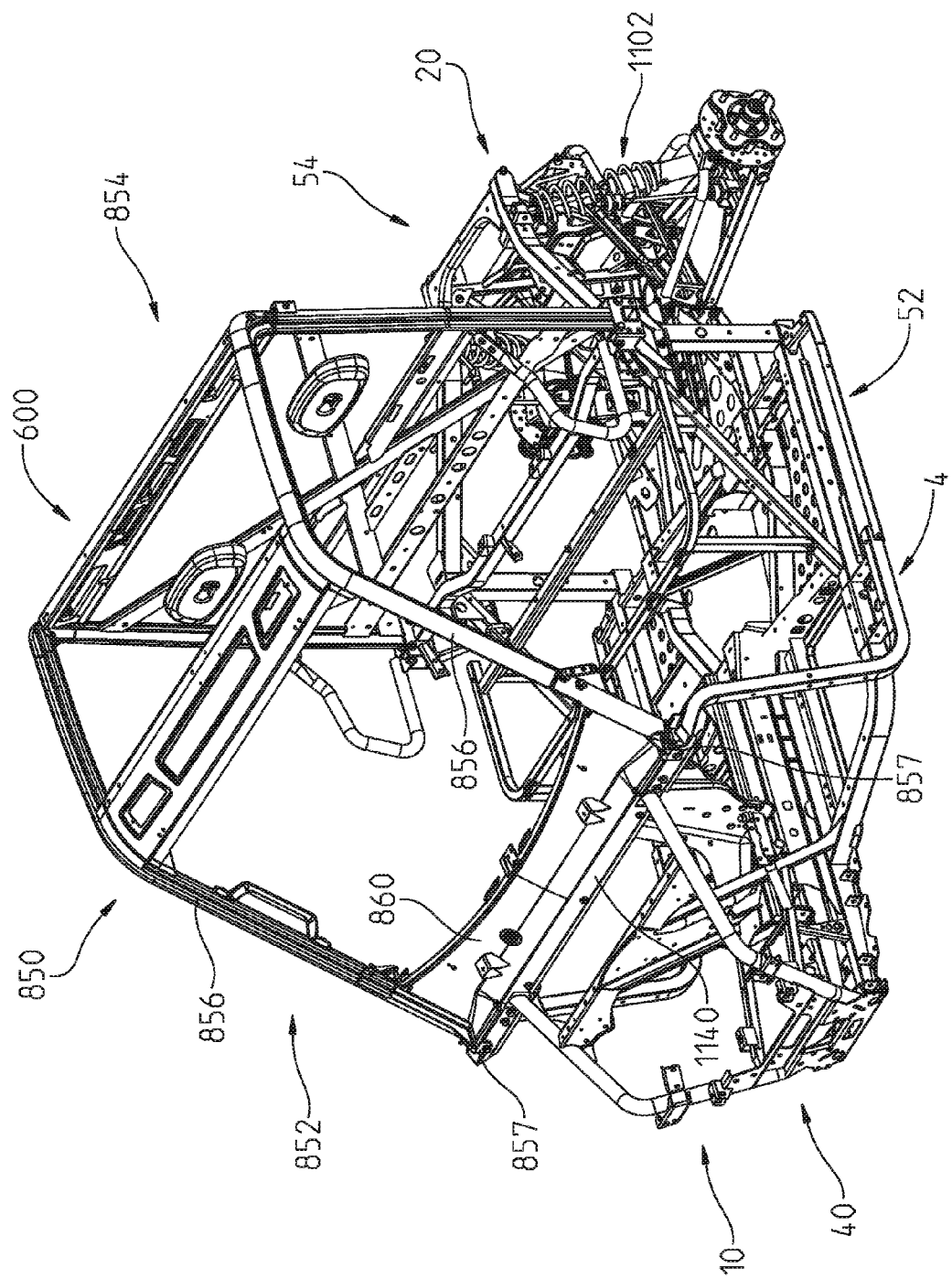
FIG. 96 is a front perspective view of a frame, roll cage, and rear suspension of the vehicle of FIG. 38.

Additionally, FIGS. 94 and 95 disclose two stub shafts or half shafts 1122 spaced apart from each other. Each half shaft 1122 is operably coupled to one of the hubs 1108. In particular, each half shaft 1122 extends between shock absorber 1116 and mounting arm 1118. Illustratively, rear portion 20 of vehicle 600 is elongated. More particularly, the length of rear portion 20 of vehicle 600 may be increased by at least two inches relative to that of vehicle 2. As such, half shafts 1122 may extend in a generally horizontal direction such that each half shaft 1122 is substantially perpendicular to longitudinal axis L of vehicle 600. Alternatively, half shafts 1122 may sweep forward toward front end 10 of vehicle 600, depending on the length of rear end 20.

Figure 97:
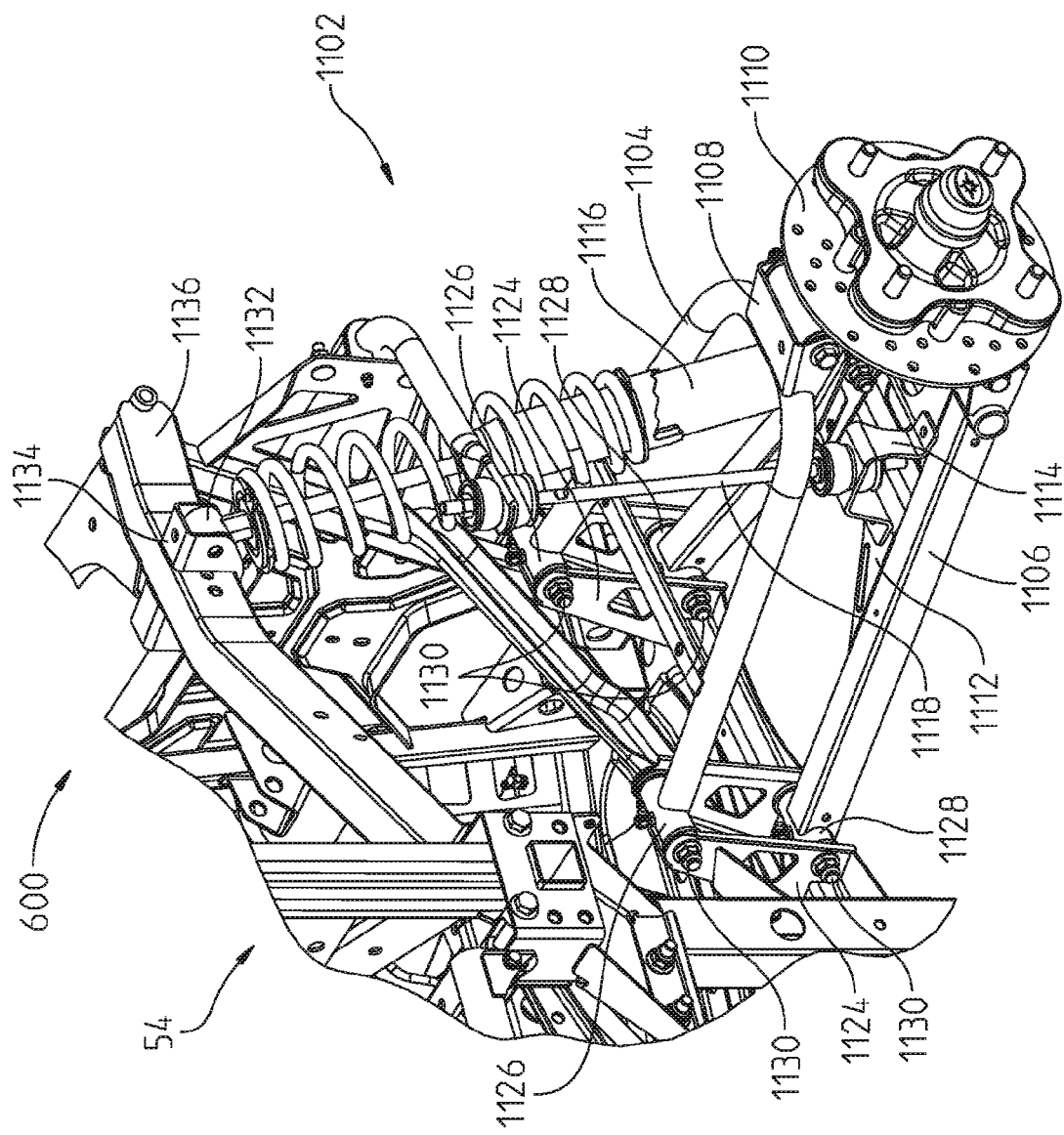
FIG. 97 is a detailed view of the rear suspension and the frame of FIG. 96.
Figure 98:
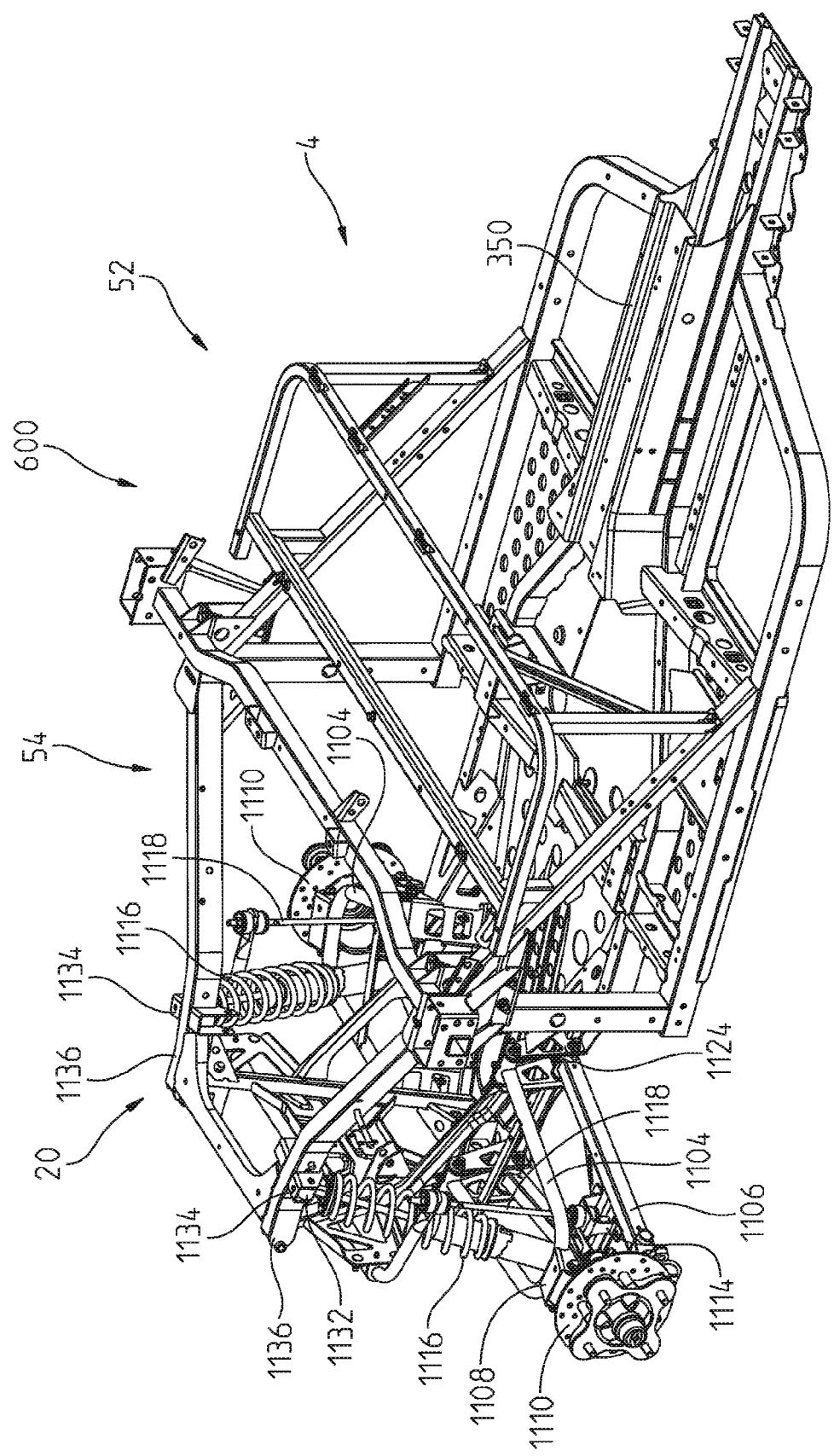
FIG. 98 is a front perspective view of the frame and rear suspension of the vehicle of FIG. 96.

As shown in FIGS. 97 and 98, rear suspension 1102 is coupled to frame 4. Vertically extending channels 1124 of frame 4 extend at each side of rear end 20 and define locations for mounting upper and lower alignment arms 1104, 1106. Conventional fasteners, such as bolts, adhesive, and rivets, may be used to couple upper and lower alignment arms 1104, 1106 with channels 1124. More particularly, the ends of illustrative upper and lower alignment arms 1104, 1106 include generally cylindrical coupling portions 1126, 1128, respectively. Coupling portions 1126, 1128 may be generally hollow and are configured to receive a bushing or other similar component therein. Fasteners 1130 are used to secure coupling portions 1126, 1128 of upper and lower alignment arms 1104, 1106, respectively, to frame 4.

An upper end 1132 of shock absorber 1116 also may be coupled to frame 4 with conventional fasteners (not shown).

With respect to FIG. 97, upper end 1132 is received within a bracket 1134 of a frame arm 1136 in order to support shock absorber 1116 on frame 4.

Figure 68:
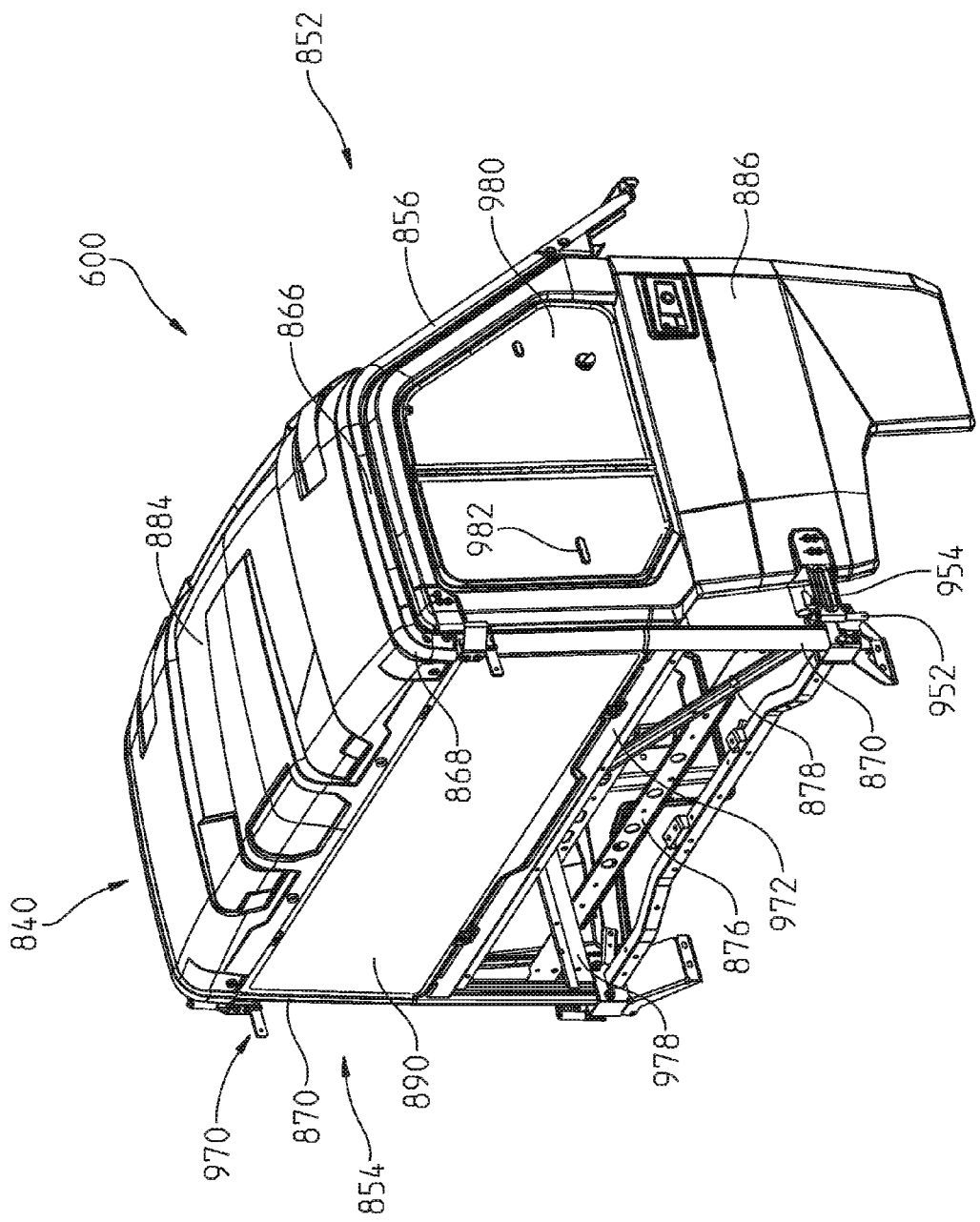
FIG. 68 is a rear perspective view of the cab portion of FIG. 67.
Figure 69:
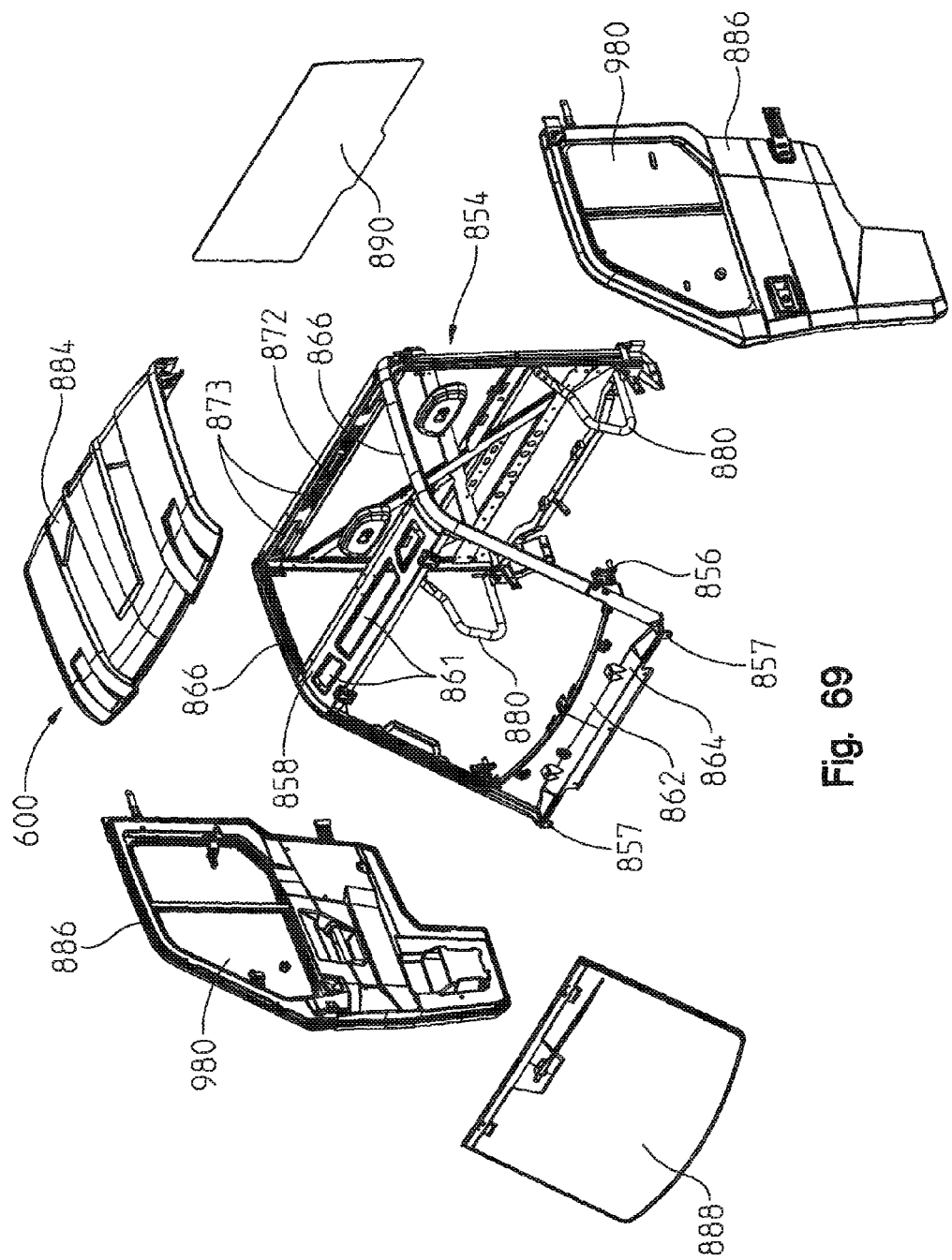
FIG. 69 is an exploded view of the cab portion of FIG. 67.
Figure 70:
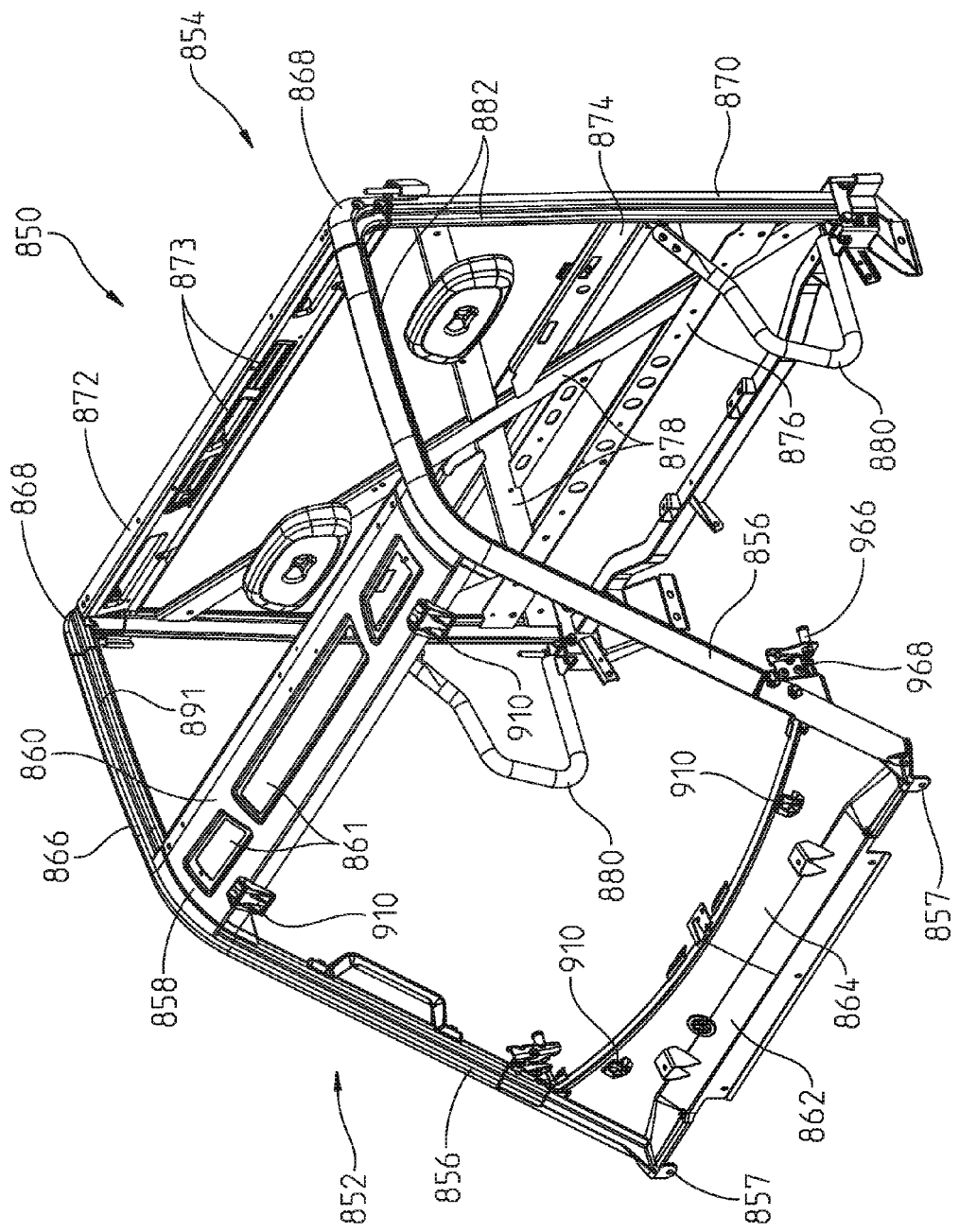
FIG. 70 is a front perspective view of a roll cage portion of the cab of FIG. 67.

Referring now to FIGS. 67-71, vehicle 600 further comprises roll cage 850, which generally surrounds operator area 30 and defines cab 840. As shown in FIG. 70, roll cage 850 includes a front roll cage portion 852 and rear roll cage portion 854. Front roll cage portion 852 includes upright portions 856, an overhead beam 858 (FIG. 69) defining a surface 860, and a lower beam 862 defining a surface 864. Surface 860 illustratively includes a plurality of apertures 861.

As shown in FIG. 99, front roll cage portion 852 is coupled to frame 4 with brackets 857 and is coupled to rear roll cage portion 854 with crossbeams 866 and rear connectors 868. In particular, brackets 857 may be coupled to upright portions 856 with conventional fasteners or, alternatively, may be integral therewith. Illustrative brackets 857 are L-shaped and include a generally right-angle bend. More particularly, brackets 857 fold over frame member 1140 to couple roll cage 850 to frame 4. Fasteners 1142 extend through brackets 857 in order to couple upright portions 856 to frame member 1140.

Figure 71:
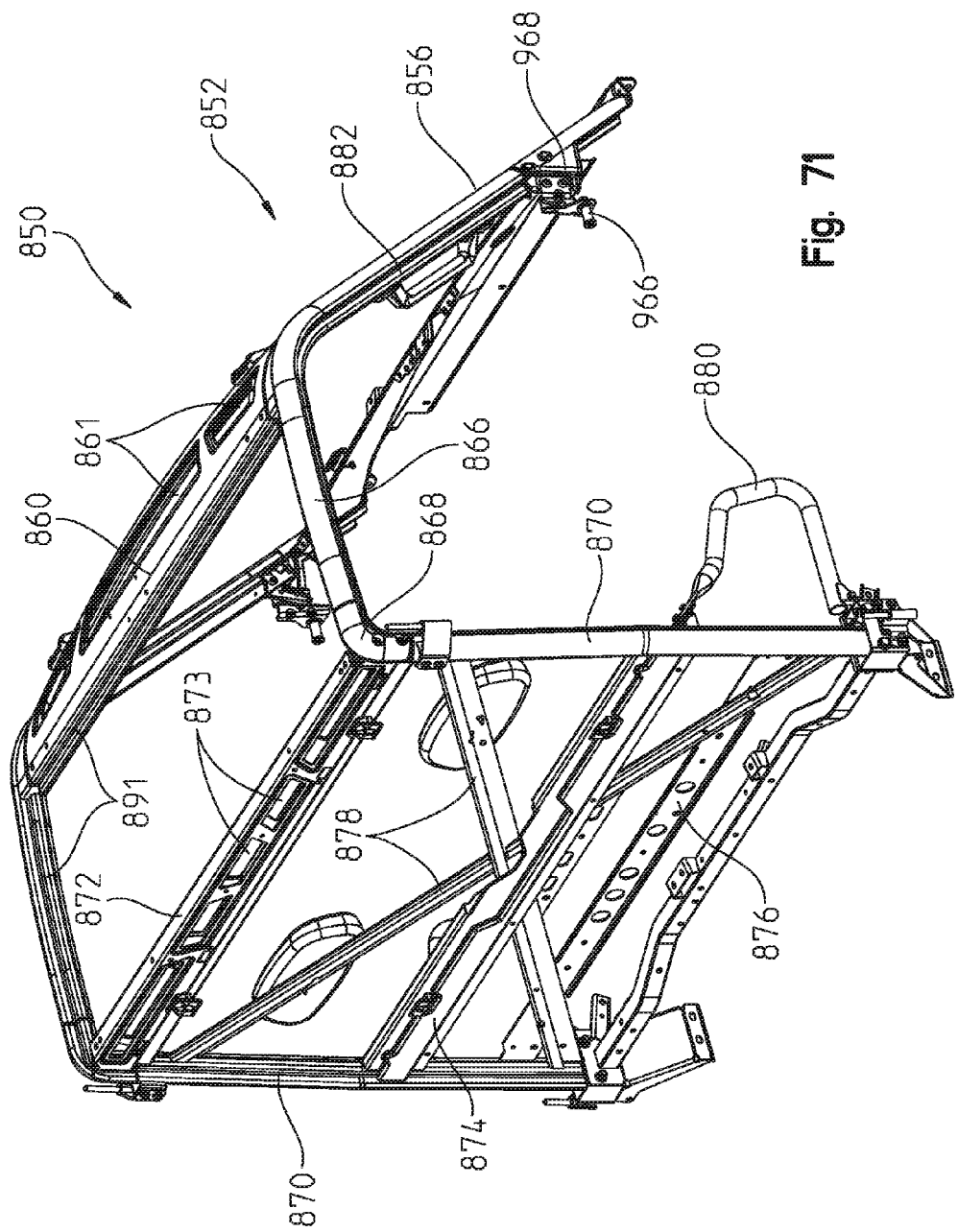
FIG. 71 is a rear perspective view of a roll cage portion of the cab of FIG. 70.

Rear roll cage portion 854 includes upright portions 870, cross members 872, 874, 876, and diagonal braces 878. Cross member 872 illustratively includes a plurality of apertures 873 (FIG. 71). Additionally, side supports 880 extend forwardly from upright portions 870. Front roll cage portion 852 may be removably coupled to rear roll cage portion 854 with conventional fasteners 846. In this way, upright portions 856, overhead beam 858, lower beam 862, crossbeams 866, and rear connectors 868 may be removed from rear roll cage portion 854.

Rear roll cage portion 854 is coupled to frame 4 with conventional fasteners. In particular, upright portions 870 may be coupled to brackets 1152 at each side of vehicle 600. As shown in FIGS. 68-71, upright portions 870 are received within a top portion 1154 of brackets 1152 and may be retained therein with conventional fasteners. Illustratively, top portion 1154 is larger than upright portions 870 such that upright portions 870 are received within approximately half of top portion 1154. Top portion 1154 is coupled to frame 4, for example a frame member 1150, and a lower portion 1156 that is angled inwardly and coupled to other members (not shown) of frame 4. Brackets 1152 may also support a portion of doors 886, as is further detailed herein.

Figure 72:
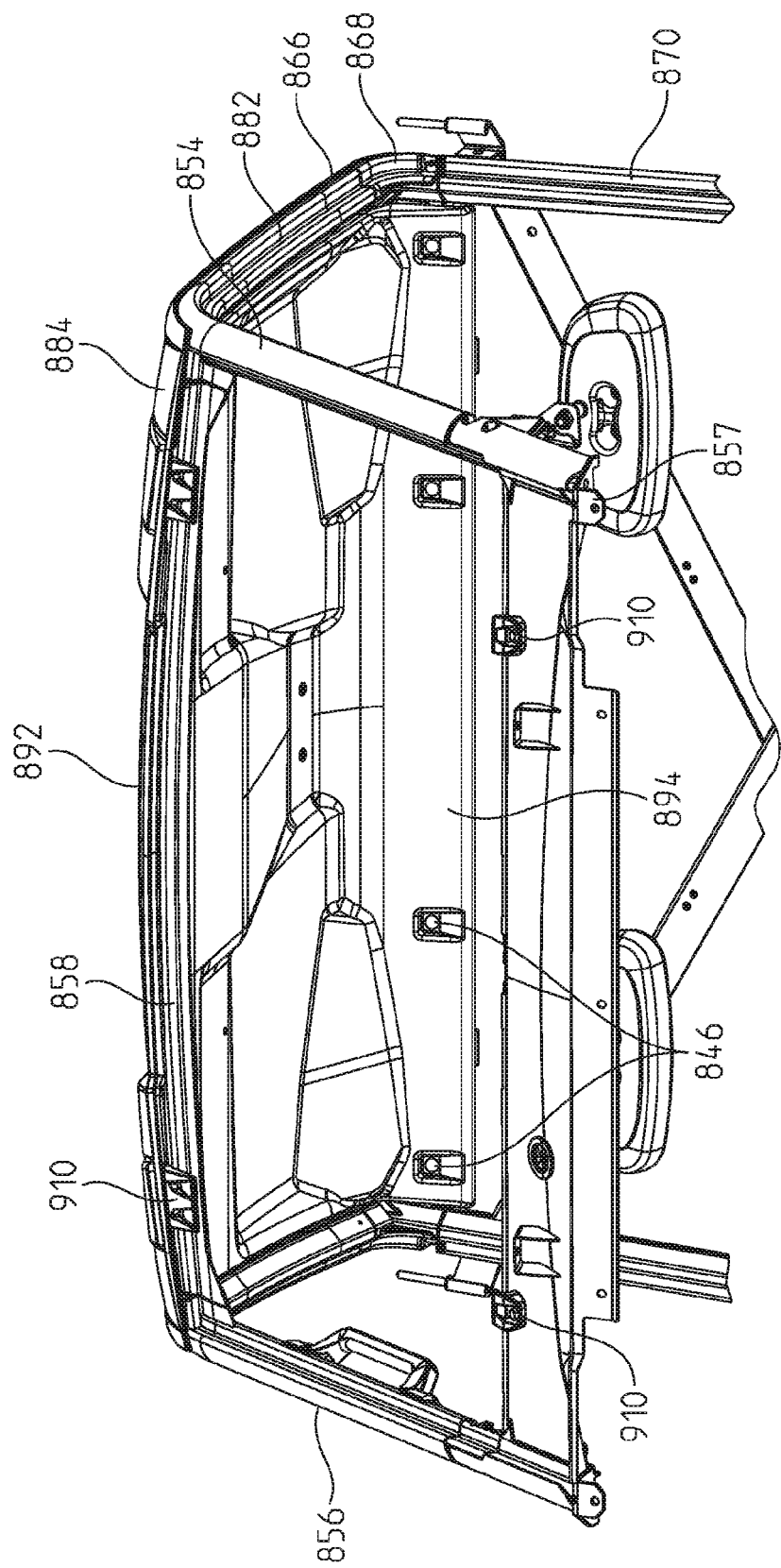
FIG. 72 is a bottom front perspective view of the roll cage portion of FIG. 70 assembled with the roof.
Figure 73:
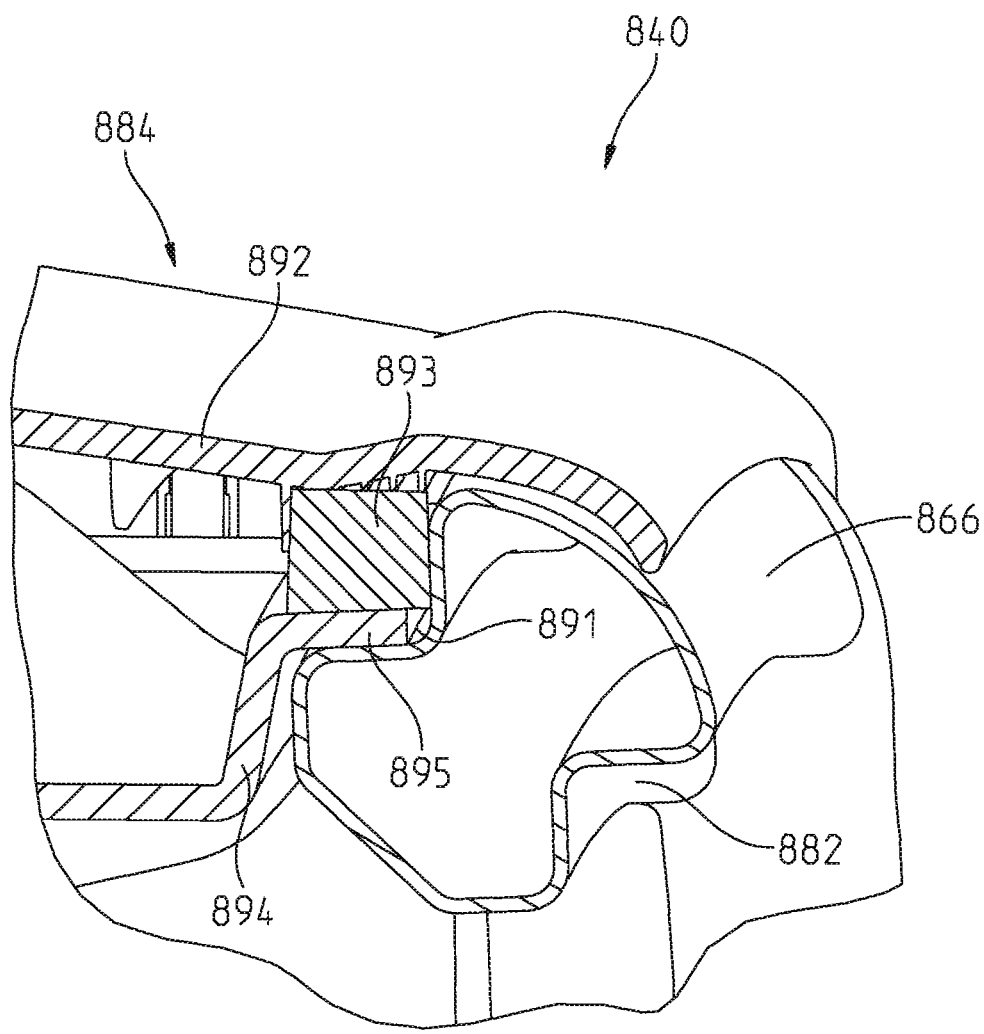
FIG. 73 is a detailed cross-sectional view of the roof and roll cage of FIG. 70.

As shown in FIGS. 72 and 73, upright portions 856 of front roll cage portion 852, crossbeams 866, rear connectors 868, and upright portions 870 of rear roll cage portion 854 may each include a profiled cross-section. For example, upright portions 856, 870, crossbeams 866, and rear connectors 868 may form a generally hourglass shape in cross-section (see FIG. 73). Illustratively, when upright portions 856 and 870 are coupled together via crossbeams 866 and rear connectors 868, a substantially continuous lip 882 is formed at the perimeter of roll cage 850. Lip 882 allows accessories, such as doors 886, to be flush with roll cage 850 when coupled thereto, as is further detailed herein.

Cab 840 further includes roof 884, doors 886, front windshield 888, and rear windshield 890. In this way, cab 840 may be enclosed or isolated from other portions of vehicle 600. Roof 884 is coupled to overhead beam 858 and surface 860 of front roll cage portion 852, and also is coupled to cross member 872 of rear roll cage portion 854. Illustratively, roof 884 rests on top of crossbeams 866 but alternative embodiments of vehicle 600 may include couplers for further securing roof 884 to crossbeams 866. More particularly, surface 860 and crossbeams 866 each include an inner recessed surface 891, which may engage a sealing member 893 to form a seal between roof 884 to roll cage 850, thereby further contributing to the isolation of cab 840.

Figure 74:
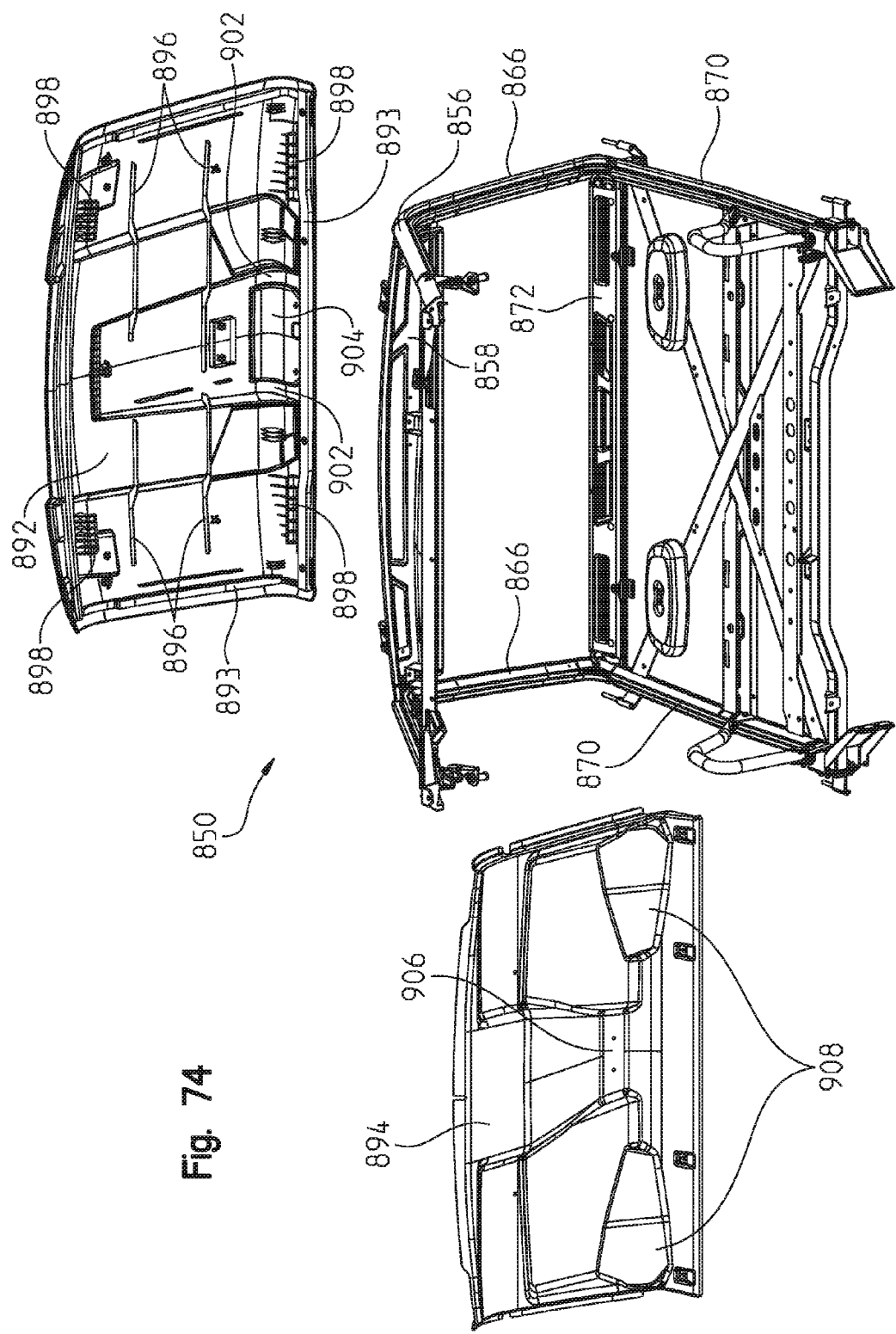
FIG. 74 is an exploded view of the roll cage and the roof of FIG. 70.
Figure 75:
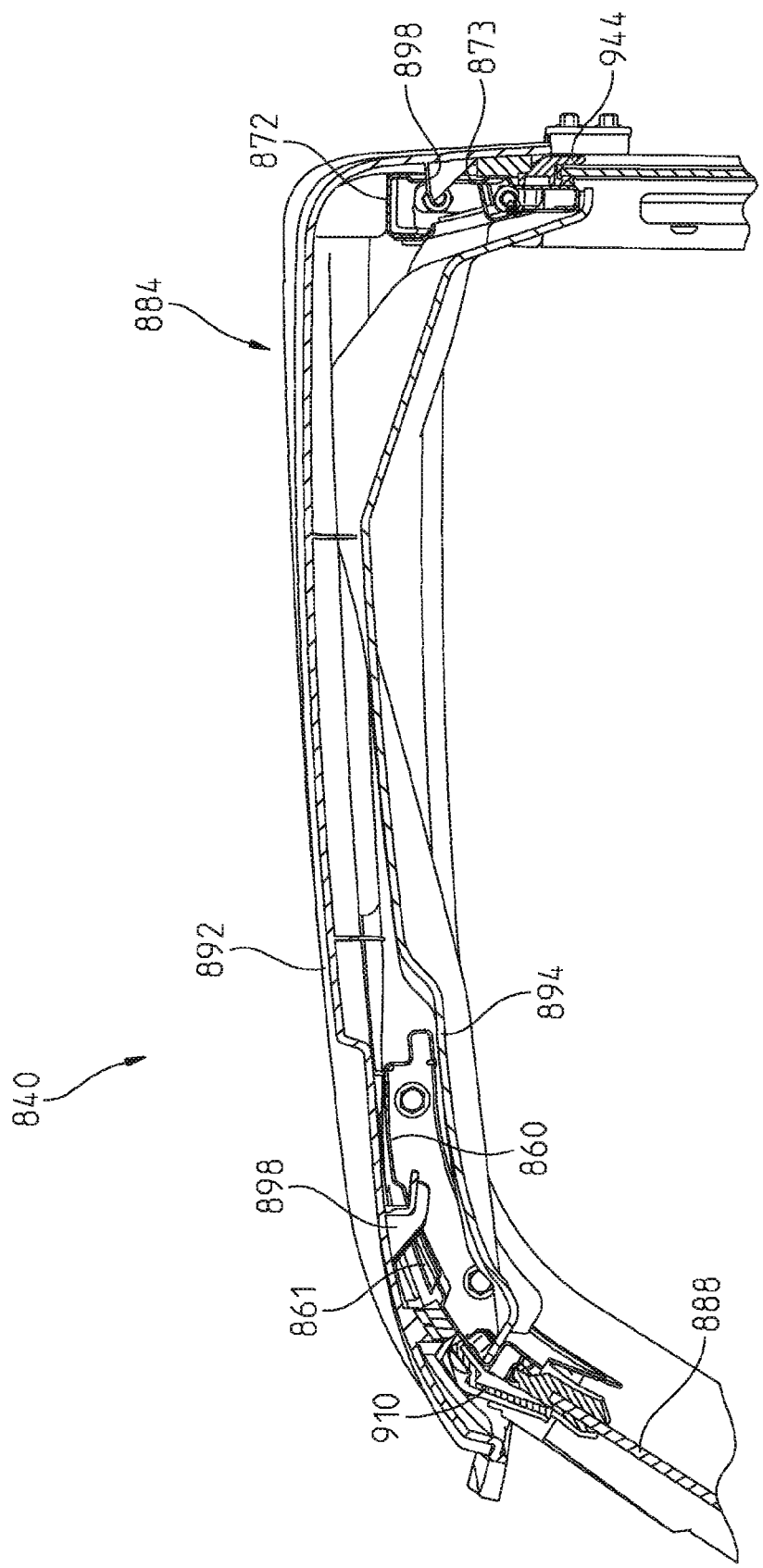
FIG. 75 is a cross-sectional view of a side of the roll cage and the roof of FIG. 70.
Figure 76:
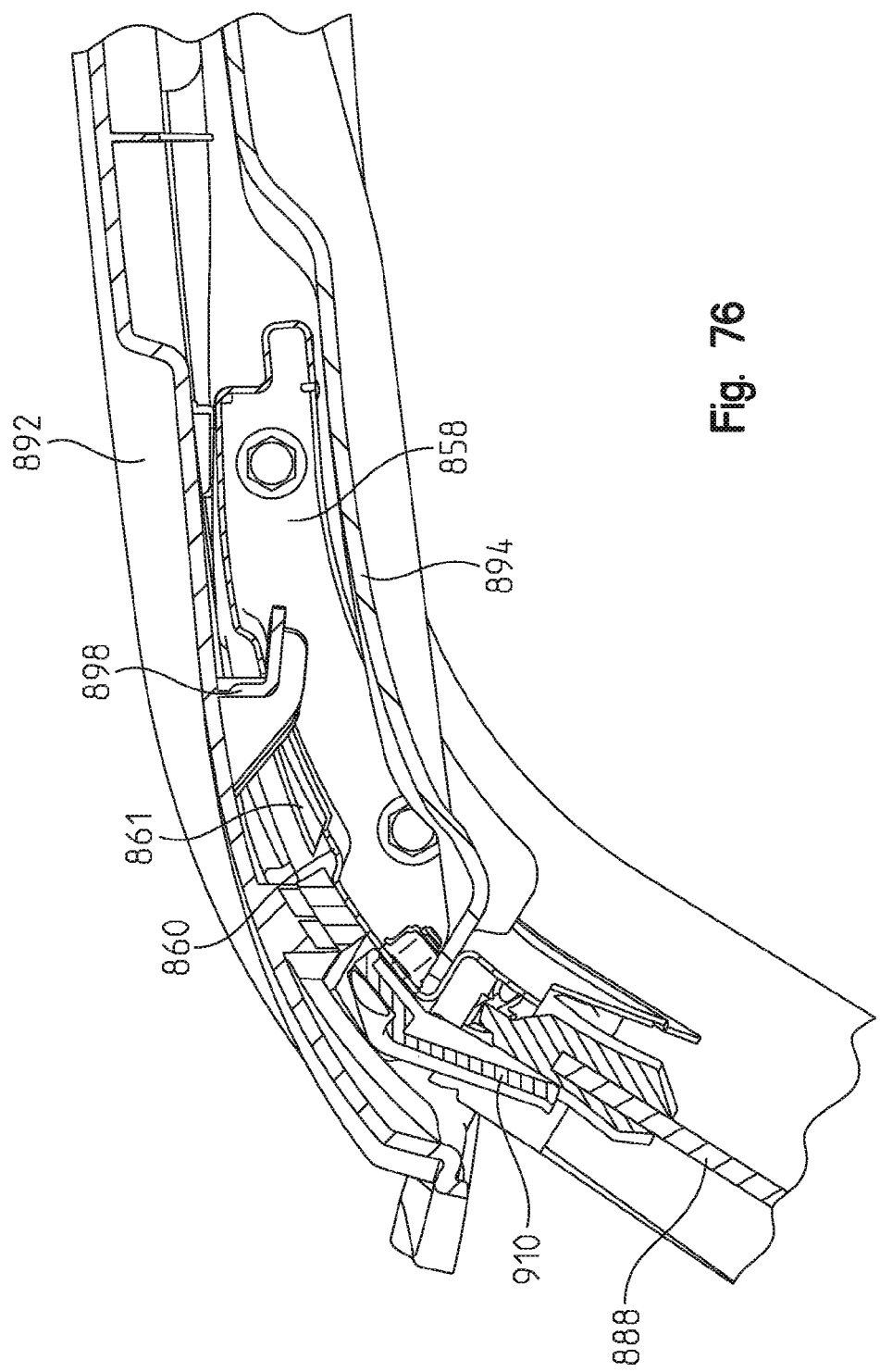
FIG. 76 is a detailed cross-sectional view of a front portion of the roll cage and the roof of FIG. 70.
Figure 77:
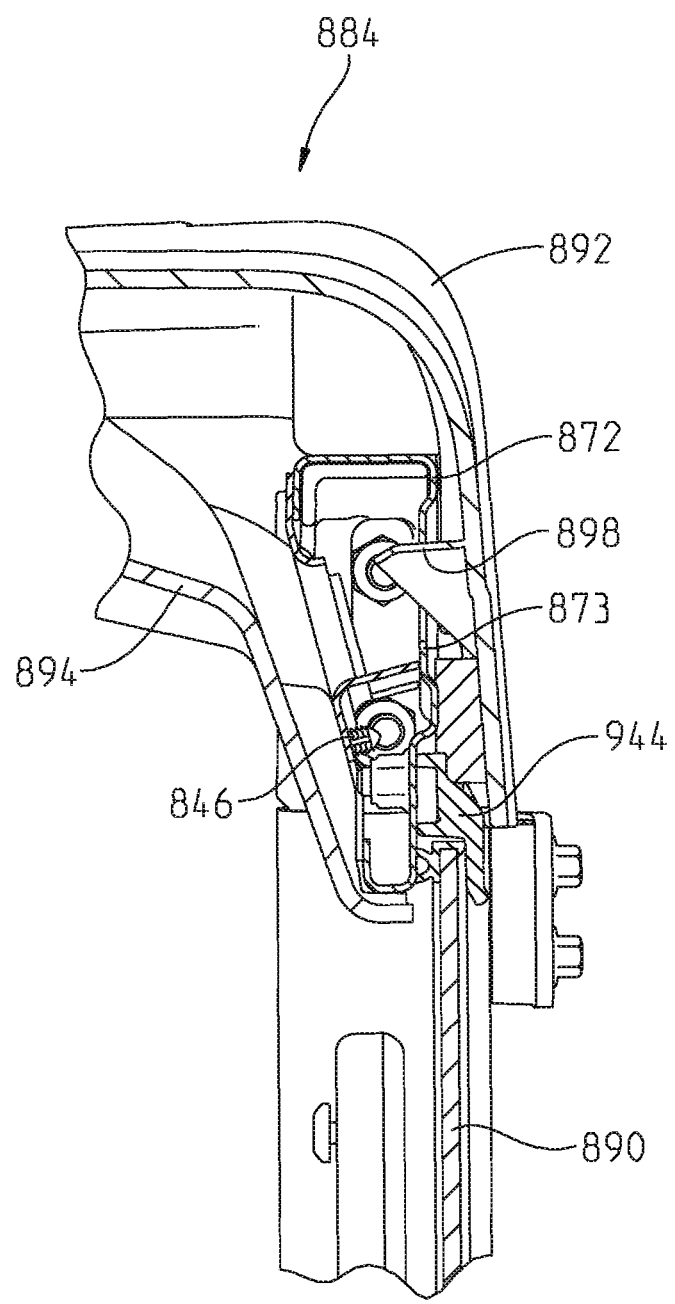
FIG. 77 is a detailed cross-sectional view of a rear portion of the roll cage and the roof of FIG. 70.

Roof 884 includes an outer panel 892 coupled to an inner panel 894. Referring to FIG. 74, outer panel 892 includes stiffening ribs 896 to support outer panel 892 and locating members 898 to secure outer panel 892 to roll cage 850. Locating members 898 may be integrally formed with outer panel 892 and project therefrom. Additionally, outer panel 892 may be configured to support a plurality of accessories. For example, outer panel 892 may include a dome light portion 900, channels 902 for securing wiring therein, and/or a rear light portion 904.

Inner panel 894 may be coupled to roll cage 850 and outer panel 892 with fasteners 851. To couple with roll cage 850, inner panel 894 includes tabs 895 which extend outwardly. As shown in FIG. 73, tabs 895 rest atop inner recessed surface 891 and are secured between crossbeams 866 and sealing member 893. As such, when outer panel 892 is coupled to roll cage 850, pressure is applied to tabs 895 to secure inner panel 894 to roll cage 850. Inner panel 894 also may support various accessories, such as a dome light (not shown) and speakers (not shown). In particular, inner panel 894 may include a dome light portion 906, as well as speaker portions 908.

As shown in FIGS. 74-77, roof 884 is illustratively coupled to roll cage 850 without fasteners. Locating members 898 couple roof 884 to roll cage 850 and, more particularly, locating members 898 are received within apertures 861 of surface 860 at front roll cage portion 852. Additionally, locating members 898 are received within apertures 873 of cross member 872 of rear roll cage portion 854. In this way, outer panel 892 is snapped on to roll cage 850 and is frictionally retained thereto. Therefore, it is not necessary to use fasteners for coupling roof 884 to roll cage 850 and, as such, roof 884 may be easily installed and removed from vehicle 600.

Figure 67:
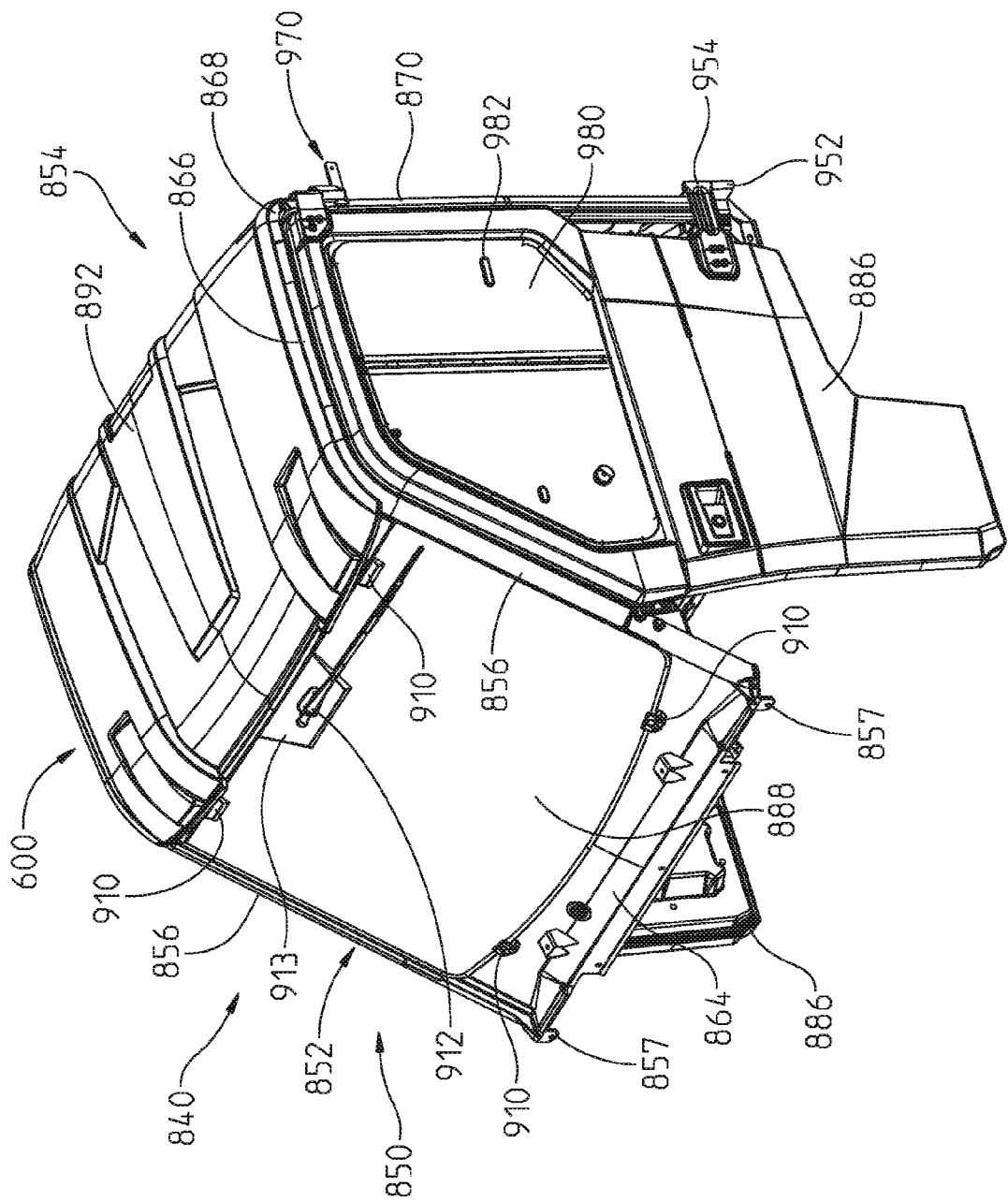
FIG. 67 is a front perspective view of a cab portion of the vehicle of FIG. 38 including the doors, front windshield, rear windshield, and roof.
Figure 78:
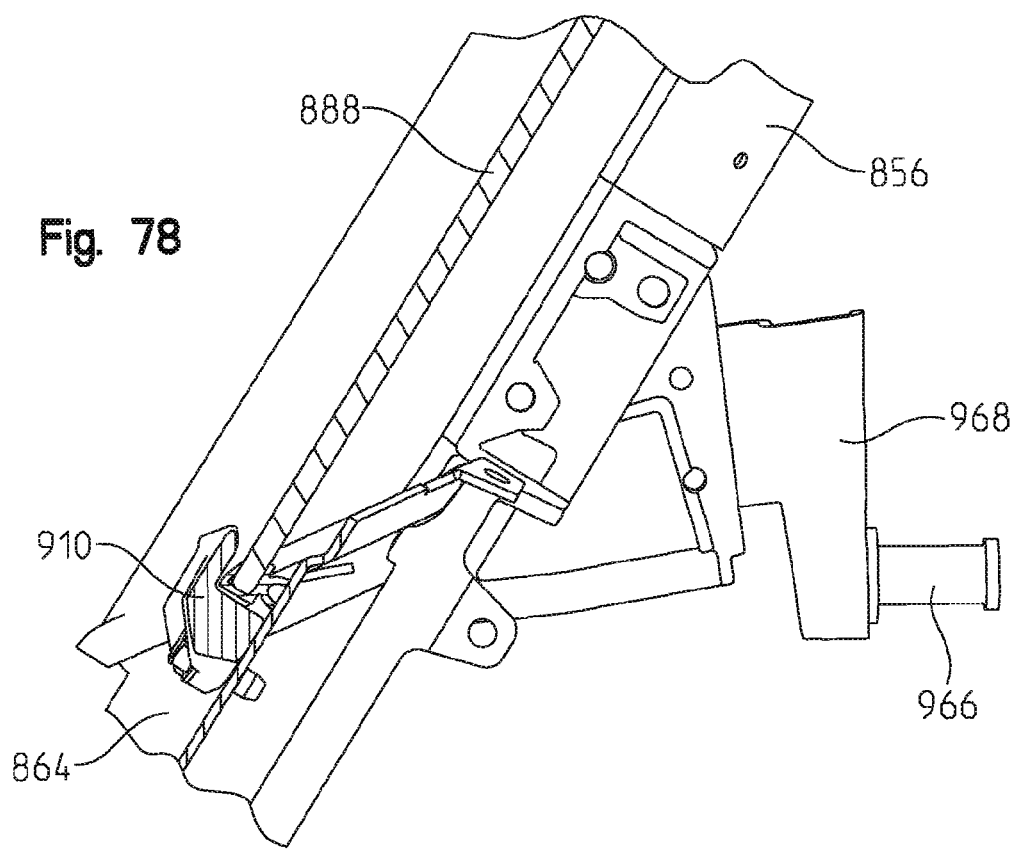
FIG. 78 is a detailed side view of a lower portion of the front windshield.

With reference to FIGS. 67-69, cab 840 may include front windshield 888. In particular, front windshield 888 extends horizontally between upright portions 856 and extends vertically between overhead beam 858 and lower beam 862. Front windshield 888 may be stamped to facilitate installation thereof. Stamping also allows front windshield 888 to form a solid surface The illustrative embodiment of front windshield 888 is frameless and does not include supports. Rather, front windshield may be coupled to roll cage 850 with retention clips 910 coupled to surface 860 and surface 864. As shown in FIG. 70, at least two retention clips 910 may be included on surface 860 and at least two retention clips 910 may be included on surface 864 to secure the top and bottom of front windshield to roll cage 850, respectively. Front windshield 888 may be maintained within retention clips 910 with a friction or retention fit, rather than with conventional fasteners, such as bolts or screws (FIG. 78). Along with roof 884, front windshield 888 further encloses and isolates cab 840. However, a duct at the top of front windshield 888 may be included in order to provide air flow into cab 840. Alternatively, roof 884 may include a duct that supplies air to cab 840.

Other alternative embodiments of front windshield 888 may be configured to pivot or rotate relative to roll cage 850. As shown in FIGS. 79-84, a hinge assembly 916 may be coupled to an upper portion of front windshield 888 and to surface 860 of roll cage 850. Hinge assembly 916 includes a top hinge 918 coupled to a bottom hinge 920 with a pin 922. Top hinge 918 may be coupled to surface 860 with conventional fasteners 924, for example bolts, screws, rivets, or welds. Similarly, bottom hinge 920 may be coupled to front windshield 888 with conventional fasteners (not shown). Bottom hinge 920 is configured to pivot relative to top hinge 918 and about pin 922 in order to rotate front windshield 888 between an open position and a closed position, as further detailed herein.

A lower portion of front windshield 888 may be coupled to surface 864 with a latch assembly 926. Referring to FIGS. 80-83, latch assembly 926 is coupled to the center of the lower portion of front windshield 888 and is further coupled to surface 864. Latch assembly 926 includes a handle 928; a body portion 929 having a first aperture 930 and a second aperture 932; a pin 934; and a support member 936. Latch assembly 926 is positioned rearwardly of front windshield 888 and, as such, is accessible from operator area 30.

Figure 81:
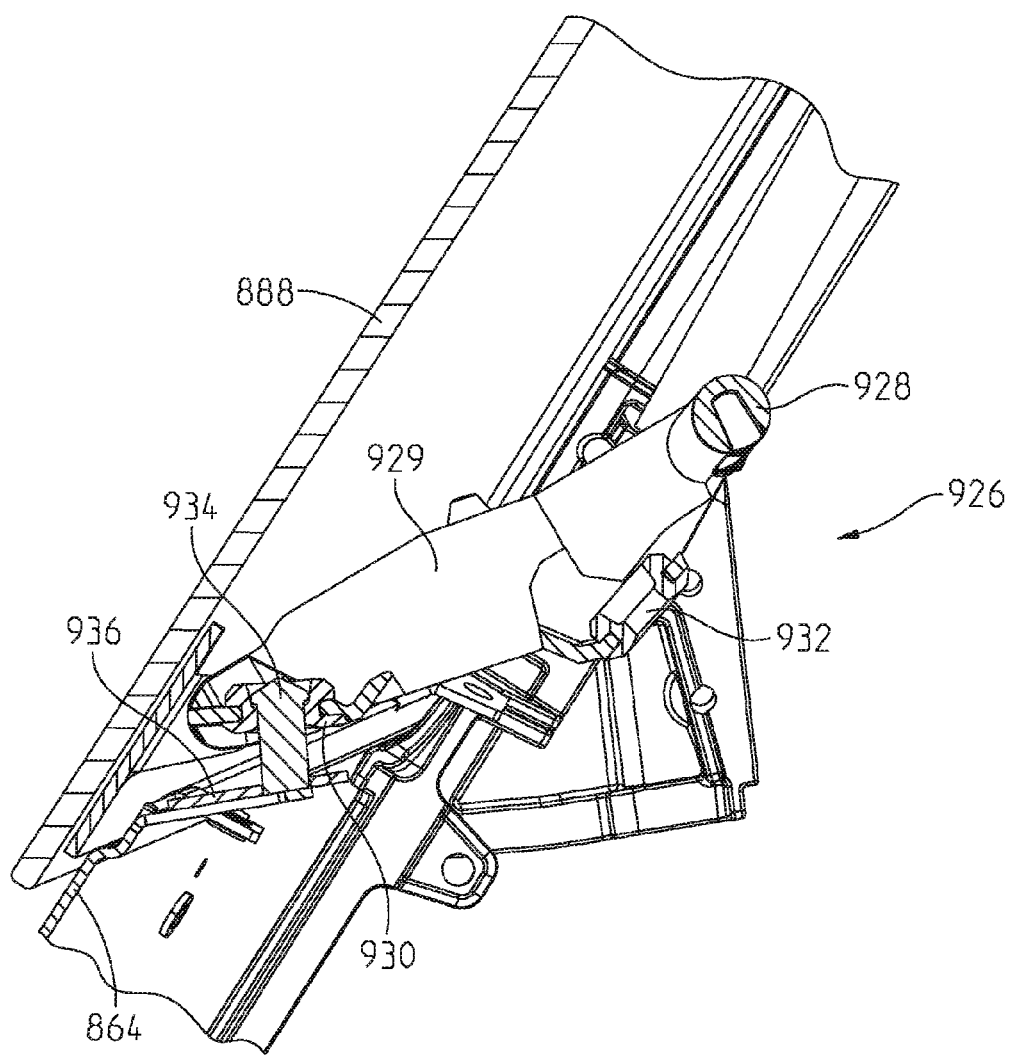
FIG. 81 is a side cross-sectional view of the alternative embodiment windshield of FIG. 79.

Latch assembly 926 cooperates with hinge assembly 916 to pivot front windshield 888 between first and second open positions (FIGS. 83 and 84) and a closed position (FIG. 81). Additionally, front windshield 888 includes at least one shock or spring 940 to secure front windshield 888 in the second open position, as further detailed herein.

Figure 82:
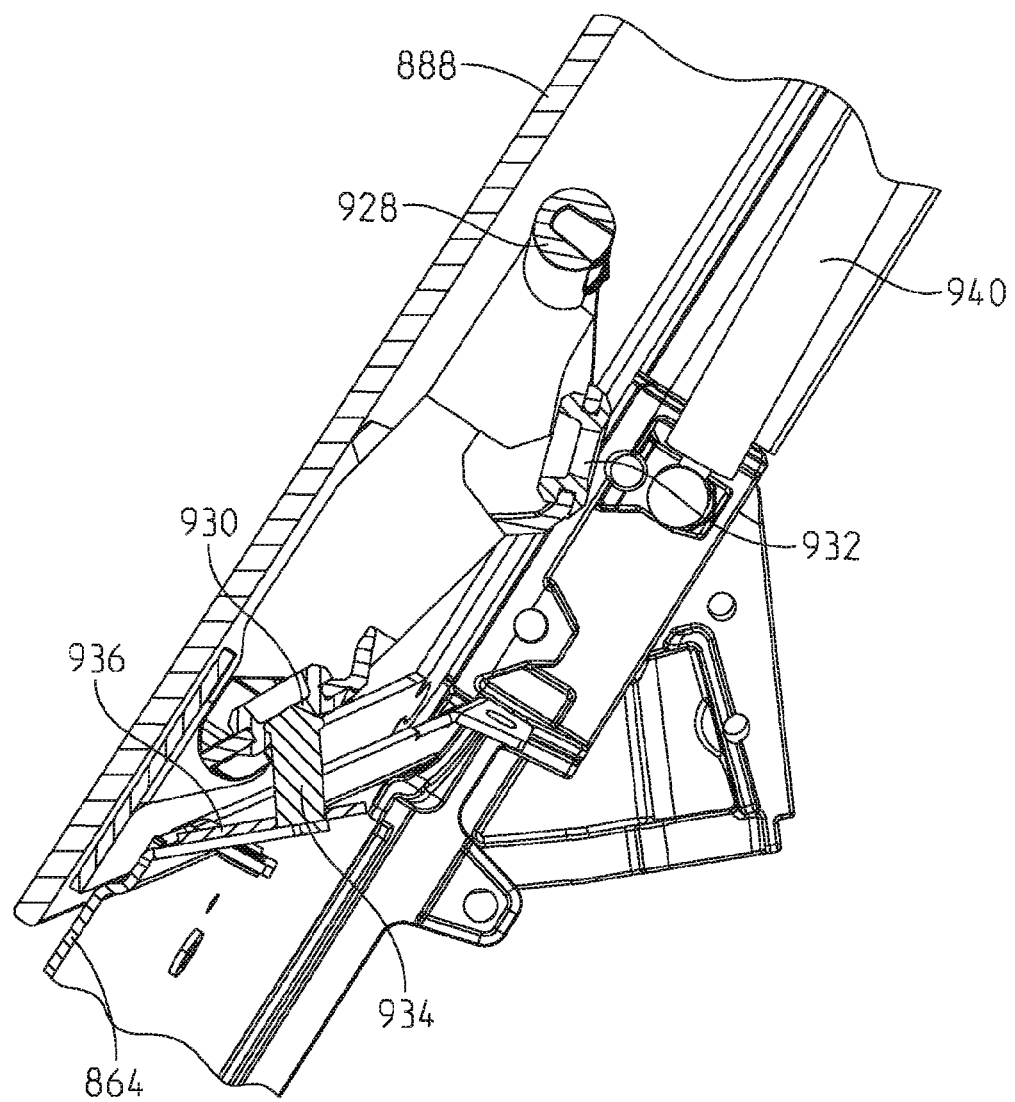
FIG. 82 is a further side cross-sectional view of the alternative embodiment windshield of FIG. 79.
Figure 83:
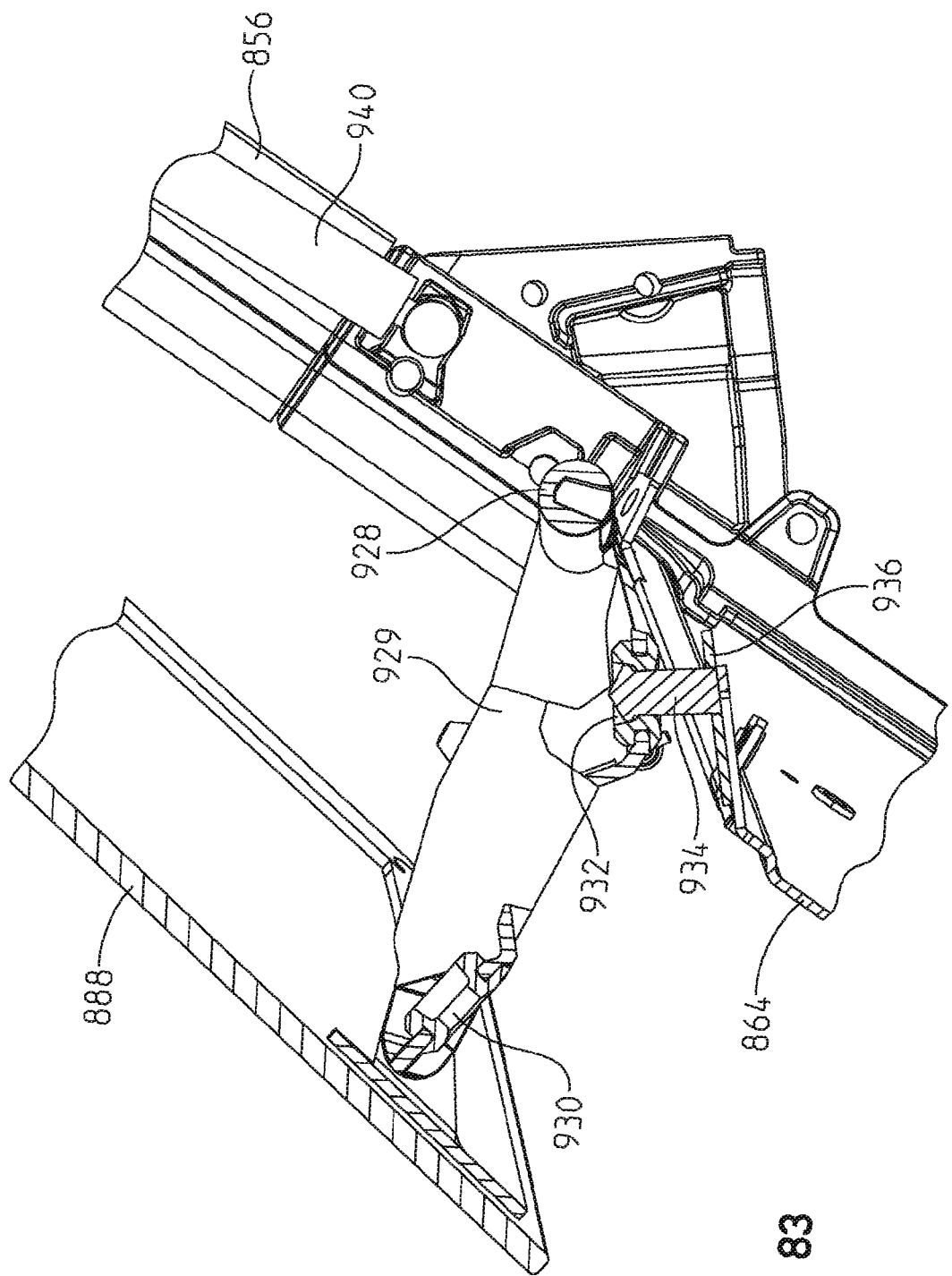
FIG. 83 is another side cross-sectional view of the alternative embodiment windshield of FIG. 79, illustrating the windshield in a first open position.

In particular, when front windshield 888 is in the closed position, handle 928 is in a downward position and pin 934 is received through first aperture 930, as best shown in FIG. 81. When it is desirable to open front windshield 888, handle 928 may be pulled or rotated upwardly against a cam surface of body portion 929 to disengage pin 934 from first aperture 930, as best shown in FIG. 82. Front windshield 888 may then be pushed outwardly in order to open to the first open position (FIG. 83). In the first open position shown in FIG. 83, the lower portion of front windshield 888 is spaced apart from surface 864 and second aperture 932 of handle 928 receives pin 934. In this way, front windshield 888 remains approximately parallel to surface 864 and upright portions 856, but provides additional ventilation to operator area 30.

Figure 84:
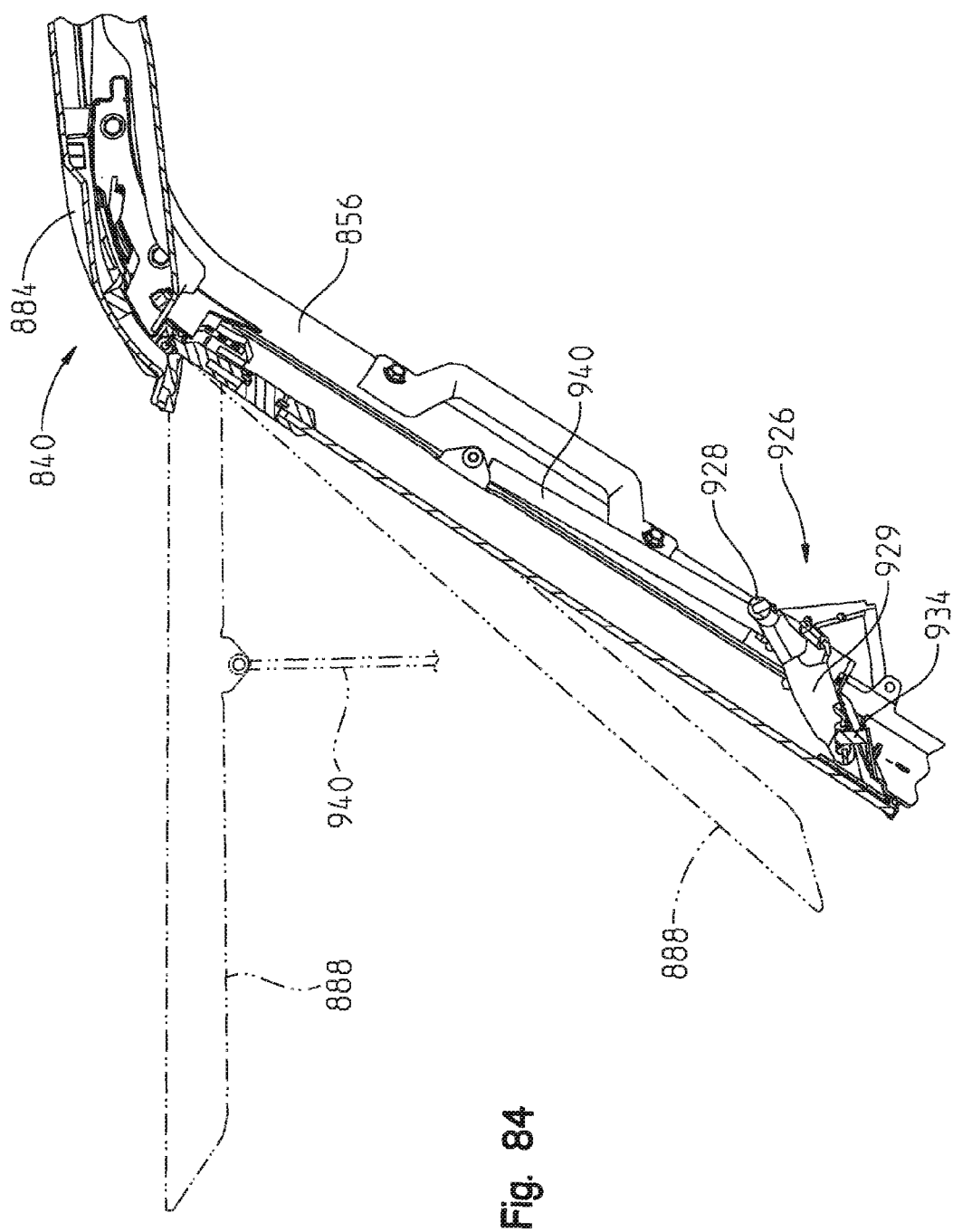
FIG. 84 another side cross-sectional view of the alternative embodiment windshield of FIG. 79, illustrating the windshield in a second open position.

Alternatively, it may be desirable to rotate front windshield 888 to the second open position, wherein front windshield 888 may be approximately parallel to the ground. As shown in FIG. 84, front windshield 888 may be released from the closed position by rotating handle 928 upwardly and disengaging pin 934 from first aperture 930. Front windshield 888 may then be pivoted forward from roll cage 850 when handle 928 is released from pin 934. As such, front windshield 888 and handle 928, may be pivoted forward to extend above surface 864. Locking devices, for example rods, springs, or other supports, and illustratively shocks 940, may be coupled to the outer sides of front windshield 888 and to upright portions 856 of front roll cage portion 852. Shocks 940 extend linearly when front windshield is rotated to the second open position. Shocks 940 support front windshield 888 in the second open position.

To close front windshield 888, latch assembly 926 may be used to pull windshield 888 rearwardly to the closed position. Pin 934 may be received through first aperture 930. Handle 928 may rotate downwardly along the cam surface of body portion 929 when front windshield 888 engaged surface 864 in the closed position.

Figure 85:
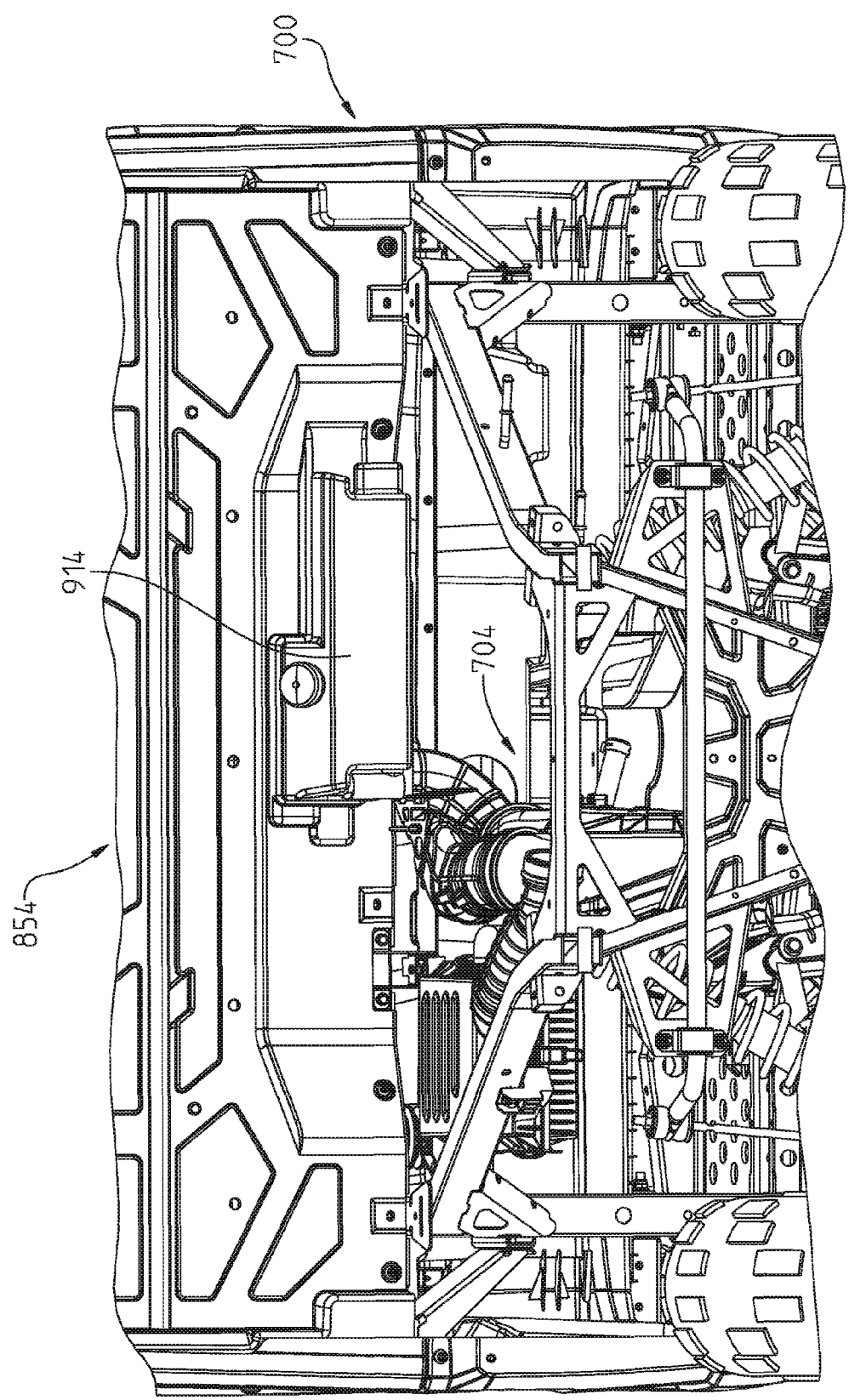
FIG. 85 is a rear elevational view of a rear portion of the vehicle of FIG. 38, and illustrating a fluid container operably coupled to the front windshield.

Front windshield 888 may further include a windshield wiper 912. Illustratively, a single windshield wiper 912 is provided on front windshield 888, however, front windshield 888 may include additional windshield wipers. A support plate 913 (FIG. 67) may be comprised of a rigid material (e.g., steel) and coupled to front windshield 888 to support windshield wiper 912. Additionally, windshield wiper 912 may be operably coupled to a container body 914 having washer fluid for cleaning front windshield 888 (FIG. 85). Container body 914 may be positioned rearward of cab 840 and adjacent CVT 704 and engine 150. In this way, the heat from engine 150 and CVT 704 may prevent the washer fluid within container body 914 from freezing when vehicle 600 is used at low temperatures.

Figure 86:
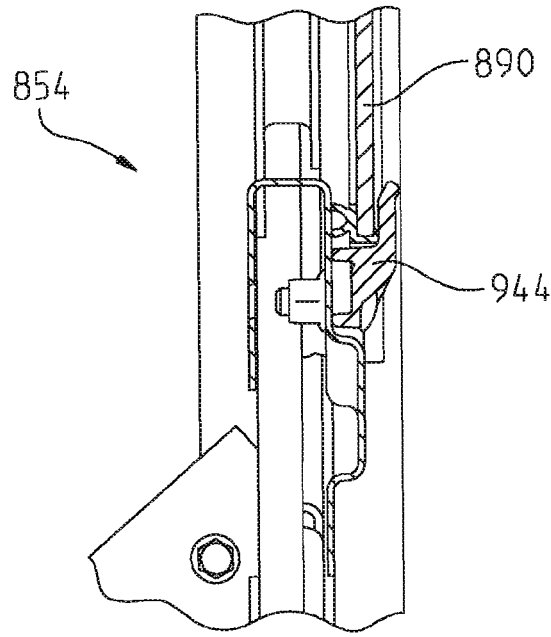
FIG. 86 is a detailed cross-sectional view of a lower portion of the rear windshield.
Figure 79:
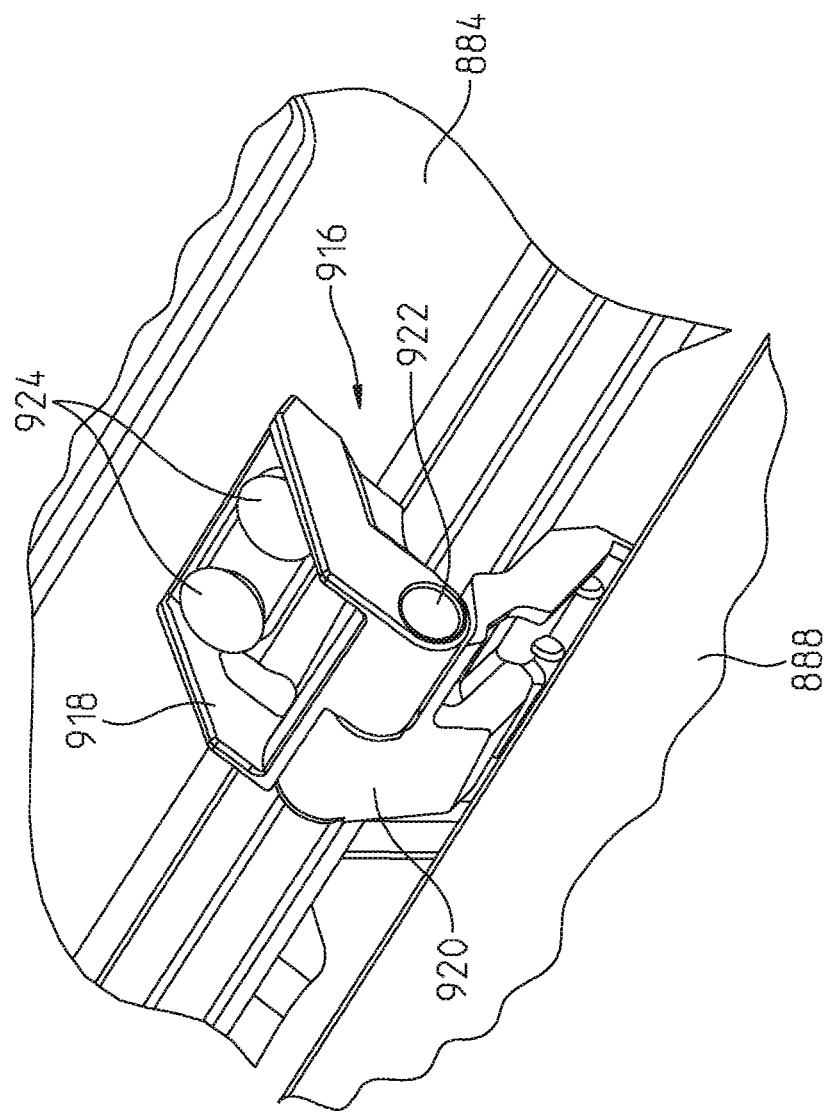
FIG. 79 is a detailed front perspective view of an alternative embodiment windshield.
Figure 80:
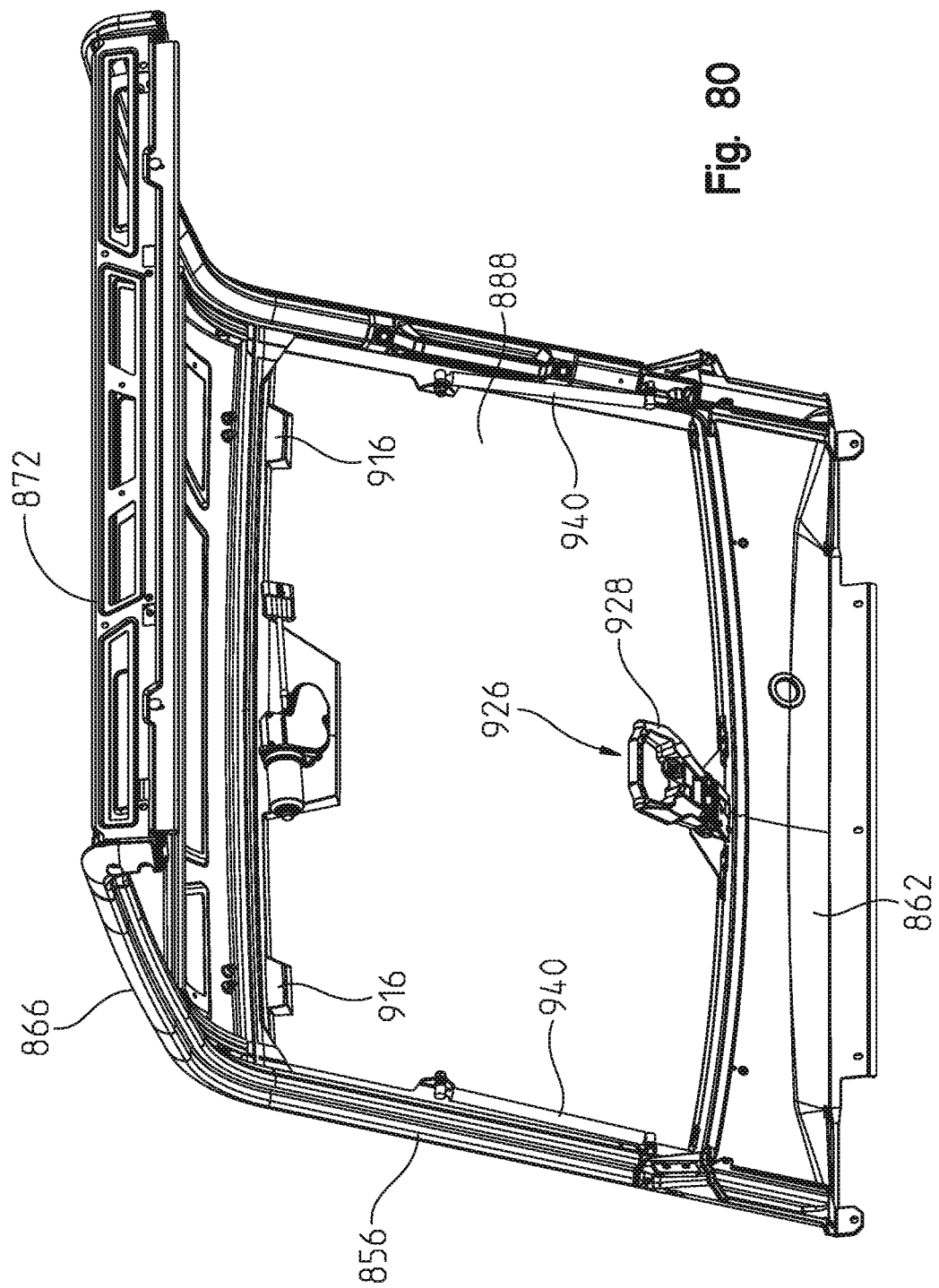
FIG. 80 is a rear perspective view of the alternative embodiment windshield of FIG. 79.

Generally opposite from front windshield 888 is rear windshield 890. As shown in FIG. 68, rear windshield 890 may be coupled to cross members 872, 874. As with front windshield 888, retention clips 944 may be used to frictionally retain rear windshield 890 on rear roll cage portion 854 (FIG. 86). For example, two retention clips 944 may be coupled to cross member 872 to secure the top portion of rear windshield 890, and two retention clips 944 may be coupled to cross member 874 to secure the bottom portion of rear windshield 890. As shown in FIG. 68, retention clips 944 are positioned outward, or rearward, of rear windshield 890

Figure 87:
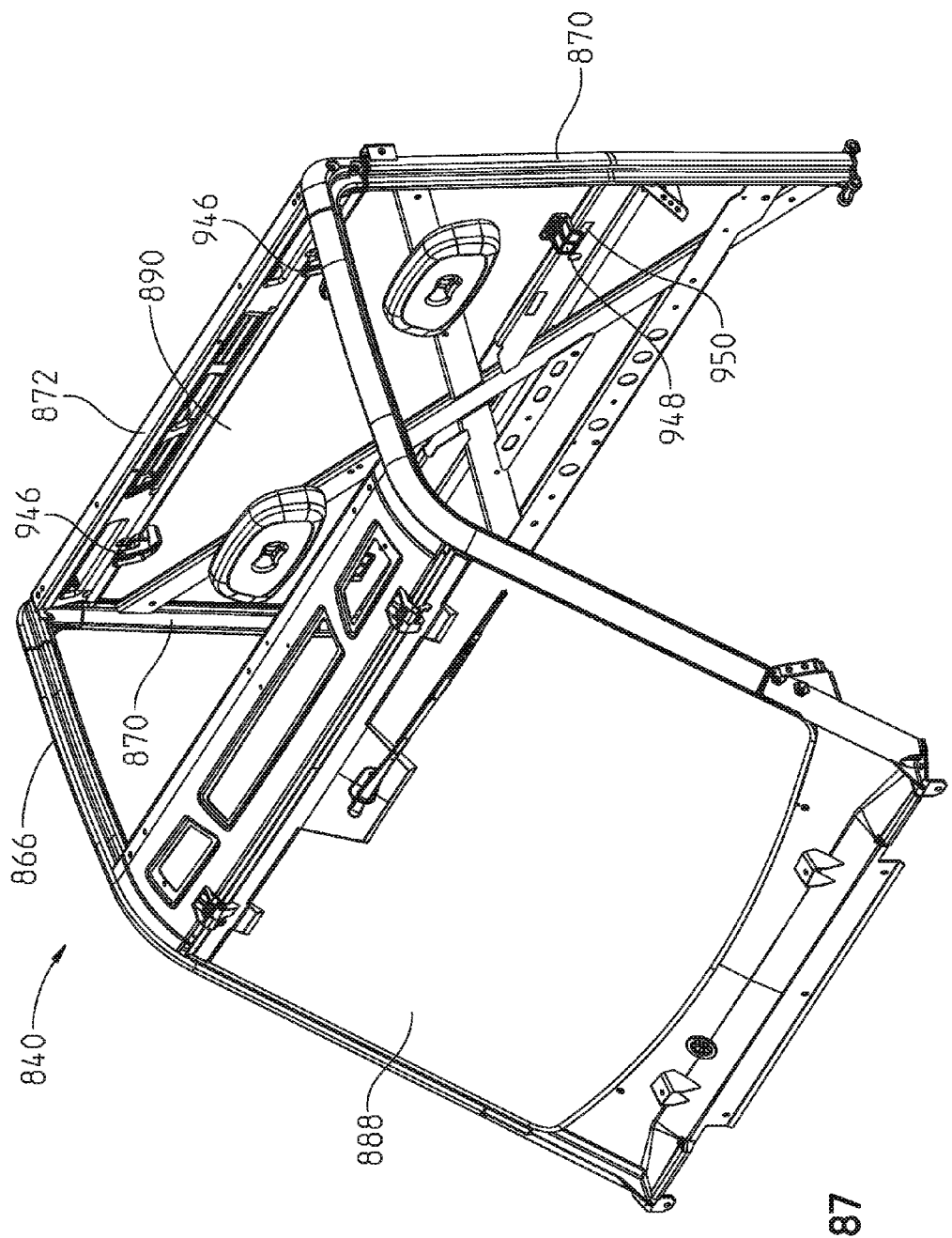
FIG. 87 is a front perspective view of the cab portion of the vehicle having an alternative embodiment rear windshield.
Figure 88:
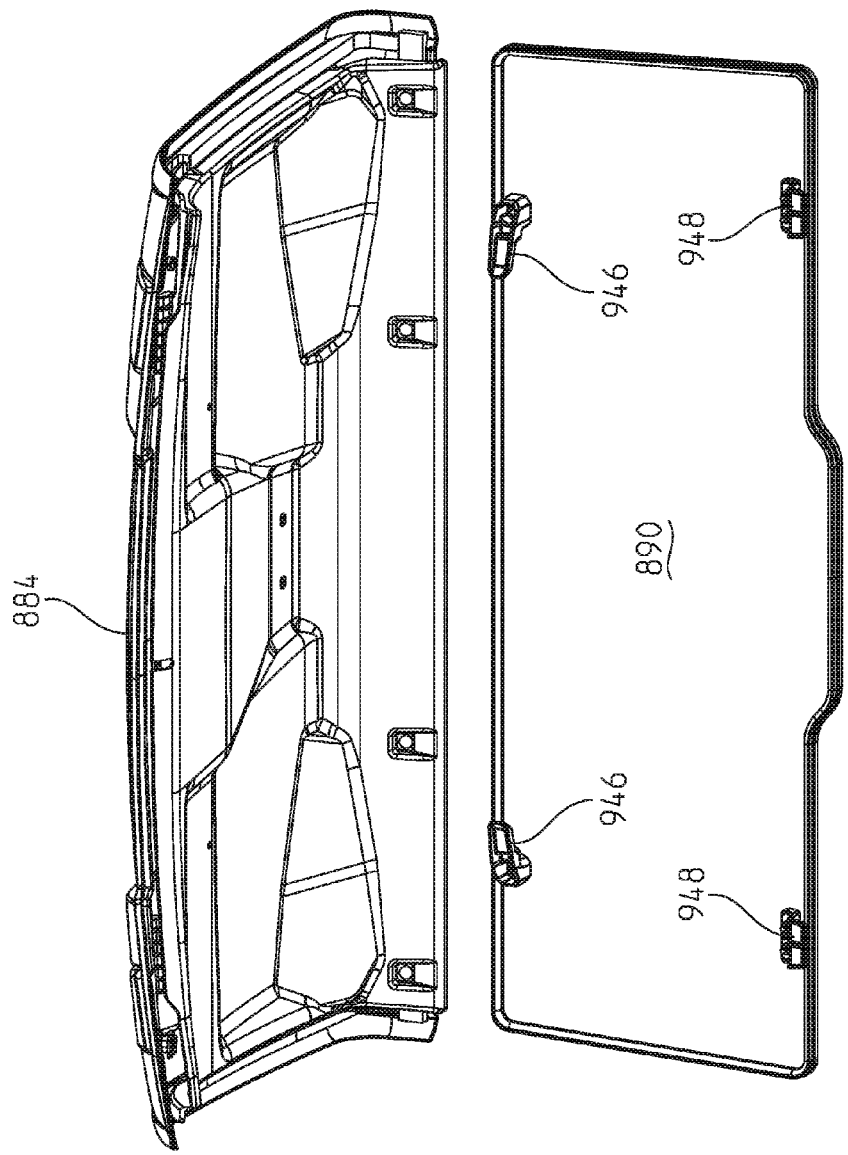
FIG. 88 is an exploded view of the alternative embodiment rear windshield and the roof.

Alternatively, rear windshield 890 may be coupled to rear roll cage portion 854 with upper clamps 946, for example lock-and-ride clamps, and lower clamps 948. Referring to FIGS. 87 and 88, the top portion of rear windshield 890 may include at least two upper clamps 946, which are configured to rotate between a generally horizontal position and a generally vertical position. As shown in FIG. 88, upper clamps 946 may be pivoted to the generally horizontal position when installing rear windshield 890 on rear roll cage portion 854. In this way, upper clamps 946 do not interfere with cross member 872. However, when the top portion of rear windshield 890 is engaged with rear roll cage portion 854, upper clamps 946 may be pivoted to the generally vertical position to retain rear windshield 890 on rear roll cage portion 854. Additionally, the bottom portion of rear windshield 890 may include lower clamps 948, which extend around, and clamp to, a coupling surface 950 on cross member 874. In this way, both the top portion and the bottom portion of rear windshield 890 are secured to rear roll cage portion 854. Upper clamps 946 and lower clamps 948 may be coupled to an inner surface of rear windshield 890 such that upper and lower clamps 946, 948 are accessible from operator area 30.

Figure 89:
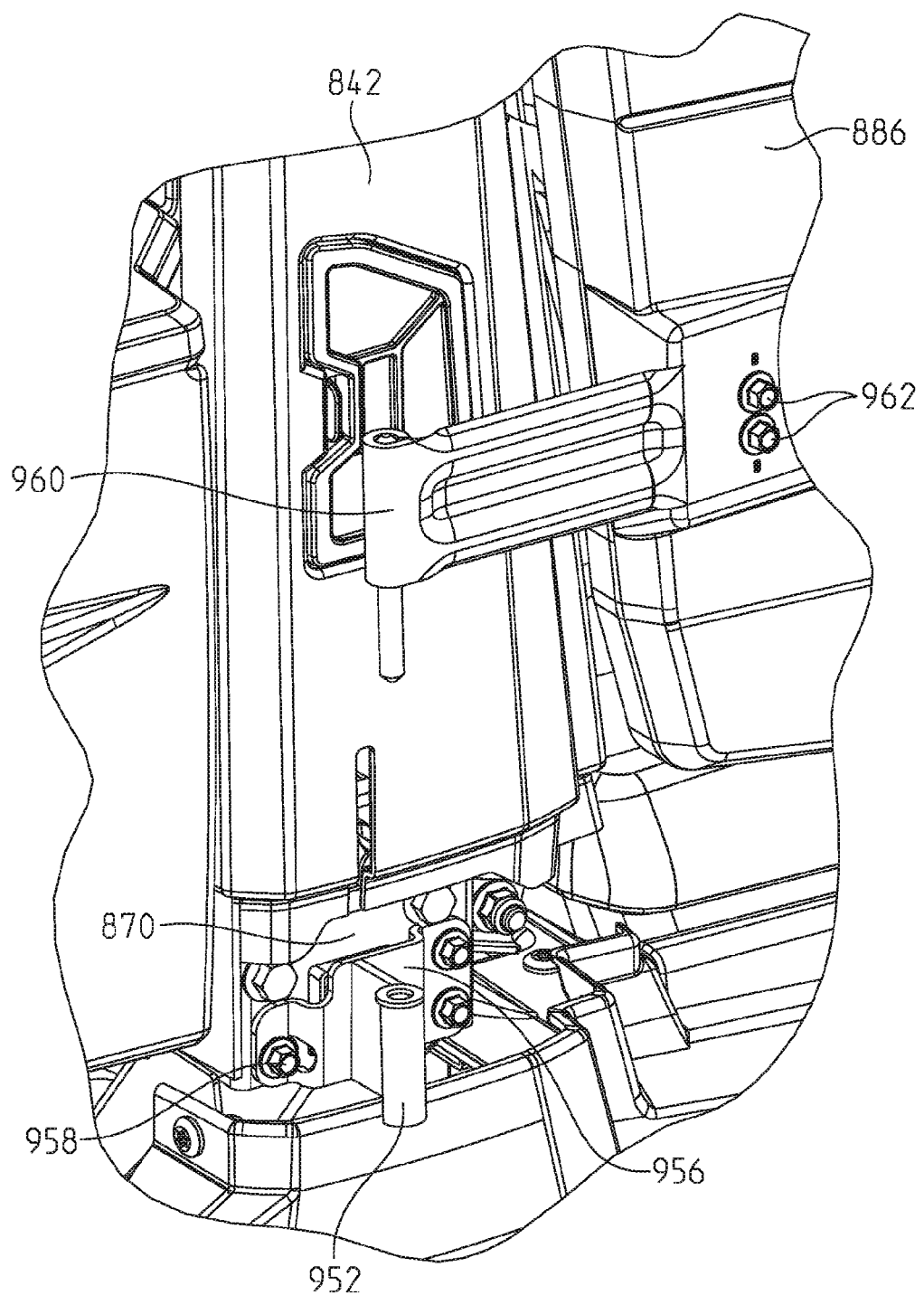
FIG. 89 is an exploded view of the door assembly of the vehicle of FIG. 38.
Figure 90:
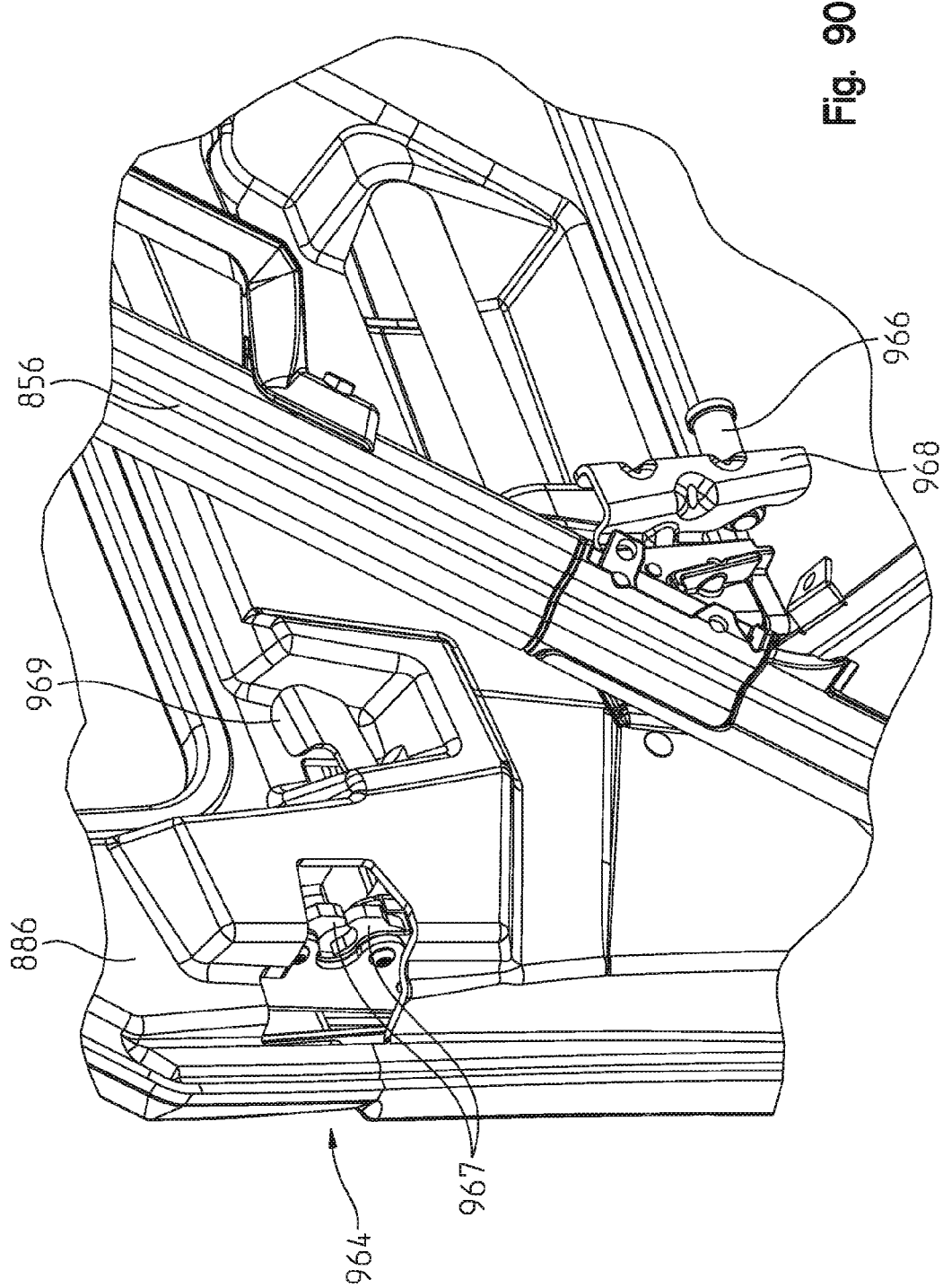
FIG. 90 is a front perspective view of a door latch assembly of the door assembly of FIG. 89.
Figure 91:
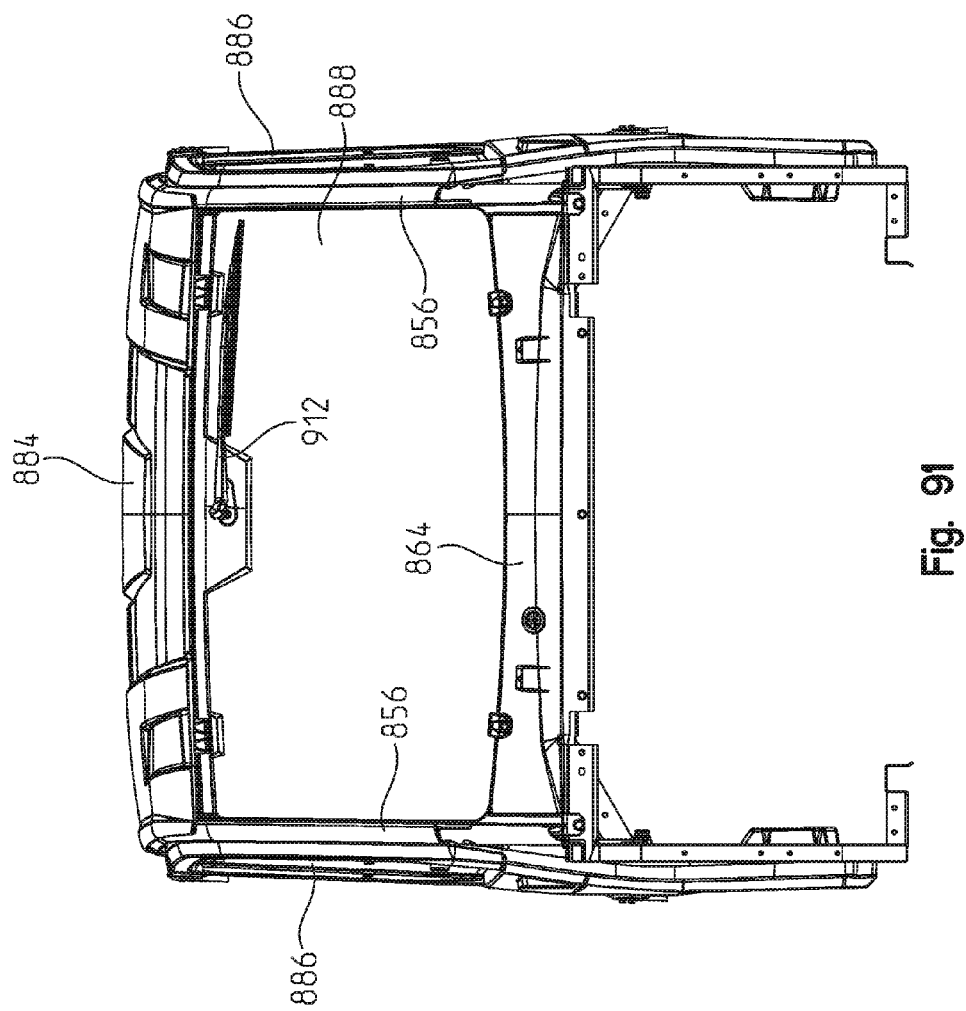
FIG. 91 is a front plan view of the cab portion of the vehicle.

Referring to FIGS. 89-91, doors 886 may be coupled to front and rear roll cage portions 852, 854 to further enclose cab 840 and operator area 30. Additionally, doors 886, along with roof 884, add to the weight of vehicle 600 and may shift the center of gravity of vehicle 600.

Doors 886 are illustratively full doors that enclose roll cage 850. Alternatively, doors 886 may be half doors that do not extend above front and rear windshields 888, 890. Doors 886 are removably hinged at rear roll cage portion 854 such that doors 886 open at front roll cage portion 852 and swing rearwardly toward rear roll cage portion 854. However, doors 886 may be coupled to roll cage 850 such that doors 886 open at rear roll cage portion 854 and swing forwardly toward front roll cage portion 852. Doors 886 may be flush with roll cage 850 because doors 886 may engage lip 882 (see FIG. 73). A sealing member (not shown) may be coupled to lip 882 or doors 886.

As shown in FIGS. 67 and 68, upright portions 870 of rear roll cage portion 854 may support a hinge member 952. Referring to FIG. 89, hinge member 852 may be integrally coupled to a bracket 956, which is coupled to bracket 1152 with conventional fasteners 958. In particular, bracket 956 is coupled to top portion 1154 of bracket 1152. Hinge member 952 is configured to receive a hinge pin 954, which is coupled to doors 886. In particular, hinge pin 954 is coupled to a bracket 960, which may be supported on each door 886 with conventional fasteners 962. Hinge pin 954 may be received within hinge member 952 to rotate or pivot therein when doors 886 are opened.

When assembling doors 886 to rear roll cage portion 852, tools may not be required because the coupling of hinge pin 954 and hinge member 952 secures doors 886 to rear roll cage portion 854. As such, doors 886 may be easily removed from roll cage 850 by lifting up on doors 886 and moving hinge pins 854 away from hinge member 852. Furthermore, the vertical arrangement of hinge pin 954 and hinge member 952 may increase rigidity between doors 886 and roll cage 850.

Referring to FIG. 90, doors 886 are further secured to front roll cage portion 852 with a door latch assembly 964. Door latch assembly 964 includes latching arms 967 operably coupled to a door handle 969 and configured to receive a latching bar 966. In the illustrative embodiment, latching arms 967 and door handle 969 are supported on door 886 and latching bar 966 is supported on front roll cage portion 852, in particular on upright portions 856. Latching bar 966 may be coupled to upright portions 856 with a bracket 968. In operation, door 886 is closed when latching bar 966 is clamped between latching arms 967. When opening door 886, door handle 969 may be activated, which separates latching arms 967 and releases latching bar 966.

While door latch assembly 964 secures doors 886 to roll cage 850, the shape and structure of doors 886 may bias doors 886 toward the closed position. As best shown in FIG. 91, the top of doors 886 may be slanted or angled inwardly toward operator area 30 relative to the bottom of doors 886. More particularly, illustrative doors 886 include an approximately 2° vertical angle or taper at the top which gives doors 886 a tendency to close.

Figure 92:
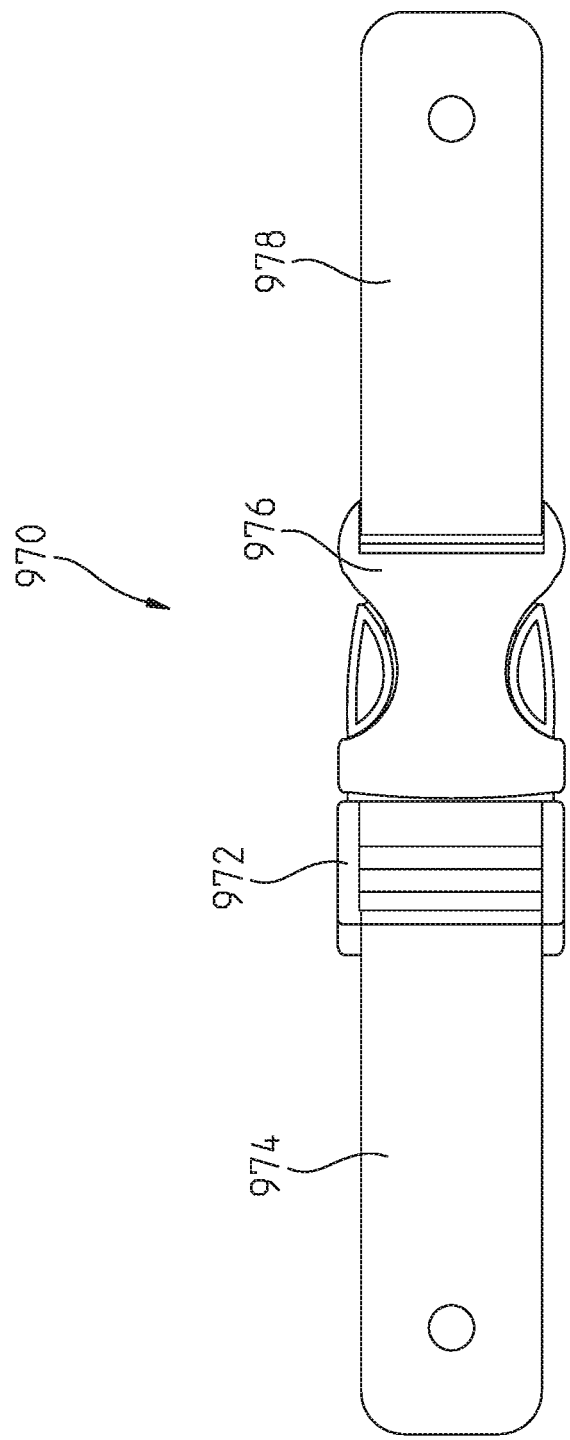
FIG. 92 is a front elevational view of an auxiliary door hinge assembly of the vehicle of FIG. 38.

Doors 886 may be held in the open position with an auxiliary latching assembly 970. As shown in FIG. 92, auxiliary latching assembly 970 may be a buckle assembly coupled to rear roll cage portion 854 or rear windshield 890 and doors 886 (FIG. 68). Auxiliary latching assembly 970 includes a first latching portion 972 coupled to a first support member 974 and a second latching portion 976 coupled to a second support member 978. Referring now to FIG. 68, first support member 974 may be coupled to rear windshield 890 with at least one conventional fastener (not shown) and extend outwardly toward door 886. Second support member 978 may be coupled to door 886 with a conventional fastener (not shown). Second latching portion 976 and second support member 978 may extend rearwardly from door 886. Alternatively, first latching portion 972 may be coupled to door 886 and second latching portion 976 may be coupled to rear windshield 890. Auxiliary latching assembly 970 assists in limiting the angular travel of doors 886 in order to prevent doors 886 from over-rotating, which may damage to doors 886.

When door 886 is rotated to the open position, second latching member 976 moves toward first latching member 972 such that first and second latching members 972, 976 may be coupled together. In this way, first and second latching members 972, 976 hold door 886 in the open position (i.e., door 886 extends outwardly from vehicle 600 and is substantially perpendicular to longitudinal axis L).

Illustrative doors 886 include windows 980, as shown in FIGS. 67 and 68. Windows 980 may be configured to open to provide additional ventilation to operator area 30. For example, one end of windows 980 may be pivotally coupled to doors 886. The opposing end of windows 980 may include a closure member 982 that further secures window 980 to door 886. Closure member 982 may be coupled to door 886 and window 980 and may be movable to open and close window 980. Illustratively, window 980 is configured to open outwardly from door 886 rather than inwardly toward operator area 30, however, alternative embodiments of window 980 may be contemplated.

It may be appreciated that roof 884, doors 886, front windshield 888, and rear windshield 890 are removably coupled to roll cage 850. As such, roof 884, doors 886, and front and rear windshields 888, 890 may be easily assembled to roll cage 850. Likewise, roof 884, doors 886, and front and rear windshields 888, 890 may be easily removed from roll cage 850. For example, roof 884, doors 886, and front and rear windshields 888, 890 may be replaced, or interchanged with alternative embodiments thereof, without tools. Additionally, illustrative roof 884, doors 886, and windshields 888, 890 are modular and may be comprised of canvas, plastic, or such materials.

Figure 93:
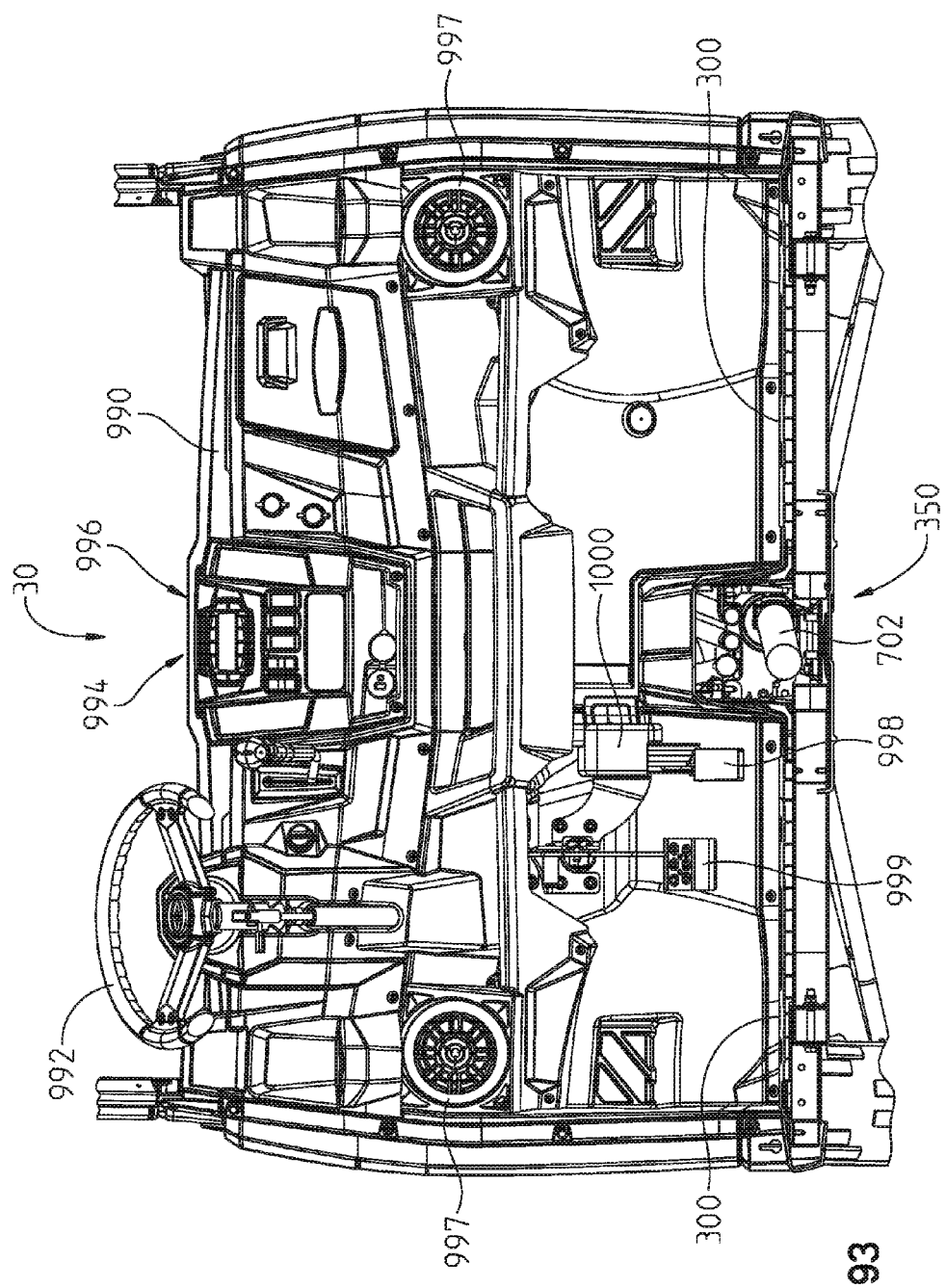
FIG. 93 is a rear view of an operator area of the vehicle of FIG. 38.

Referring to FIG. 93, operator area 30 may include operator controls positioned within and on a dashboard assembly 990. For example, dashboard assembly 990 may support steering wheel 992, a radio 994, a navigation system 996, air conditioning, audio speakers 997, and other communication and/or electronic features and functions. Additionally, speakers 997 may be included under dashboard assembly 990, along floor boards 300, on roof 884, or elsewhere within cab 840. As such, dashboard assembly 990 may be fully integrated with the tools and devices that the operator needs when operating vehicle 600. Additionally, other features and functions on dashboard assembly 990 may be provided to maximize the comfort of the operator and passenger. Furthermore, dashboard assembly 990 may be positioned closer to driver's seat 34 and passenger seat 36 in order to improve the ergonomics of operator area 30.

Operator area 30 also includes operator pedals, such as an acceleration pedal 998 and a brake pedal 999 positioned below dashboard assembly 990. Brake pedal 999 may be operably coupled to the brake system. Acceleration pedal 998 may be operably coupled to engine 150 to control the acceleration of vehicle 600. An electronic throttle control ("ETC") may be positioned on acceleration pedal 998 and operably coupled to engine 150. To prevent the operator from kicking, stepping on, or otherwise contacting the ETC, a cover 1000 may be provided on acceleration pedal 998 to protect the ETC. Cover 1000 substantially surrounds the ETC to prevent contact thereto.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
   at least one front ground engaging member;
   at least one rear ground engaging member;
   a frame extending in a longitudinal direction of the vehicle and including a front portion, a rear portion, and a channel member extending in the longitudinal direction between the front and rear portions, the front portion being supported by the at least one front ground engaging member and the rear portion being supported by the at least one rear ground engaging member;
   a floor board coupled to the channel member;
   a powertrain assembly having a drive shaft operably coupled to at least one of the front ground engaging member and the rear ground engaging member; and
   a plurality of transport lines configured to transport at least one of a fluid and an electrical connection between the front portion and the rear portion of the frame, wherein the channel member is positioned intermediate the drive shaft and the transport lines and is configured to support the transport lines.

2. The utility vehicle of claim 1, further comprising a radiator assembly, wherein at least one of the transport lines is configured to flow a fluid between the radiator assembly and the powertrain assembly.

3. The utility vehicle of claim 1, wherein the channel member includes a recessed portion for supporting the transport lines.

4. The utility vehicle of claim 1, wherein the channel member is elevated relative to the floor board, and the drive shaft is positioned below the channel member.

5. The utility vehicle of claim 4, wherein the transport lines are elevated relative to the floor board.

6. The utility vehicle of claim 1, further comprising a panel coupled to the channel member at the front portion the frame, the panel cooperating with the channel member to increase the stiffness of the frame.

7. A utility vehicle, comprising:
   a plurality of ground engaging members;
   a frame supported by the ground engaging members;
   an engine assembly supported by the frame and operably coupled to at least one of the ground engaging members;
   a fuel container fluidly coupled to the engine assembly; and
   a fuel fill cup coupled to the fuel container and including a channel that is configured to receive fuel into the fuel container and is configured to release vapor from the fuel container, wherein the fuel fill cup is configured to contain excess fuel therein.

8. The utility vehicle of claim 7, wherein the channel is defined by a fill tube, and the fuel fill cup further includes a chamber generally surrounding the fill tube, the fill tube has a tapered surface to increase the volume of the chamber.

9. The utility vehicle of claim 8, wherein the fill tube has a diameter of approximately two inches.

10. The utility vehicle of claim 8, wherein the fill tube is configured to separate fuel in the chamber from the vapor released from the fuel container.

11. The utility vehicle of claim 10, wherein the vapor flows along an inner surface of the fill tube and the excess is container along an outer surface of the fill tube.

12. The utility vehicle of claim 7, further comprising a hose coupled to the fuel fill cup and the fuel tank, wherein the channel generally directs a fuel nozzle along a central portion of the fuel fill cup for fuel to flow through the hose and into the fuel tank.

13. The utility vehicle of claim 7, wherein the fuel tank is supported within an interior portion of the utility vehicle and the fuel fill cup is configured to receive fuel at an outboard location of the utility vehicle.

14. A utility vehicle, comprising:
   a plurality of ground engaging members;
   a powertrain assembly drivingly coupled to at least one of the ground engaging members and including a continuously variable transmission;
   an operator area supported by the ground engaging members;
   a roll cage extending above the operator area, the roll cage including a front portion and a rear portion, each of the front and rear portions of the roll cage including a plurality of apertures; and
   a roof removably coupled to the roll cage and positioned above the operator area, the roof including a plurality of projections configured to extend through at least one of the apertures of the front portion and at least one of the apertures of the rear portion of the roll cage.

15. The utility vehicle of claim 14, wherein the roof is frictionally retained on the roll cage.

16. The utility vehicle of claim 14, wherein the roof includes an inner panel and an outer panel coupled to the inner panel, the inner panel is coupled to the roll cage by the outer panel.

17. The utility vehicle of claim 14, wherein the roof is configured to support a plurality of accessories.

18. A utility vehicle, comprising:
a plurality of ground engaging members configured for contacting a ground surface;
a frame supported by the ground engaging members;
an operator area supported by the frame;
a cab generally surrounding the operator area and including front upright portions, rear upright portions, and at least one cross member extending therebetween; and
a front windshield coupled to the front upright portions, the front windshield being configured to pivot between an open state and a closed state, the front windshield being spaced apart from the front upright portions when in the open state, and the front windshield being engaged with the front upright portions when in the closed state, wherein the open state includes a first open position and a second open position, the front windshield being generally parallel to the front upright portions when in the first open position, and the front windshield being generally parallel to the ground surface when in the second open position.

19. The utility vehicle of claim 18, wherein the front windshield includes at least one wiper member, the at least one wiper member being operably coupled to a fluid container for cleaning the front windshield.

20. The utility vehicle of claim 18, further comprising a handle assembly and a hinge assembly, the handle assembly and the hinge assembly are operably coupled to the front windshield and the cab, and are configured to move the front windshield between the closed state and the open state.

* * * * *